United States Patent [19]

Hamakawa

[11] Patent Number: 4,831,417
[45] Date of Patent: May 16, 1989

[54] MICROFILMING APPARATUS

[75] Inventor: Wataru Hamakawa, Toyokawa, Japan

[73] Assignee: Minolta Camera Kabushiki Kaisha, Osaka, Japan

[21] Appl. No.: 126,961

[22] Filed: Nov. 30, 1987

[30] Foreign Application Priority Data

| Nov. 29, 1986 | [JP] | Japan | 61-284495 |
| Nov. 29, 1986 | [JP] | Japan | 61-284496 |
| Nov. 29, 1986 | [JP] | Japan | 61-284497 |
| Nov. 29, 1986 | [JP] | Japan | 61-284498 |
| Nov. 29, 1986 | [JP] | Japan | 61-284499 |
| Nov. 29, 1986 | [JP] | Japan | 61-284500 |
| Apr. 17, 1987 | [JP] | Japan | 62-95799 |
| Apr. 17, 1987 | [JP] | Japan | 62-95800 |

[51] Int. Cl.⁴ .......................................... G03B 27/70
[52] U.S. Cl. ...................................... 355/65; 355/40
[58] Field of Search .................... 355/40, 43, 46, 51, 355/64, 65, 54

[56] References Cited

U.S. PATENT DOCUMENTS

| 3,865,486 | 2/1975 | Miles et al. | 355/64 |
| 4,029,412 | 6/1977 | Spence-Bate | 355/64 |
| 4,087,175 | 5/1978 | Johnson | 355/64 X |
| 4,093,370 | 6/1978 | Frech | 355/54 X |
| 4,124,290 | 11/1978 | Axelrod et al. | 355/41 |
| 4,148,579 | 4/1979 | Axelrod et al. | 355/41 |
| 4,174,174 | 11/1979 | Hunter, Jr. et al. | 355/54 X |
| 4,214,834 | 7/1980 | Findeis et al. | 355/46 |
| 4,259,007 | 3/1981 | Arai et al. | 355/64 X |
| 4,408,876 | 10/1983 | Steidle | 355/54 |
| 4,419,007 | 12/1983 | Kingsley | 355/14 SH |
| 4,444,490 | 4/1984 | Stark et al. | 355/64 X |
| 4,519,701 | 5/1985 | Kanaoka et al. | 355/64 X |
| 4,577,956 | 3/1986 | Klosterhuber et al. | 355/64 X |
| 4,636,061 | 1/1987 | Staude et al. | 355/65 X |
| 4,701,046 | 10/1987 | Shiga | 355/40 X |
| 4,731,639 | 3/1988 | Gutmann et al. | 355/64 |
| 4,757,352 | 7/1988 | Weinzierl et al. | 355/64 X |

Primary Examiner—Richard A. Wintercorn
Attorney, Agent, or Firm—Burns, Doane, Swecker & Mathis

[57] ABSTRACT

An apparatus including separate mechanisms for photographing documents under automatic exposure control and recording image data, such as blip marks and frame numbers, at the same time. Even when the document has been completely photographed, the photographing mechanism is prohibited from transporting the film until the image data is completely recorded. The photographing mechanism photographs the document with automatically controlled proper exposure time in accordance with the density of the document. The data recording mechansim is independent of the photographing mechanism to record the image data properly under a constant condition, irrespective of variations in the exposure time in conformity with the document density. When the image data has not been recorded despite the completion of photographing operation, transport of the film is prevented to avoid failure in image data recording.

12 Claims, 73 Drawing Sheets

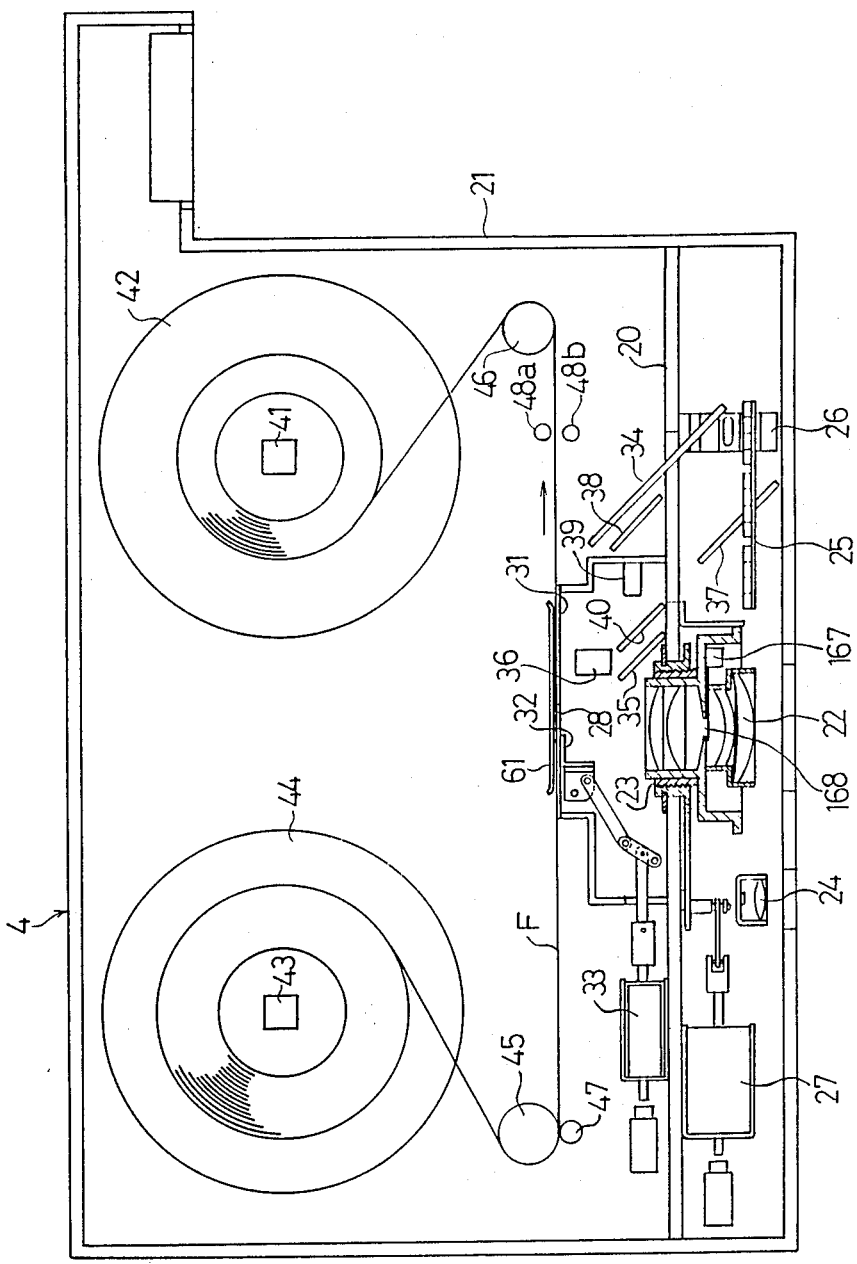

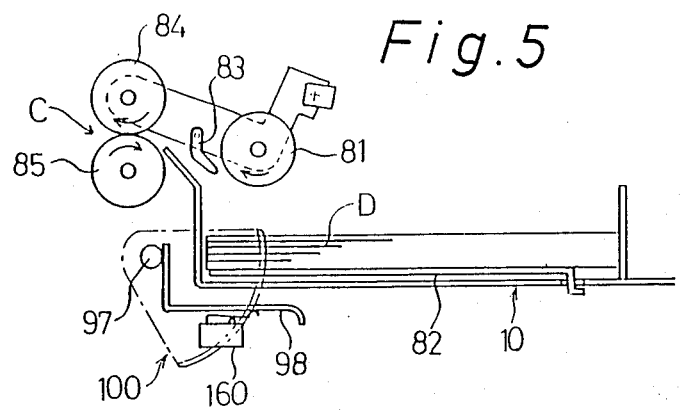
Fig. 5
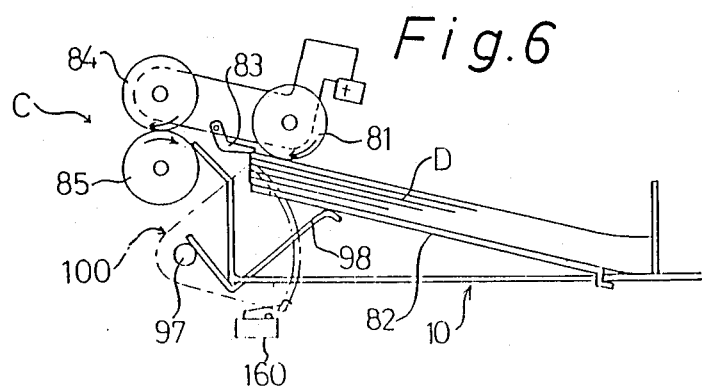
Fig. 6
Fig. 7 Fig. 8
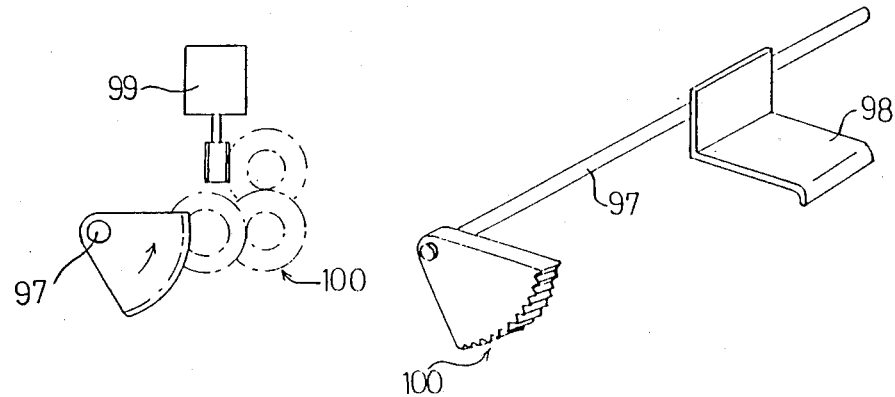

Fig. 19B (a) $m_{12}\,m_{11}$ ———————— $m_3\,m_2\,m_1$

| 0 | 0 | 0 | 3 | 0 | 2 | 1 | 8 | 0 | 2 | 0 | 1 |

⇩

(a')

| 0 | 0 | 0 | 3 | 0 | 2 | 1 | 8 | 9 | 2 | 0 | 2 |

(b)

| 0 | 0 | 0 | 3 | 0 | 2 | 1 | 8 | 9 | 2 | 0 | 1 |

⇩

(b')

| 0 | 0 | 0 | 3 | 0 | 2 | 1 | 8 | 9 | 2 | 0 | 2 |

(c)

| 0 | 0 | 0 | 3 | 0 | 2 | 1 | 8 | 9 | 9 | 9 | 9 |

⇩

(c')

| 0 | 0 | 0 | 3 | 0 | 2 | 1 | 9 | 0 | 0 | 0 | 0 |

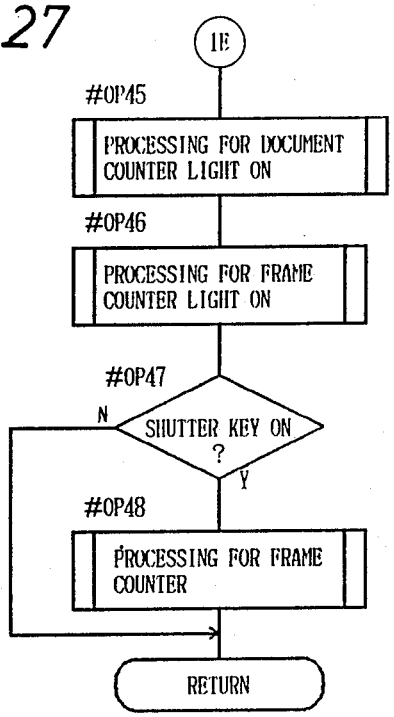
Fig.27
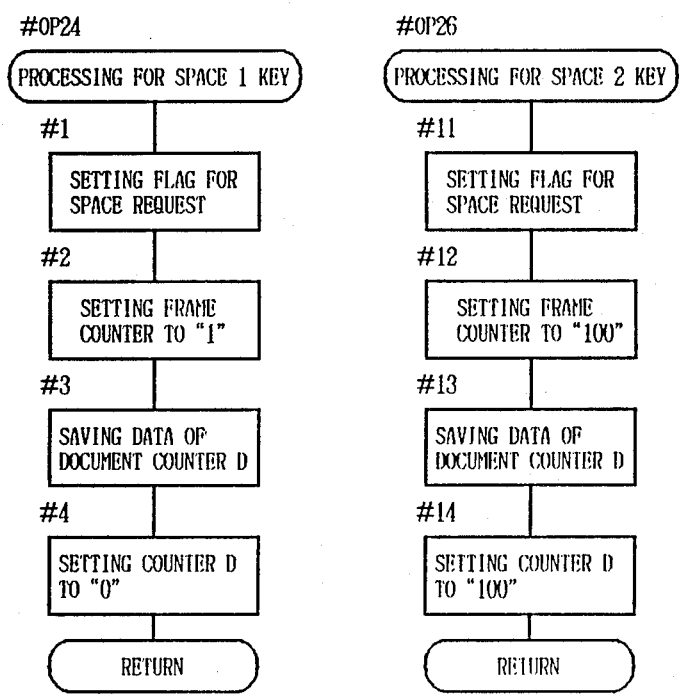
Fig.28
Fig.29

MICROFILMING APPARATUS

BACKGROUND OF THE INVENTION

The present invention relates to a microfilming apparatus, and more particularly to an apparatus for microfilming a multiplicity of document sheets one after another and recording on the film image data, such as frame numbers assigned to the respective document sheets and blip marks, for example for retrieving the photographed images later.

Conventionally, document sheets are photographed along with frame numbers, blip marks or like data items using a data recording display on a document support portion and photographing the data on the display together with the document sheet. The film is then immediately wound up.

However, in the case where the means for photographing document sheets on a film is provided with automatic exposure control means to assure a proper exposure in microfilming, the duration of operation of the photographing means varies with the brightness of document sheets, whereas the data recording display has a given brightness and therefore produces variations in the density of recorded data. This drawback may be overcome, for example, by varying the brightness of the display in corresponding relation to the variation in the operating time of the photographing means, but this requires a complex mode of control and efficient data recording means.

SUMMARY OF THE INVENTION

The main object of the present invention is to provide a microfilming apparatus which is capable of photographing the document and recording the image data at the same time independently of each other and which is especially so adapted that the image data can be recorded under a constant condition at all times properly irrespective of differences in the exposure time for different document sheets due to automatic exposure control.

Another object of the invention is to provide a microfilming apparatus which is so adapted that when image data recording has not been completed after the document is completely photographed owing to the exposure time altered with the density of the document, transport of the film is prohibited to assure image data recording free of failure.

The apparatus of the invention is chiefly characterized in that it has image data recording means separately from photographing means resorting to automatic exposure for the document.

Consequently, the image data can be recorded properly under a constant condition at all times, using the data recording means which is independent of the document photographing means and irrespective of variations in the exposure time in accordance with the document density.

The present apparatus is further characterized in that it has control means for holding the film transport means out of operation until both the photographing means and the data recording means have completed their operation.

Accordingly, until data recording is completed, film transport is prohibited although the film is usually transported on completion of photographing operation. The data can therefore be recorded free of failure.

Other objects and features of the invention will become apparent from the following description with reference to the accompanying drawings.

BRIEF OF THE DRAWINGS

FIGS. 5 and 6 are side elevations showing a document feeder in operation of the apparatus of FIG. 1;

FIG. 7 is a side elevation showing a document pushing-up drive assembly of the document feeder;

FIG. 8 is a fragmentary perspective view of the document pushing-up assembly;

FIGS. 19B and 19C are diagrams illustrating different counts in a frame counter memory and processing for recording the on a film;

FIGS. 22 to 27 are flow charts of subroutines included in the main routine for processing inputs entered by the operation panel;

Figure 30:
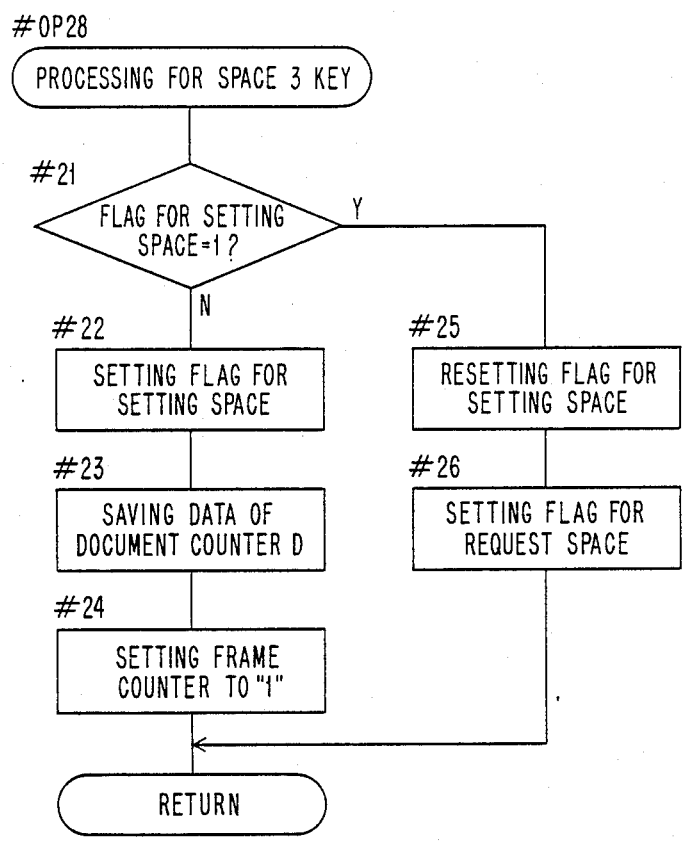
Figure 31:
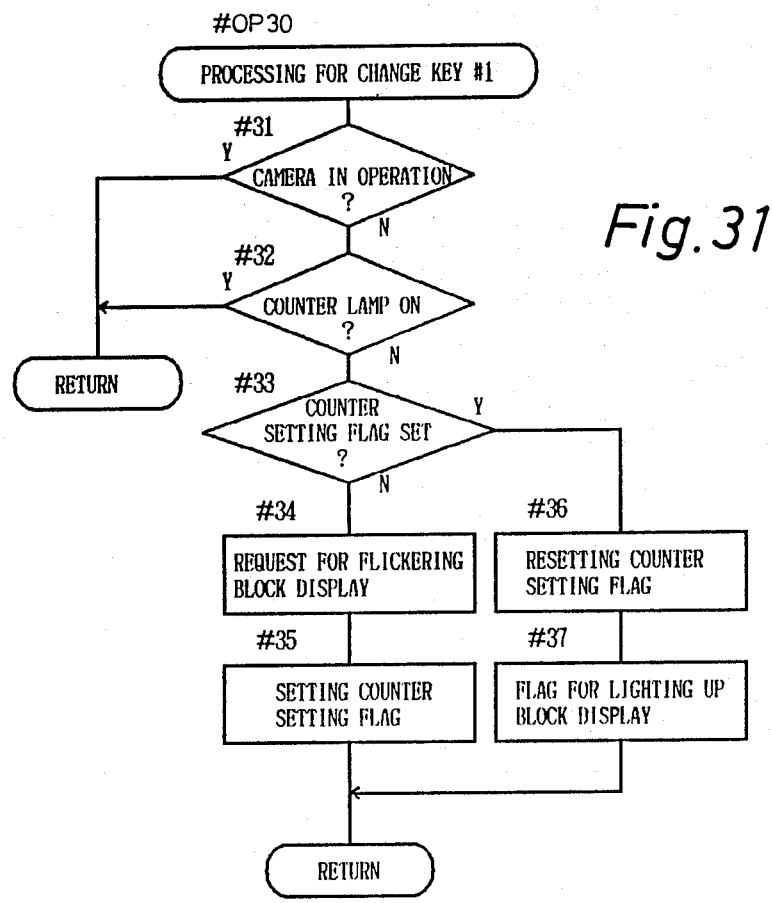
Figure 32:
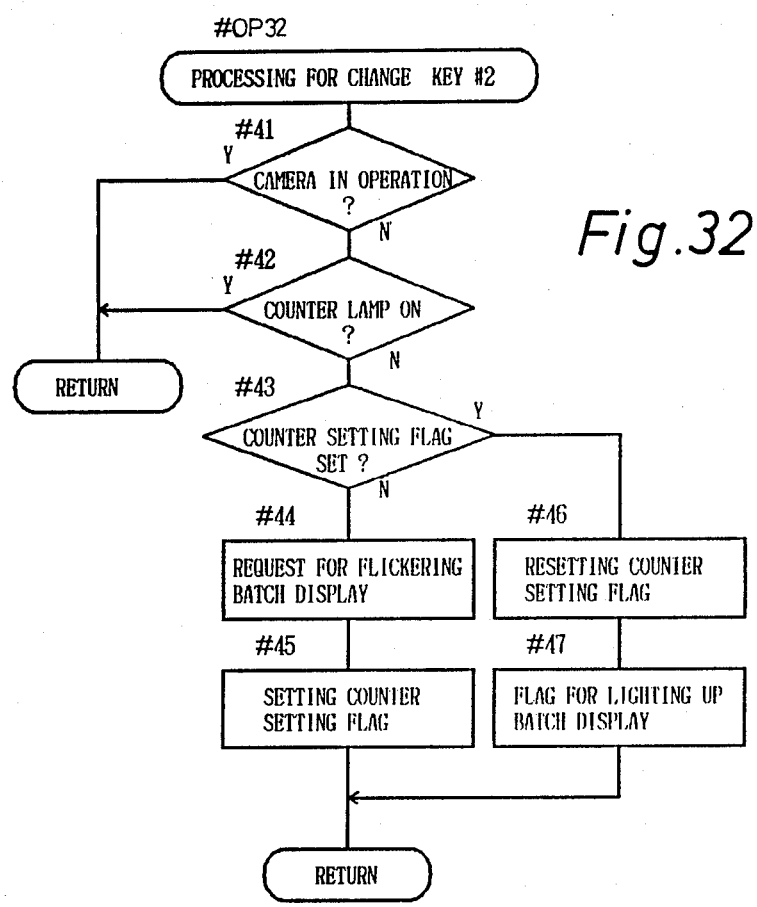
Figure 33:
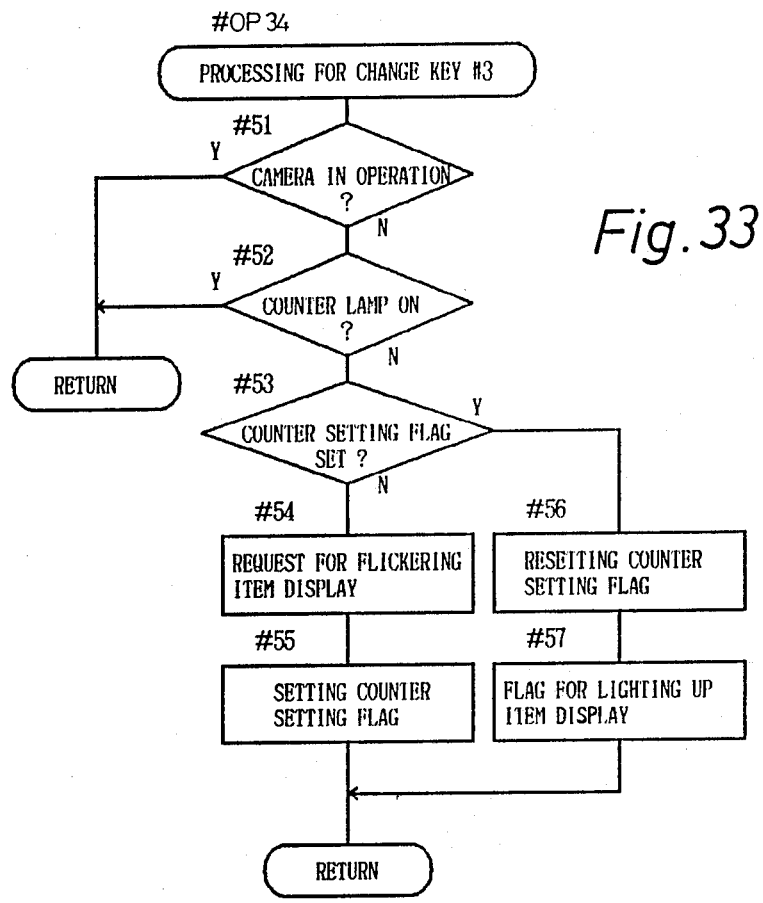
Figure 34:
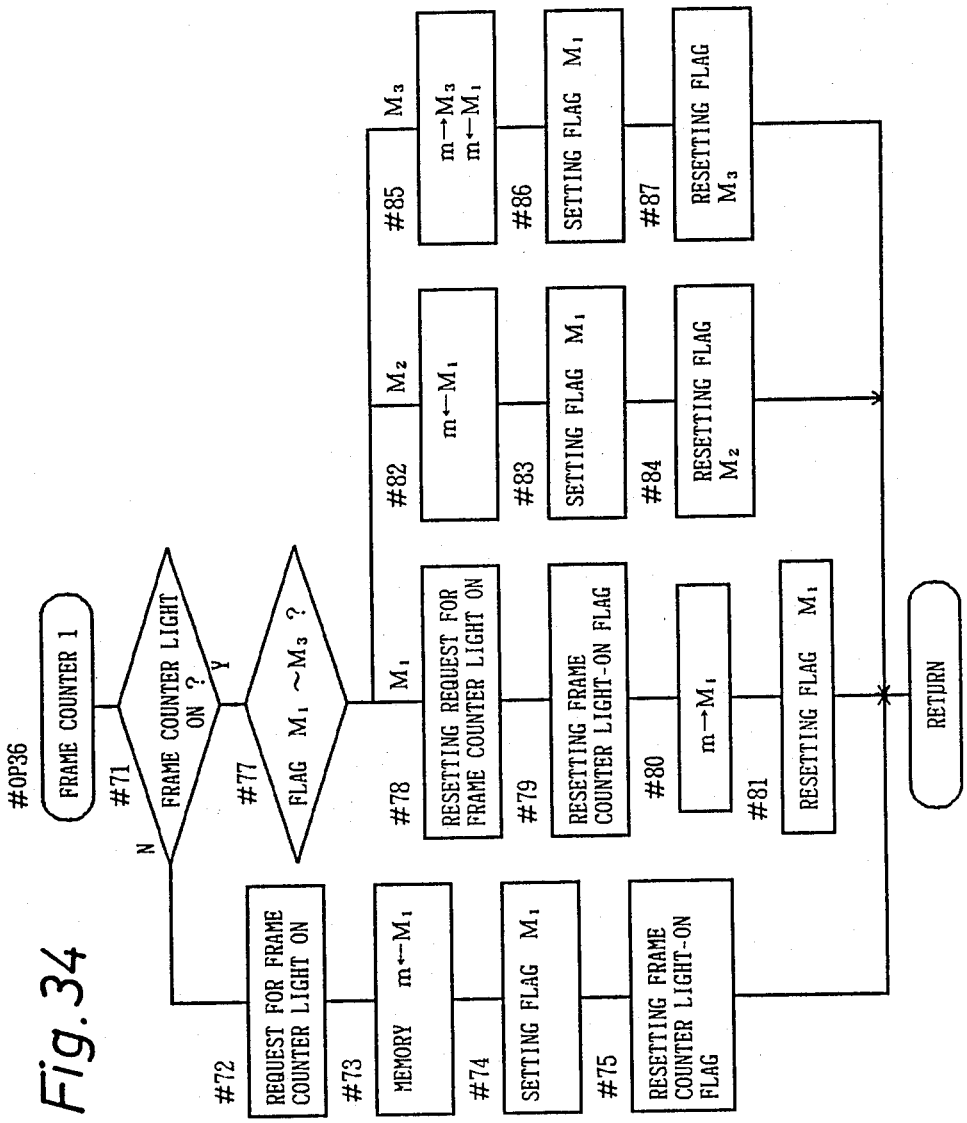
Figure 35:
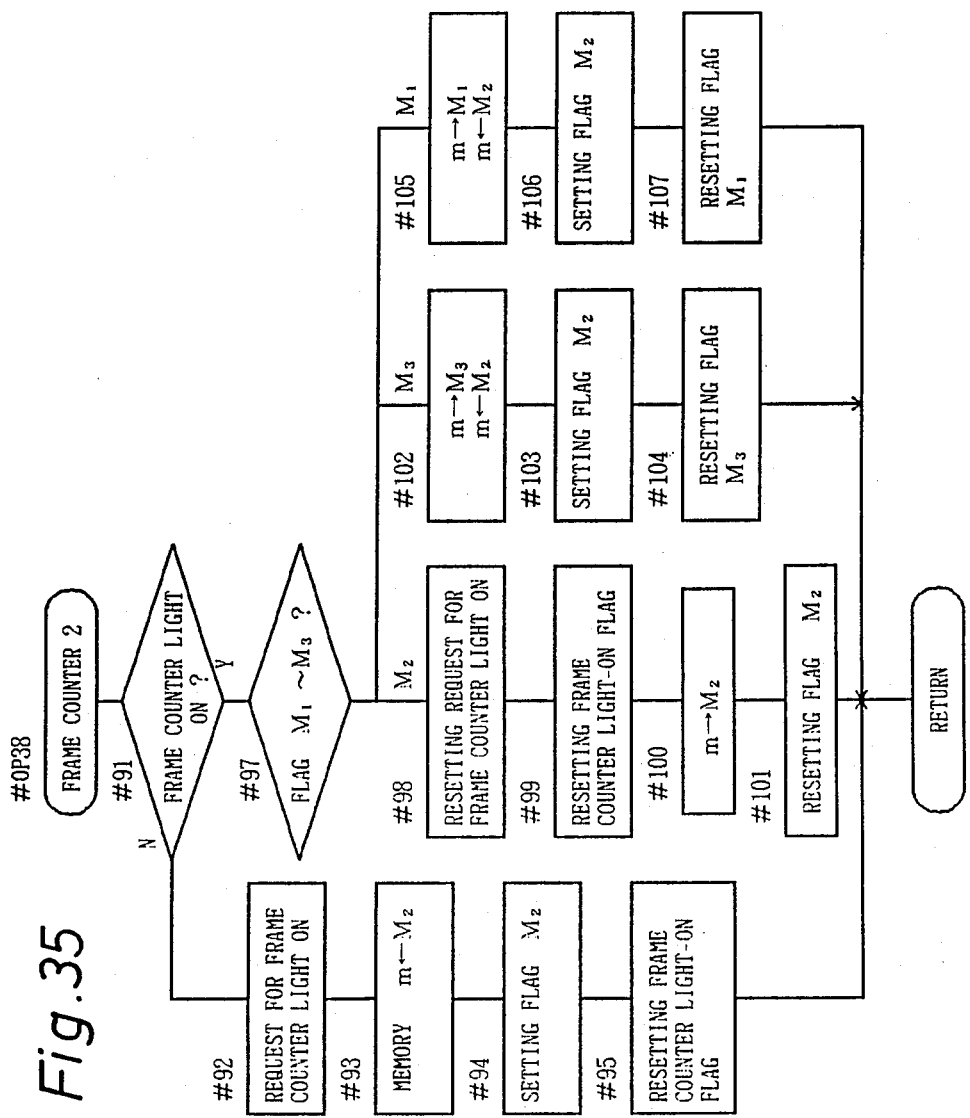
Figure 36:
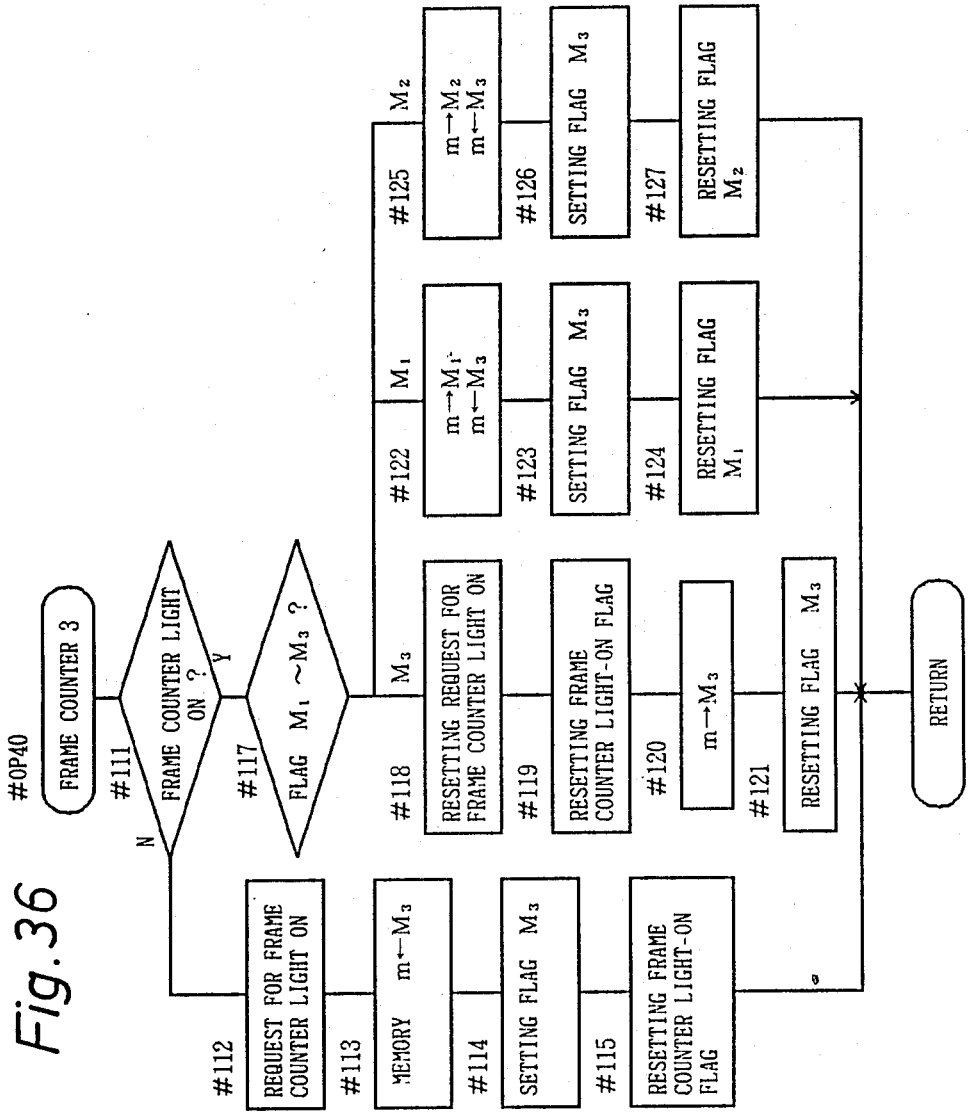
Figure 37:
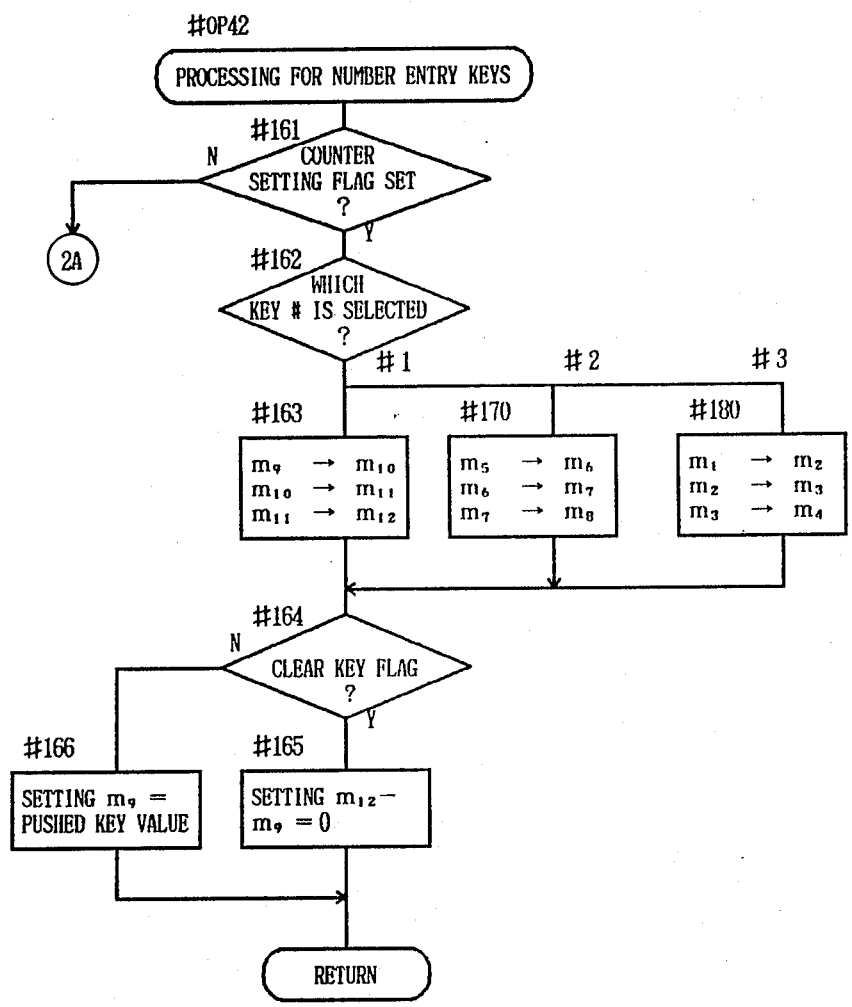
Figure 38:
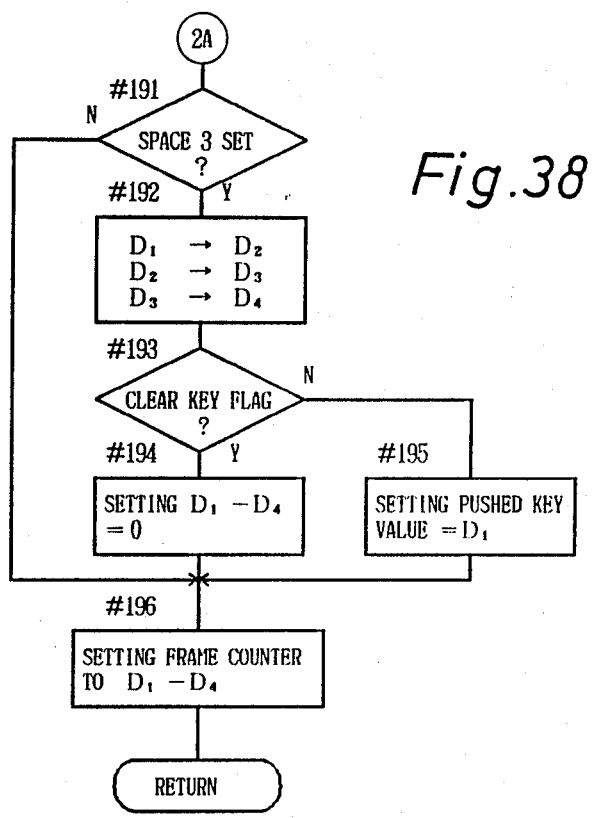
Figure 39:
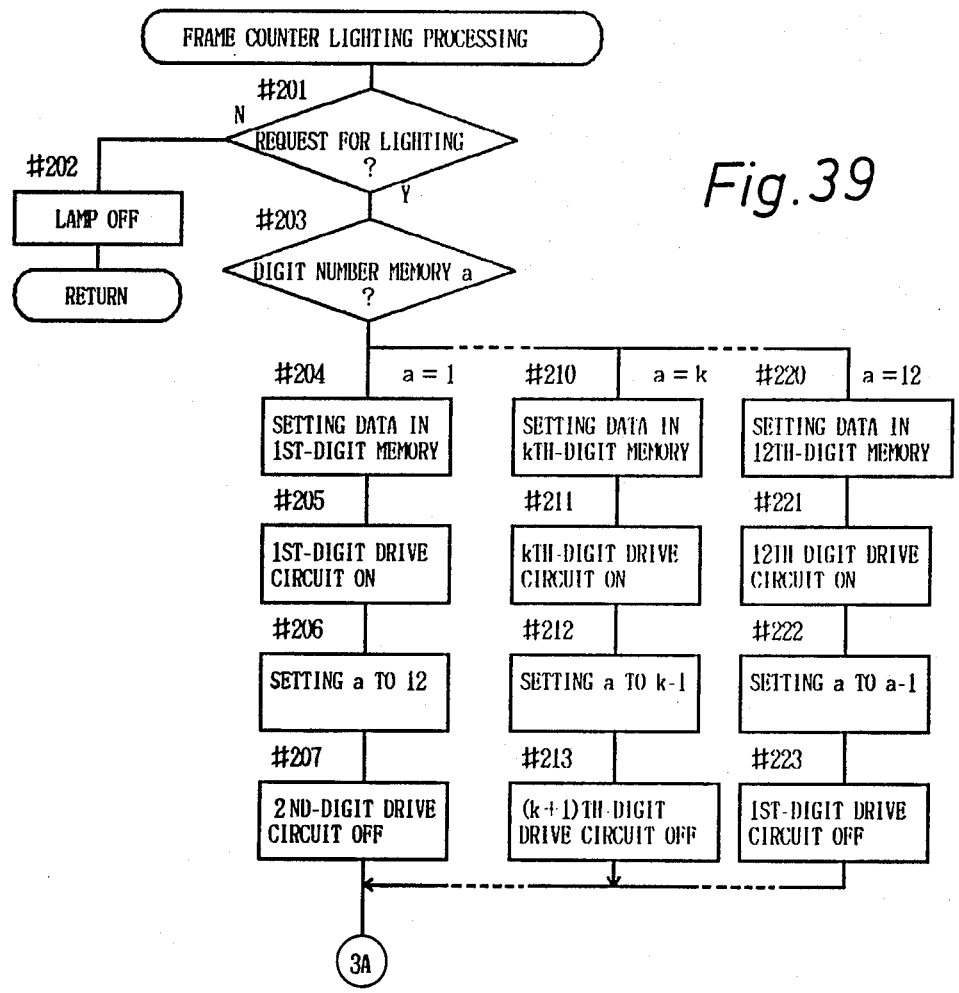
Figure 40:
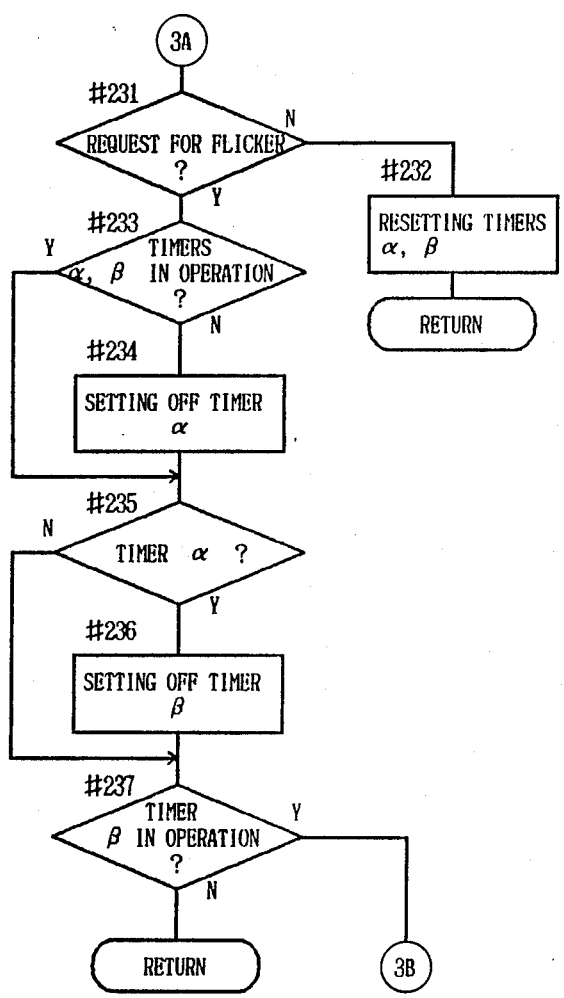
Figure 41:
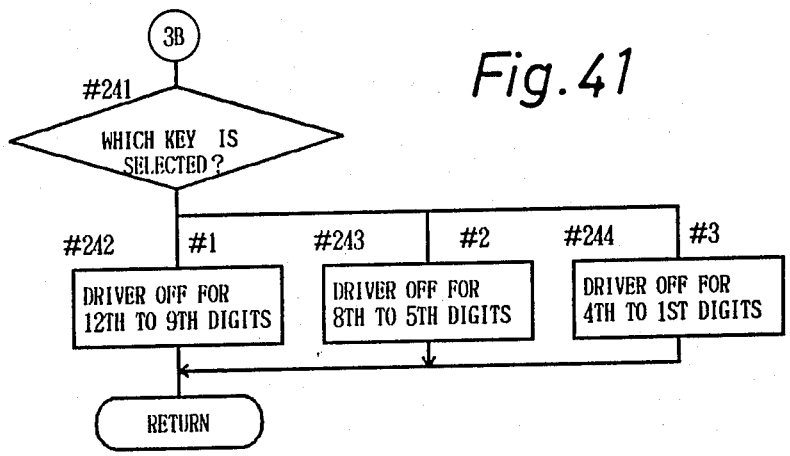
Figure 42:
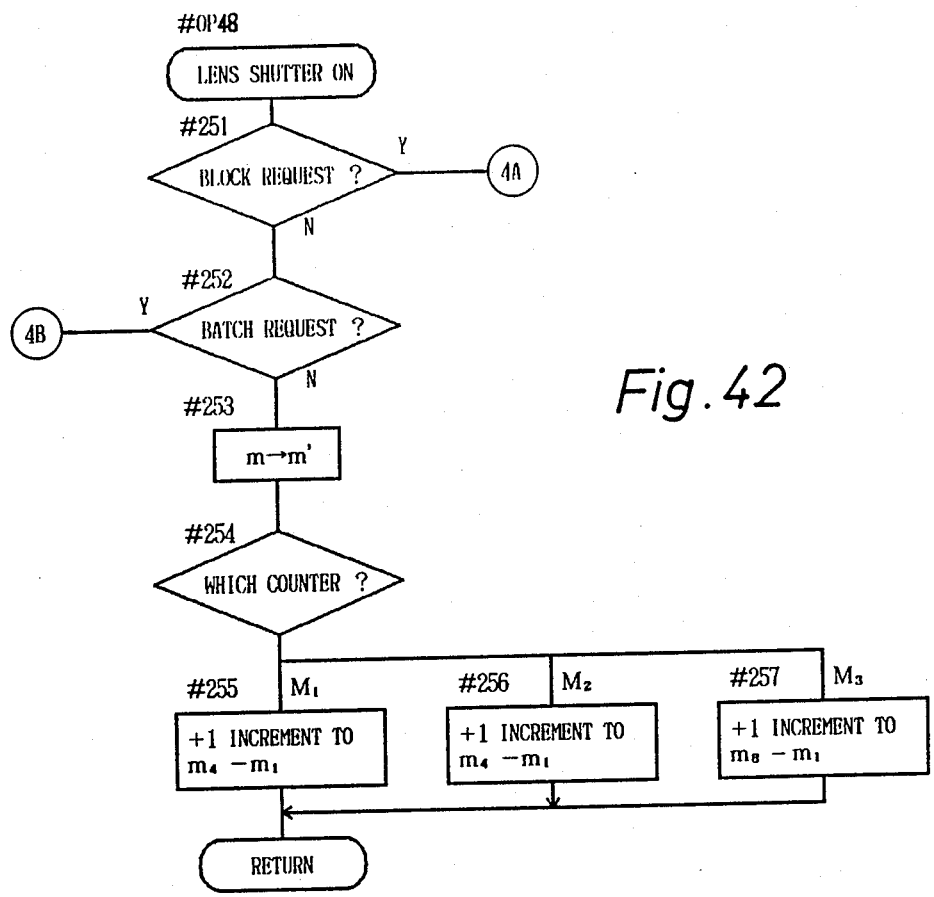
Figure 44:
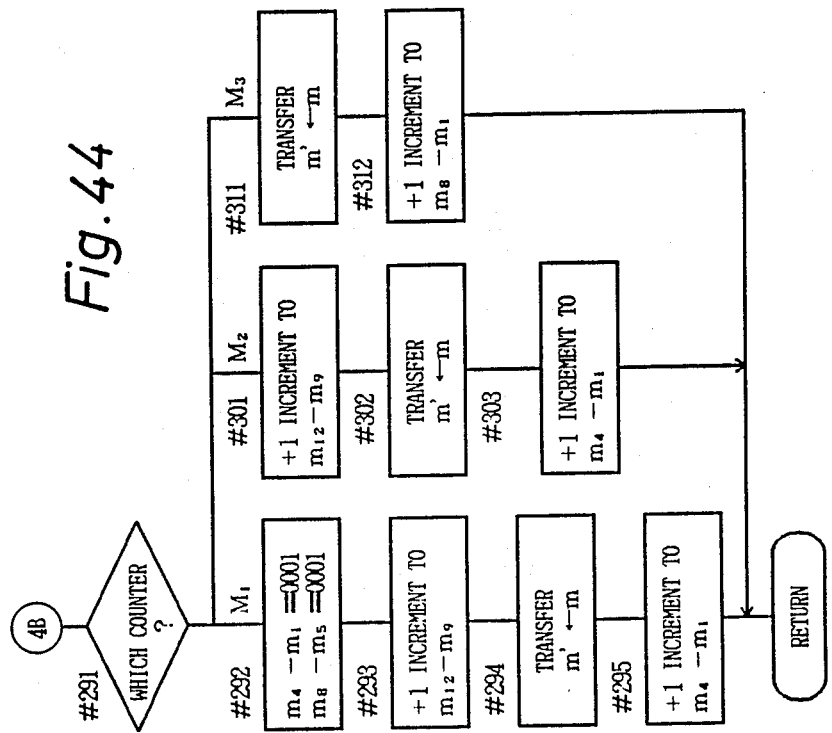
Figure 43:
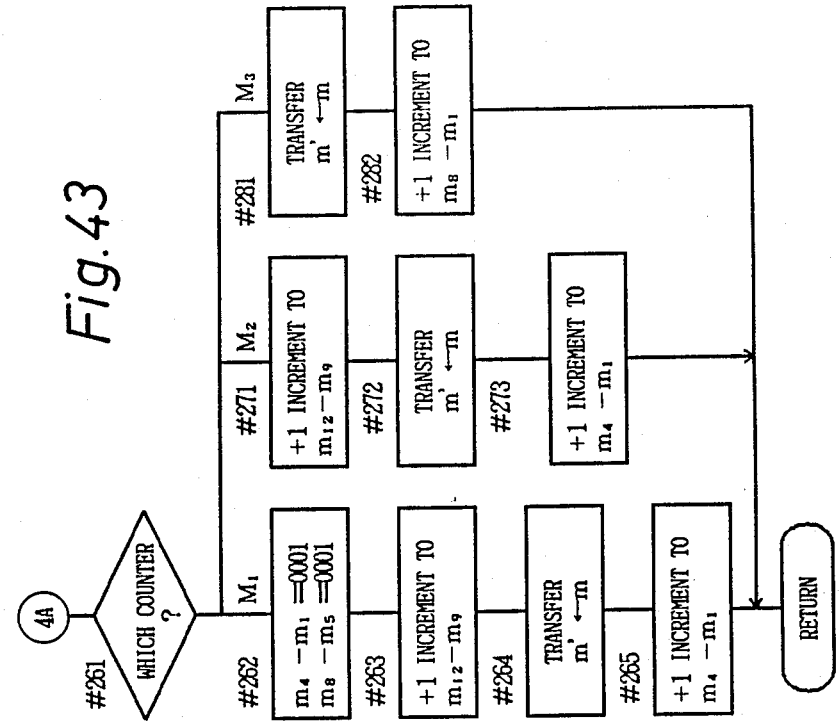
Figure 45:
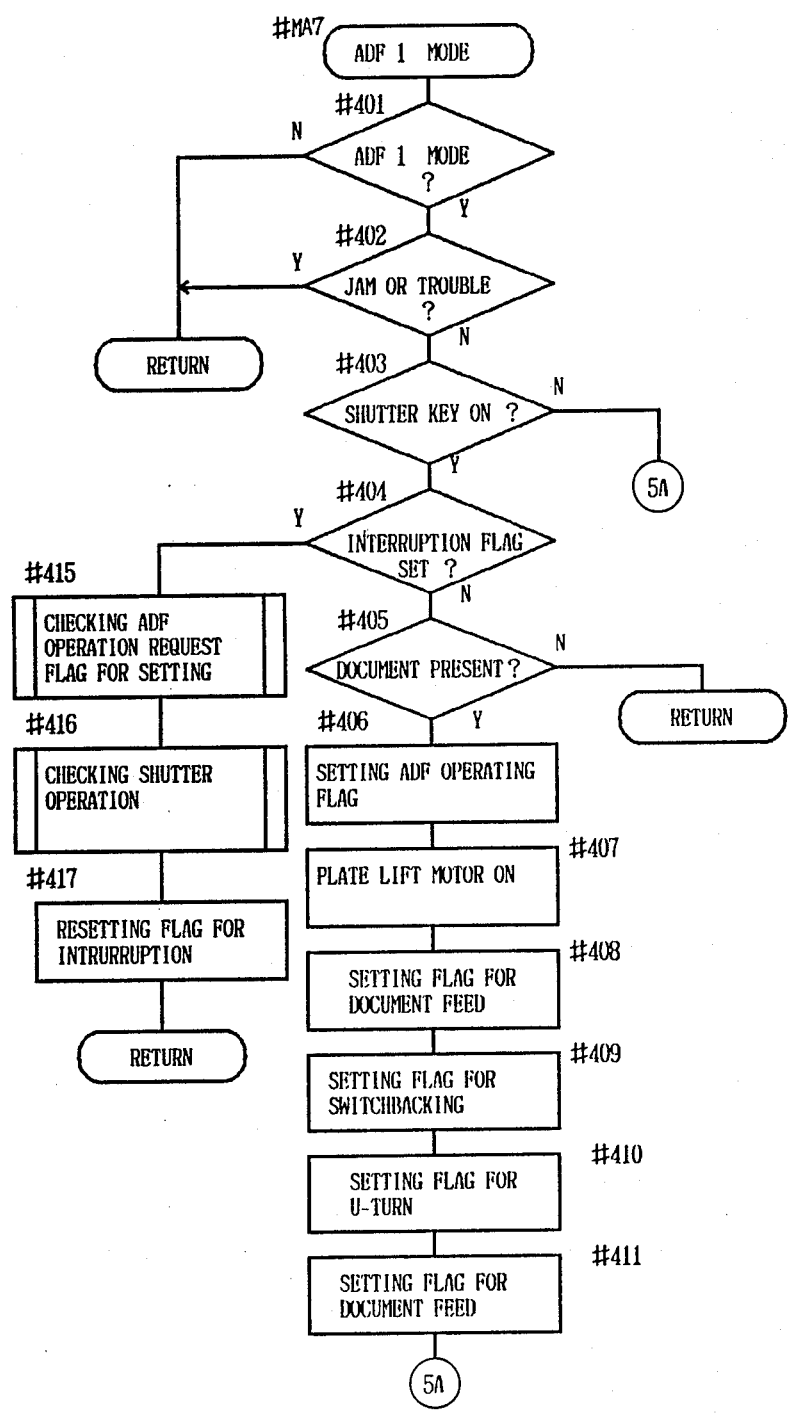
Figure 79:
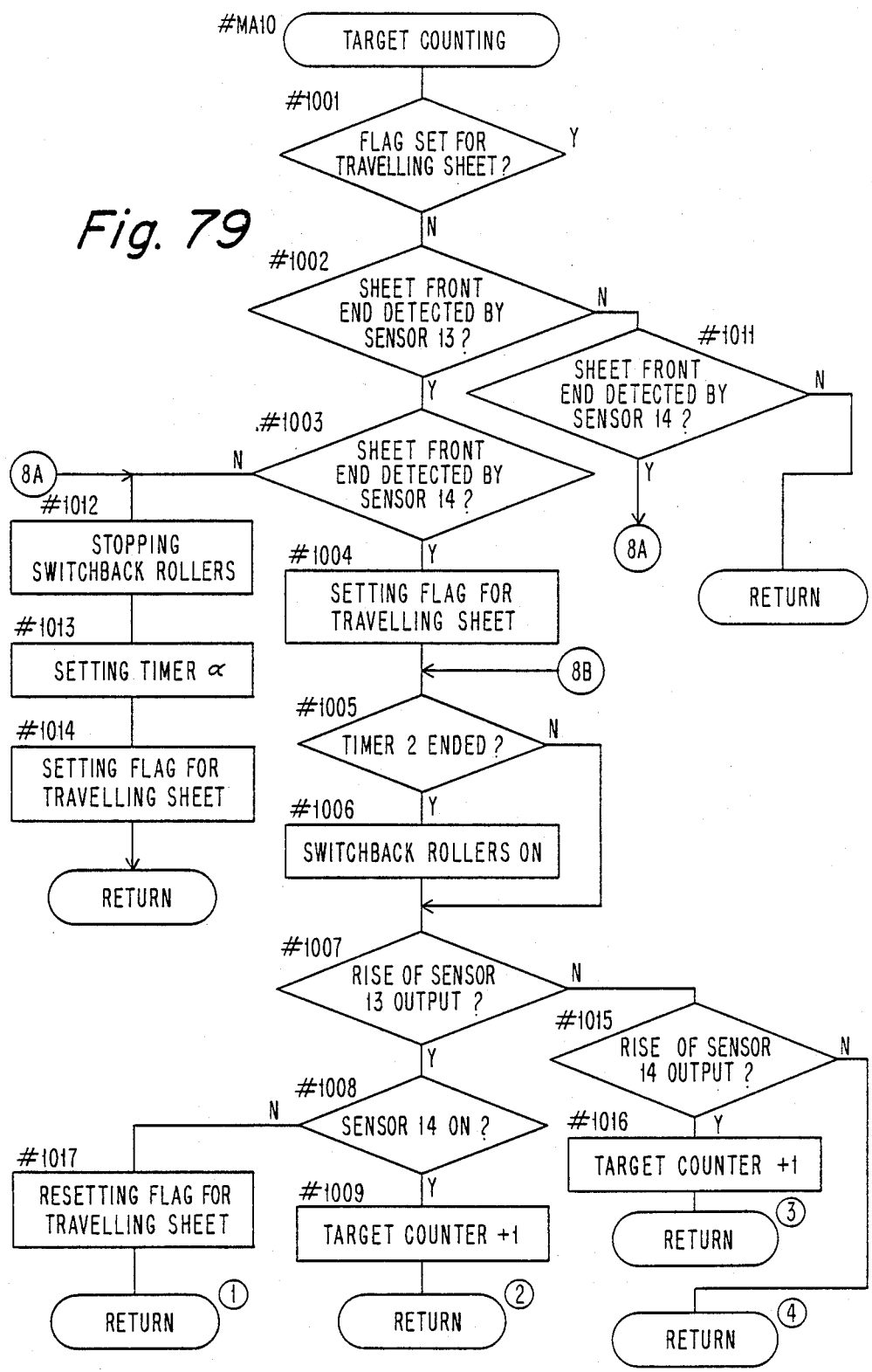
Figure 80:
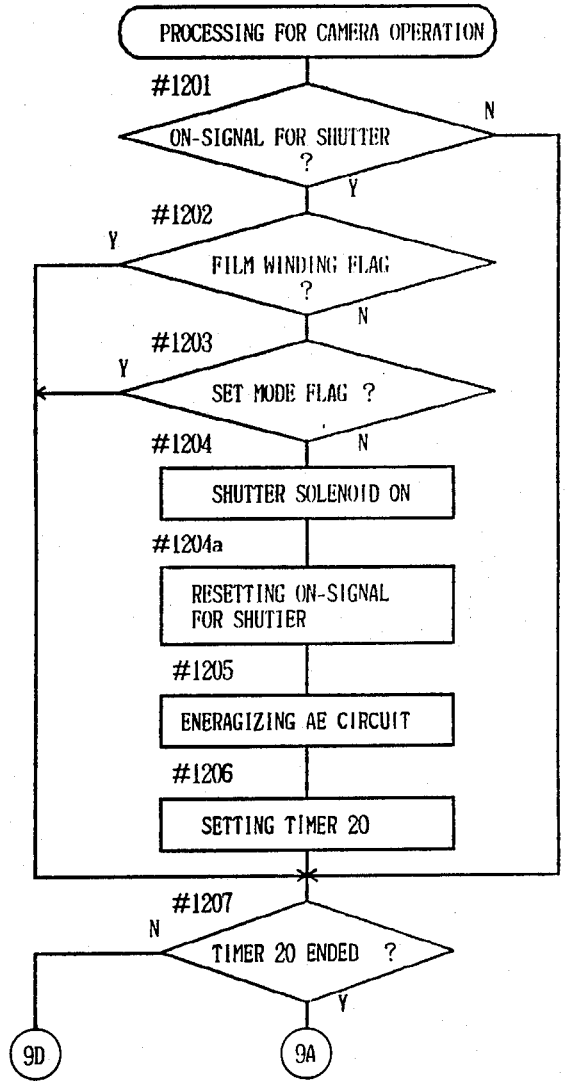
Figure 94:
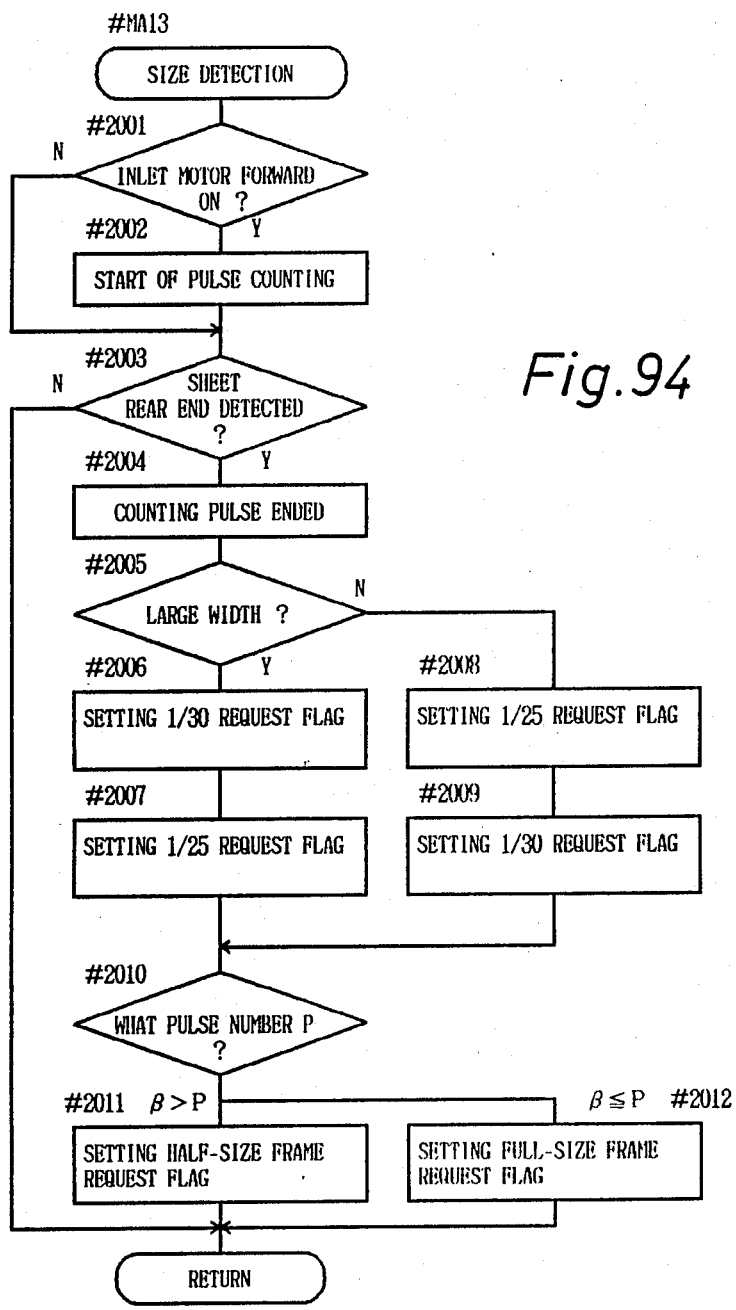
Figure 95:
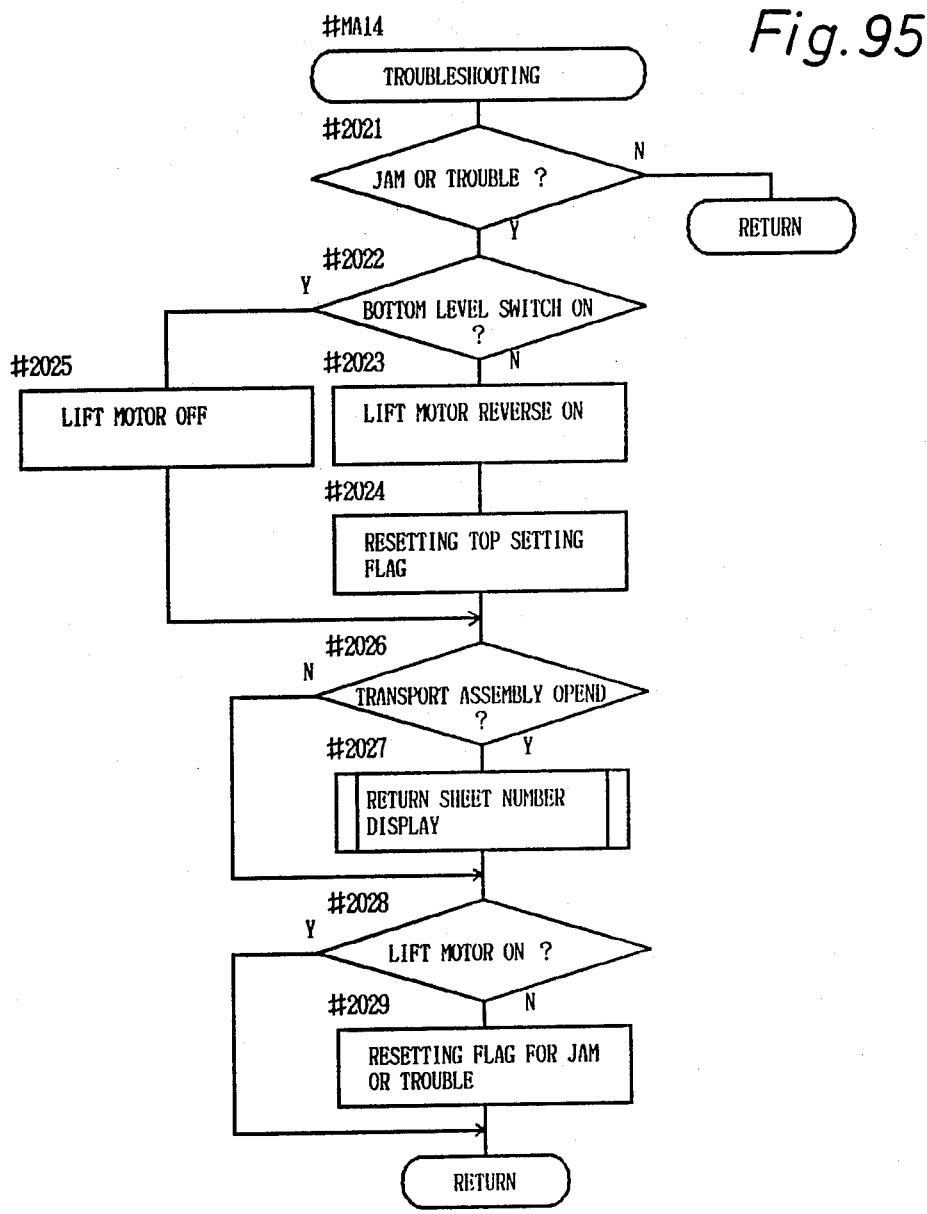

FIGS. 28 to 30 are flow charts showing some of the subroutines for processing inputs by a space 1 key, space 2 key and space 3 key;

FIGS. 31 to 33 are flow charts showing some of the subroutines for processing inputs by keys for changing block, batch and item displays;

FIGS. 34 to 36 are flow charts showing some of the subroutines for frame counters 1 to 3;

FIGS. 37 and 38 are flow charts showing one of the subroutines for processing numerical key inputs;

FIGS. 39 to 41 are flow charts showing one of the subroutines for lighting up the frame counters;

FIGS. 42 to 44 are flow charts showing one of the subroutines for a shutter;

FIGS. 45 to 58 are charts of an ADF1 mode processing subroutine included in the main routine;

FIGS. 59 to 70 are flow charts of an ADF2 mode processing subroutine included in the main routine;

FIGS. 71 to 78 are flow charts of a DF mode processing subroutine included in the main routine;

FIG. 79 is a flow chart of a target count processing subroutine included in the main routine;

FIGS. 80 to 93 are flow charts showing a camera operation in the main routine;

FIG. 94 is a flow chart of a size detection processing subroutine included in the main routine; and FIG. 95 is a flow chart of a trouble processing-subroutine included in the main routine.

DETAILED DESCRIPTION OF THE INVENTION

The present invention will be described below with reference to the illustrated embodiment.

Figure 1:
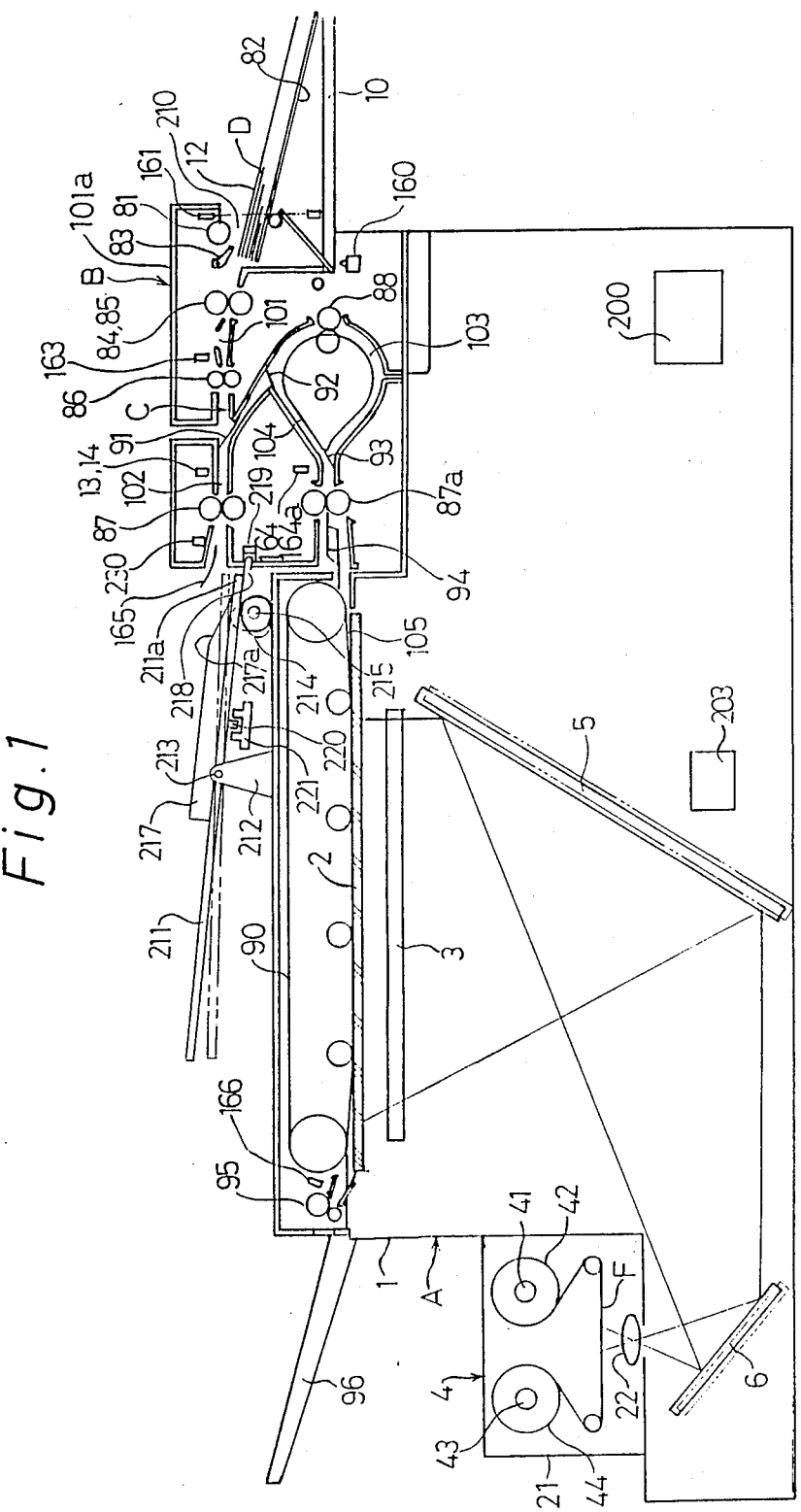
FIG. 1 is diagram in vertical section showing a microfilming apparatus embodying the invention.

FIG. 1 shows a microfilming apparatus A embodying the invention. The apparatus A has a glass platen 2 on the upper surface of its main body 1 for placing thereon a document sheet face down. The sheet is photographed from below while being illuminated by lamps 3 disposed under the platen 2 at opposite sides of the interior of the body 1, using a microfilming camera 4 provided at one end of the body 1 and mirrors 5 and 6 disposed inside the body 1.

To photograph a multiplicity of document sheets automatically in succession, a document feeder B is provided adjacent to one end of the platen 2. The sheets are transported one after another onto the glass platen 2 by the feeder B, which is controlled by a microcomputer 200 (FIGS. 1 and 17) in connection with the operation of the apparatus A.

Figure 10:
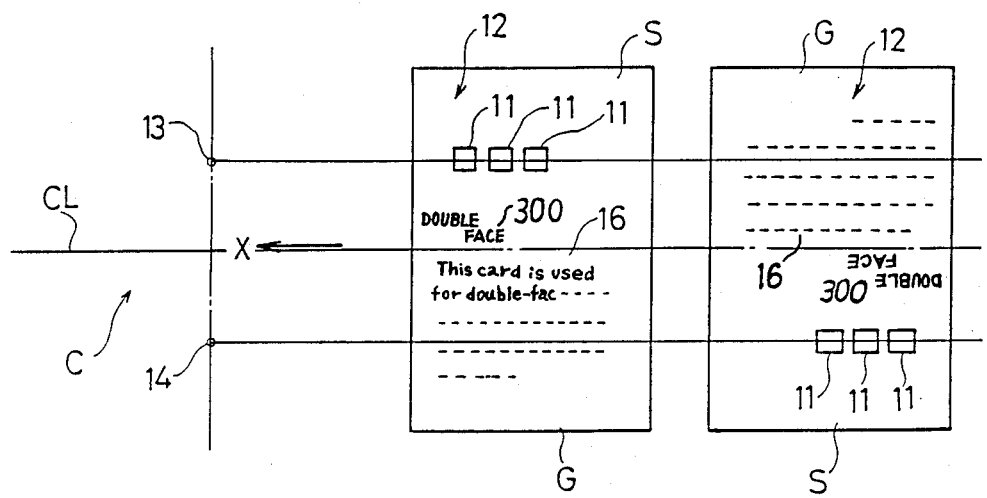
FIG. 10 is a plan view showing the relation between signal detecting sensors as arranged for a mode setting input card in a path of transport of document sheets and the orientation of the card in the path.

The document feeder B has a feed tray 10 at the right end of the body A for placing a stack of document sheets D thereon. The sheets D are placed on the tray 10 with a mode setting input card 12 placed on the stack. As seen in FIG. 10, the card 12 has data signal holes 11 representing information as to how the sheets D are to be handled for microfilming. The data represented by the holes 11 is automatically detected to photograph the subsequent documents sheets D in the manner specified by the detected data.

For different kinds of documents which are to be handled differently for photography, a mode setting input card 12 with signal holes 11 indicating the required handling data is placed on the top of document sheets D of each kind. Even when the sheets of the different documents are then set in place together and automatically fed, the different documents D each with an indefinite number of sheets can be photographed as handled in the required mode automatically set.

Different modes of handling document sheets D for photography include single-face microfilming, double-face microfilming, batch request or block request for counting up digits in upper positions of the frame counters to be described below, etc.

When the mode setting input card 12 is transported through a path C of transport of document sheets, the data as to such handling mode is automatically detected from the signal holes 11 by sensors 13, 14 on the path C.

With reference to FIG. 10, the top and bottom of the card 12 are indicated at S and G, respectively. The card is shown with its top-to-bottom direction positioned perpendicular to the direction X of transport of the card 12. The signal holes 11 are positioned closer to the top S, while printed on the card below the holes 11 are an indication 300 specifically showing the handling data represented by the holes 11, and a message 16 stating the handling mode shown by the indication 300 and how to use the card 12.

As seen in FIG. 10, the two sensors 13, 14 are disposed at the respective widthwise opposite sides of the transport path C. The sensor 13 is positioned as opposed to the passage of the signal holes 11 when the card 12 is transported with the top up in FIG. 10 (e.g. with the characters of the indication 300 in erect position in FIG. 10), while the other sensor 14 is disposed as opposed to the passage of the signal holes 11 when the card 12 is transported in an inverted position in FIG. 10.

Consequently, the sensors 12 are separately disposed at two locations on opposite sides of and at equal distances from the center line Cl of the transport path C so as to oppose the holes 11 in one portion of the card 12. Irrespective of whether the card 12 is transported in its erect position or inverted position, the signal holes 11 are detectable by one of the sensors 13, 14. Accordingly, when the card 12 is to be placed on the feed tray 10 along with the stack of sheets D, the card 12 can be in either one of the erect and inverted positions.

Figures 1, 81:
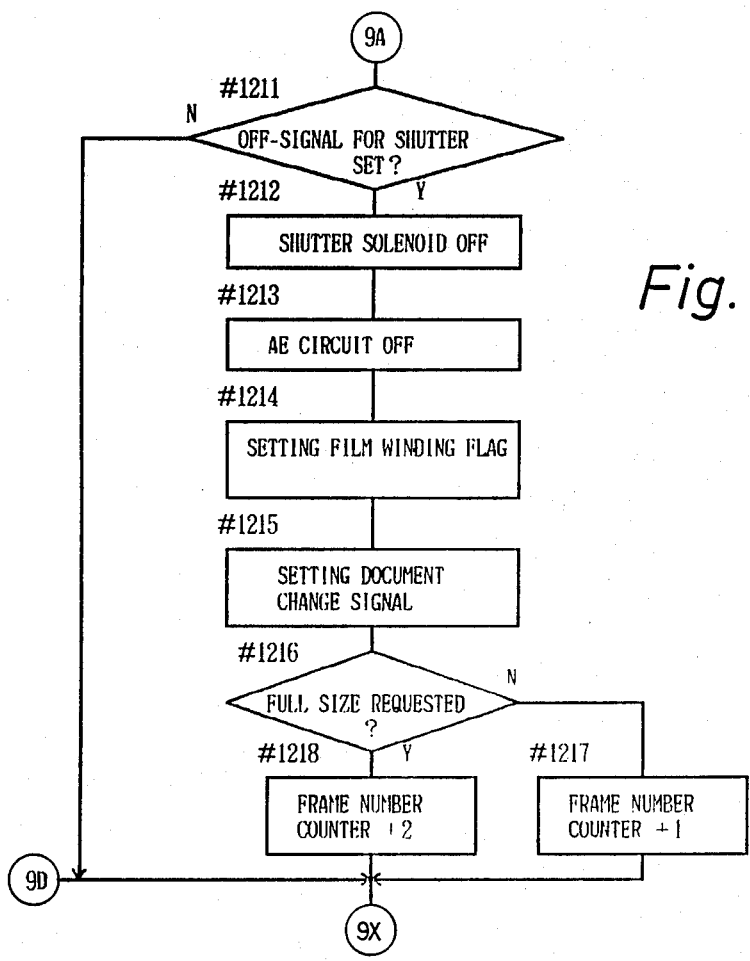
Figures 2, 81:
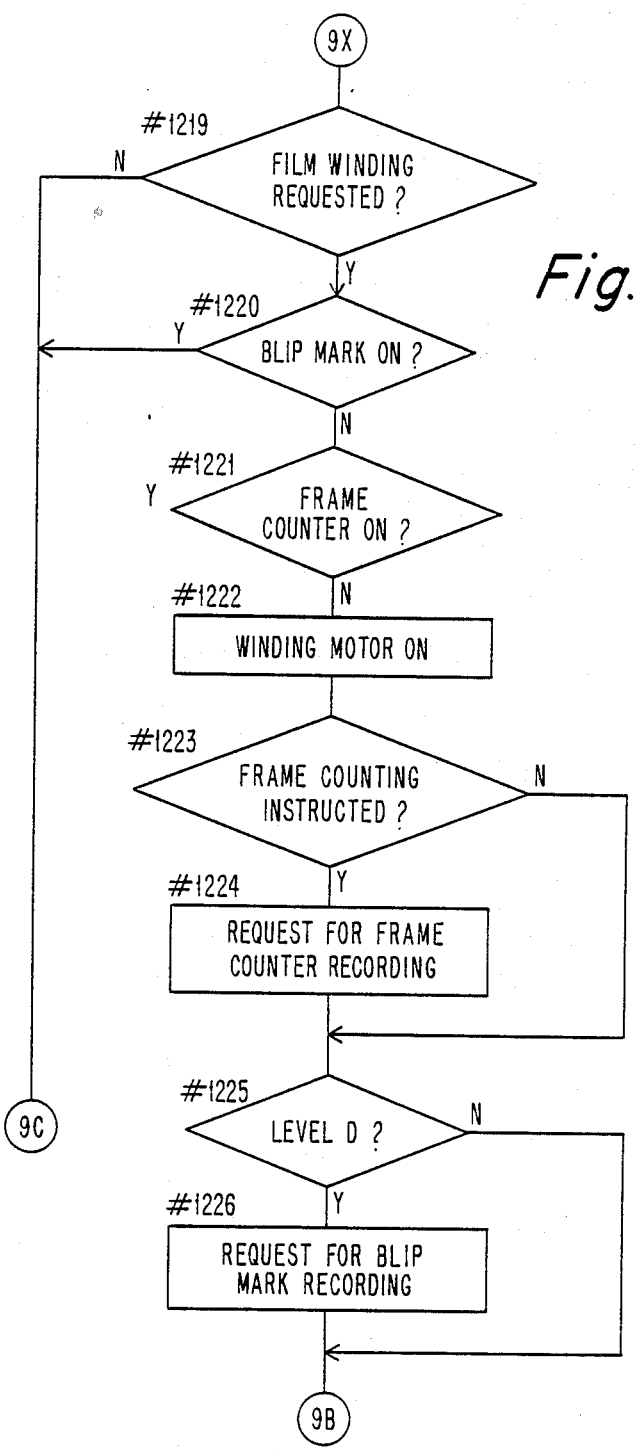
FIG. 2 is an enlarged sectional view of a microfilming camera in the apparatus of FIG. 1.
Figure 83:
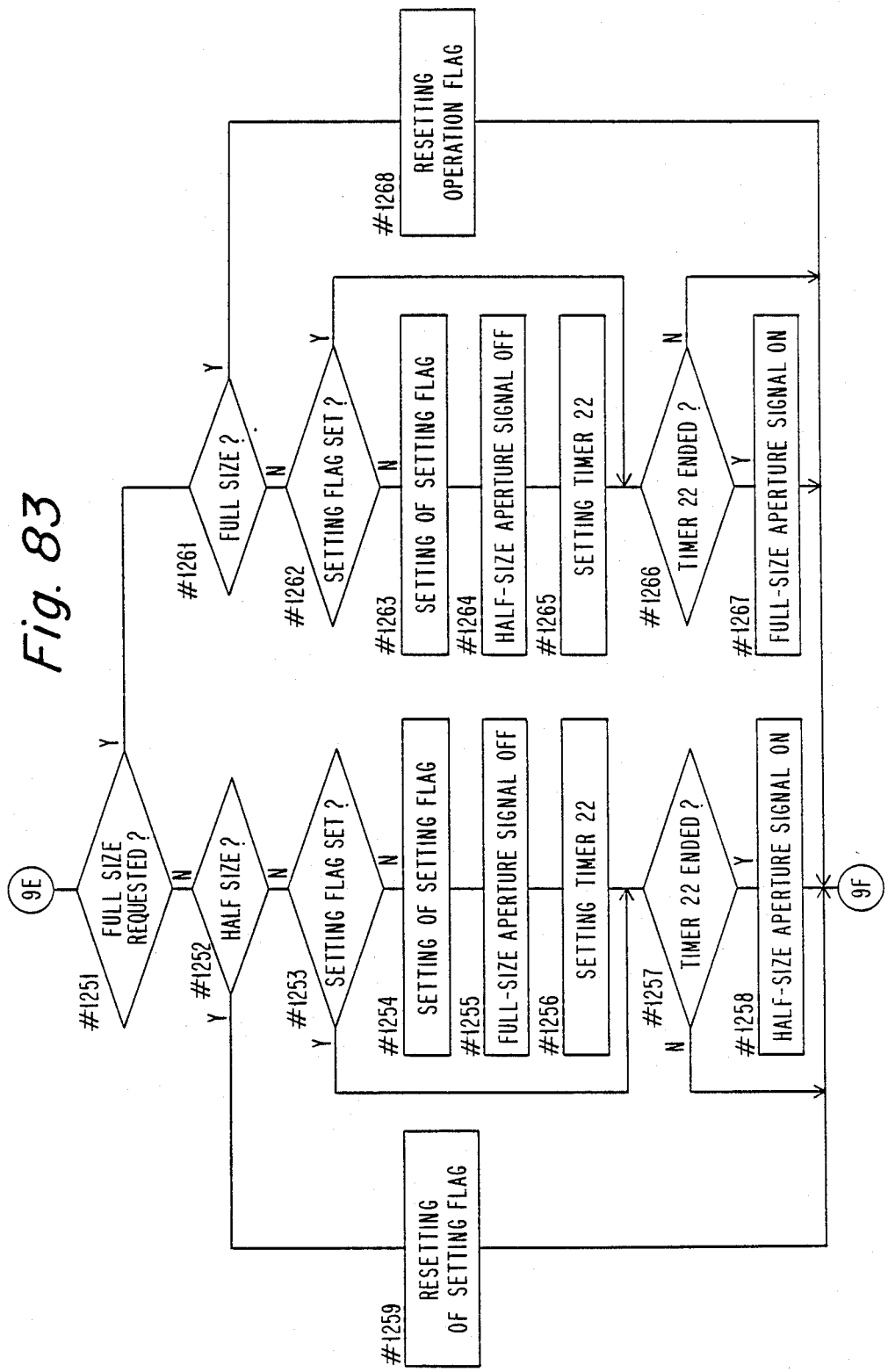

As shown in detail in FIG. 2, the microfilming camera 4 has a body 21 removably attached to the main body 1 of the apparatus A. In a lower central portion of the body 21, a photographic lens 22 and a shutter 168 are provided in the form of a single block, which is held by a focusing mechanism 23 on a support plate 20 within the body 21. Outside the support plate at the left of the lens 22, there is a light measuring portion 24 of automatic exposure means included in the microcomputer 200. Supported on a base plate 25 at the right side of the lens 22 are seven-segment 4-digit displays 201a, 201b, 201c for displaying the count value FC of 12-digit frame counters M1, M2, M3 (FIG. 17) to be described later and recording the value on microfilm F as shown in FIG. 18, and a blip mark LED array 26 for showing various blip marks, such as B1 to B3 shown in FIG. 18, and recording the marks on the film F. The frame counter displays 201a to 201c are adapted to give an indication in combination. Further disposed at the left of the light measuring portion 24 is a focus latching solenoid 27 coupled to the focusing mechanism 23.

The solenoid 27 drives the focusing mechanism 23 to give magnifications of 1/25 and 1/30 by adjusting the focus of the lens 22. With the focusing movement, the mirrors 5 and 6 are also shifted by a drive motor 203 (FIG. 1) to automatically give the optical path a length in conformity with the magnification.

When the widthwise size of the document sheet D in a direction perpendicular to the transport direction of the sheet is large, the mechanism 23 gives the reduced magnification of 1/30, and if the size is small, the magnification of 1/25.

Figure 3:
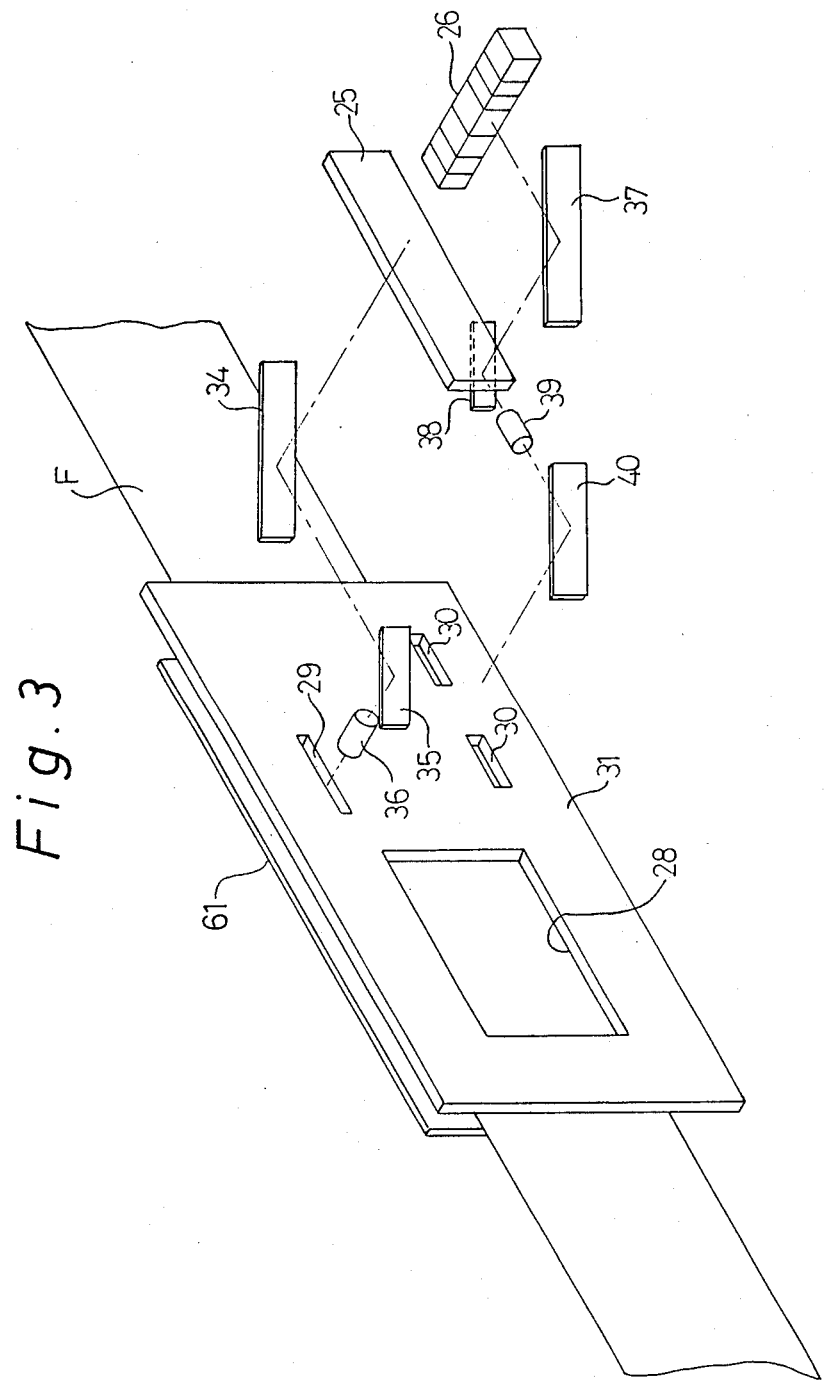
FIG. 3 is an enlarged perspective view showing an aperture portion and a data recording assembly of the camera of FIG. 2.

Provided inwardly of the support plate 20 is a camera aperture plate 31 which, as seen in FIG. 3, has a camera aperture 28, a data recording window 29 for passing therethrough the light from the displays 201a to 201c, and a data recording window 30 for the blip mark LED array 26.

The aperture 28 is provided with an aperture adjusting plate 32 for removably covering one-half of the aperture to give microfilm frames of half size or full size. The plate 32 is coupled to an aperture latching solenoid 33 and thereby movable to selectively give one of the two sizes.

Thus, the solenoid 33 is selectively so operated as to provide the full size when the document sheet D has a large length in the direction of sheet transport, or the halft size if the sheet has a small length.

With reference to FIGS. 2 and 3, the data from the displays 201a to 201c is led through the window 29 via mirrors 34, 35 and a recording lens 36, and the data from the array 26 through the window 30 via mirrors 37, 38, a recording lens 39 and a mirror 40, whereupon the items of data are recorded on the film F on the rear side of the aperture plate 31.

With reference to FIG. 2, the film F extends from a supply reel 44 on a supply shaft 43 to a take-up reel 42 on a take-up shaft 41 and is wound up on the take-up reel 42 frame by frame by being passed along the rear side of the aperture plate 31. The plate 31 is provided at its apertured portion 28 with a pressure plate 61 for holding the film F in pressing contact with the rear side of the plate 31 to accurately position the film.

When passing along the rear side of the aperture plate 31, the film F is guided by a guide roller 45 close to the supply reel 44 and a guide roller 46 close to the take-up reel 42. A pressure roller 47 is pressed against the guide roller 45 to nip the film F therebetween to prevent the film F from loosening on the supply reel side.

Figure 4:
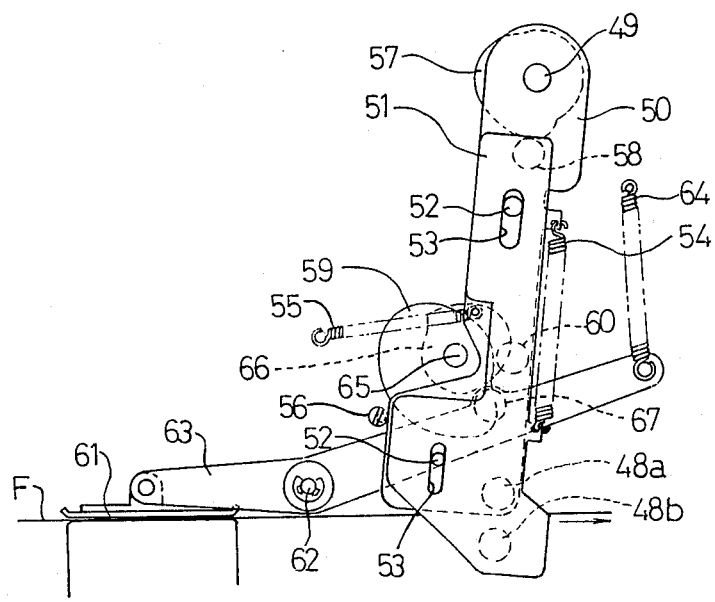
FIG. 4 is an enlarged side elevation of a film transport assembly included in the camera of FIG. 2.

As seen in FIGS. 2 and 4, a pair of film transport rollers 48a, 48b is provided upstream from the guide roller 46 with respect to the direction of film transport for forwarding the film a specified length at a time in nipping contact therewith. With reference to FIG. 4, the roller 48a serving to support the film F is mounted on the lower end of a film transport lever 50 supported at its upper end by a pivot 49. The other roller 48b, serving as a film press roller, is mounted on the lower end of a film holding plate 51 supported on the lever 50.

The holding plate 51 is vertically slidable on the transport lever 50 and retained and guided by a pin 52 engaged in a slot 53 so as to be movable with the transport lever 50. The plate 51 is biased upward by a spring 54 acting between the plate 51 and the lever 50. The transport lever 50 is biased to return to its initial position, shown in FIG. 4, where it is in contact with an eccentric pin 56, under the action of a spring 55. A film nipping control cam 57 is mounted on the pivot 49 supporting the lever 50. The upwardly biased holding plate 51 is provided at its upper end with a cam follower 58, which is held in pressing contact with the cam 57 by the spring 54. Accordingly, the control cam 57, when drivingly rotated, suitably moves the film holding plate 51 upward and downward through the cam follower 58. The film press roller 48b, which is biased by the spring 54, is brought into or out of pressing contact with the film support roller 48a by this movement of the holding plate 51.

A film transport control cam 59 is provided at one side of an intermediate portion of the film transport lever 50. A cam follower 60 on the lever 50 is biased into pressing contact with the cam 59 by the spring 55. The cam 59, when drivingly rotated, therefore causes the cam follower 60 to move the lever 50 about the pivot 49. The pivotal movement of the lever 50 reciprocatingly moves the pair of transport rollers 48a, 48b rightward and leftward.

The transport control cam 59 is rotated in synchronism with the nipping control cam 57, whereby the transport lever 50 is pivotally moved from its initial position of FIG. 4 rightward by a specified amount while the press roller 48b is pressed against the support roller 48a. Consequently, the film F is forwarded in the direction of arrows shown in FIGS. 2 and 4 by the resulting movement of the pair of rollers 48a, 48b. The initial position of the lever 50 is finely adjustable by rotating the eccentric pin 56, thereby correspondingly varying the film transport stroke of the lever 50 to finely adjust the amount of film transport.

As shown in FIG. 4, the pressure plate 61 is pivoted to one end of a film press lever 63 supported at an intermediate portion thereof by a pin 62 and biased counterclockwise by a spring 64, which therefore causes the pressure plate 61 to press the film F into contact with the aperture plate 31 The press lever 63 has a cam follower 63 positioned close to the cam follower 60 and pressed by the spring 64 into contact with a film contact control cam 66 mounted on the same shaft 65 as the transport control cam 59. The rotation of the contact control cam 66 with the transport control cam 59 lifts the pressure plate 61 off the film F against the spring 64 when the film F is transported as above so as not to impede the transport of the film F.

The amount of transport of one frame of the film F is made to correspond to the half size, so that for full-size photography, the film F is repeatedly transported twice by an amount corresponding to two frames of half size. The film F is wound up on the take-up reel 42 by the transported amount.

With reference to FIGS. 1 and 5, the document feeder B includes a sheet feed roller 81 disposed above the document feed tray 10, and a pushing-up plate 82 on the bottom of the tray 10. For sheet feeding, the plate 82 is raised until the top of a stack of document sheets D is detected by a top sensor 83 having an actuator, and the feed roller 81 is cause to fall on the stack as by an unillustrated pick-up solenoid and intermittently driven, whereby the sheets D are sent out one after another from the uppermost position. The plate 82 is moved upward or downward by upwardly or downwardly driving a lever 98 on a rod 97 by a motor 99 via a train of gears 100 as shown in FIGS. 5 to 8. The plate 82 as positioned for feeding the sheets D from the pushed-up position is detected by whether the lever 98 is in its lowered position in pressing contact with a bottom switch 160.

To assure that the sheets will be sent out one by one, there is provided immediately adjacent the feed roller 81 a pair of upper and lower separating rollers, i.e. forwardly rotatable roller 84 and reversely rotatable roller 85, which is driven with the roller 81. Even if more than one sheet D is sent out by the feed roller 81, the upper roller 84 acts only on the uppermost sheet D to send out this sheet, while the underlying sheet or sheets are restrained or slightly retracted by the lower reverse roller 85. Consequently, the sheets D can be sent out one by one stably.

The feed tray 10 is provided thereabove with a document sensor 161 for detecting whether the tray is empty. The sensor 161 comprises a light projector and a photodetector in combination for checking whether the light from the projector is blocked by the sheet D. If there is no sheet blocking the light, the sensor detects that the tray 10 is empty.

With reference to FIG. 1, the document transport path C comprises first to fifth passages 101 to 105. The first passage 101 extends forward from the pushing-up plate 52 in the feed position and has the pair of separating rollers 84, 85 and a pair of register rollers 86 ahead thereof. The second passage 102 extends from the first passage 101, has a pair of switchback rollers 87 at an intermediate portion thereof and serves as a switchback passage. The third passage 103 is connected to the front end of the second passage 102, which therefore bifurcating into the first and third passages for the third passage 103 to accept the sheet D on switchbacking. The third passage 103 has a pair of U-turn rollers 88 at an intermediate portion and a pair of inlet rollers 87a and is curved to form a U-turn path of transport of the sheet D extending toward the glass platen 2. At a position in front of the inlet rollers 87a, the third passage 103 reversely branches out into the fourth passage 104, which is joined to the third passage 1103 again at a position upstream from the U-turn rollers 88. Thus, the fourth passage 104 serves as a sheet inverting passage for accepting the sheet D to be reversely transported from the position on the glass platen 2 after single-face photography and returning the sheet as turned upside down to the third passage 103 for double-face photography. The fifth passage 105 is continuous with the inlet of the third passage 103 and is provided by the glass platen 2 and a conveyor belt 90 thereon.

The first and second passages 101, 102 respectively have an ADF opening 210 and a DF opening 165 which are open to the outside, are continuous and aligned with each other and provide a sheet accepting transport path for the third passage 103 when the passage 103 serves as a delivery path.

The junctions between the passages 101 to 105 are provided with guide members 91, 92 and 93 of elastic resin film (trade name, Mylar) and a deflecting pawl 94 for guiding the sheet D only toward a predetermined direction. These members and pawl guide the sheet D from one of the passages 101 to 105 into another one of them to specify the direction of its advance.

A pair of sheet discharge rollers 95 is disposed ahead of the fifth passage 105, whereby the sheet D sent out from the passage 105 is delivered onto a discharge tray 96 beside the main body 1.

Figure 9:
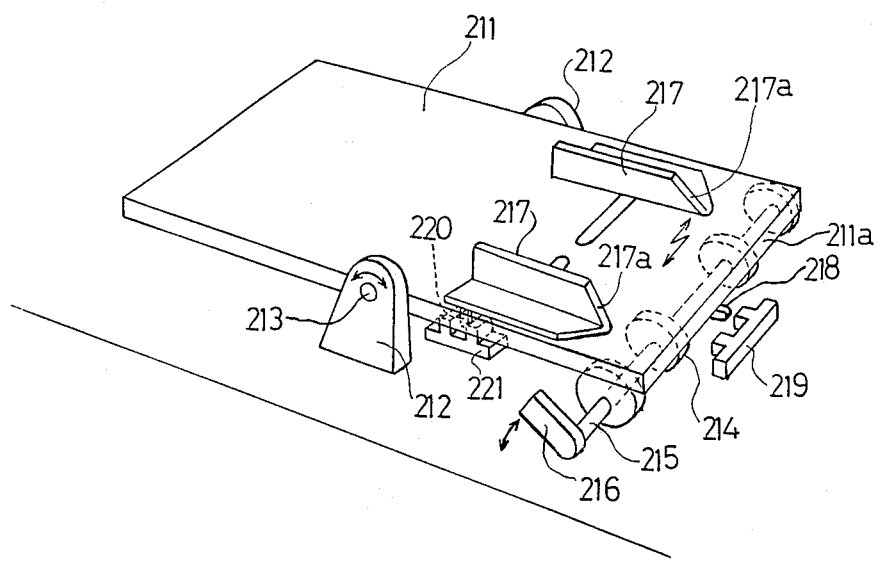
FIG. 9 is a perspective view showing a manual insertion document guide table of another document feeder.

With reference to FIGS. 1 and 9, a guide table 211 is disposed outside the DF opening 165 for guiding the sheet D when it is inserted into or sent out from the opening 165. As illustrated, the table 211 is supported at each side of an intermediate portion thereof by a pivot 213 on a bracket 212. One end 211a of the table 211 adjacent to the DF opening 165 is movable to a solidline position which is lower than the level of the opening defining lower edge or to a phantom-line position higher than the level.

The guide table 211 is biased by an unillustrated spring clockwise into pressing contact with a position change cam 214 on a shaft 215 having a shift lever 216 at its one end. The cam 214, when rotated by the lever 216, shifts the guide table 211 between the lower-position and the higher position. A pair of opposed guides 217 for positioning sheets on the guide table 211 at its center are provided on the table 211 and are movable together perpendicular to the direction of insertion or delivery of the sheet.

The table end 211a has a light blocking piece 218. The table 211 in the low or high position is detectable depending on whether a sensor 219 detects the light blocking piece 218. The guide 217 is also provided with a light blocking piece 220 projecting below the table 211. Whether the guides 217 are in the outermost position is detectable depending on whether the piece 220 is detected by a sensor 221.

Depending on whether the document D is singlefaced or double-faced, the document transport path C handles the document sheet in the corresponding one of different modes for feeding and discharging so that the document can be microfilmed satisfactorily in each case and subsequently handled conveniently.

This will be described with reference to FIGS. 12 to 15. As indicated by solid-line arrows in FIG. 12, a single-faced document sheet D is sent into the second passage 102 through the first passage 101, whereupon the sheet is reversely advanced, with its rear end positioned as the front end, from the second passage 102 into the U-turn third passage 103, then guided into the fifth passage 105 on the platen 2 and thereafter photographed. Subsequently, the sheet is delivered onto the discharge tray 96 as it is as indicated by a broken-line arrow.

Thus, the sheet D placed on the feed tray 10 face up has its surface photographed in the inverted position and is thereafter placed on the tray 96 as it is, i.e., face down. The sheets D subsequently photographed are similarly handled and stacked up on the tray 96 in the original orientation and order relative to one another.

Figure 13:
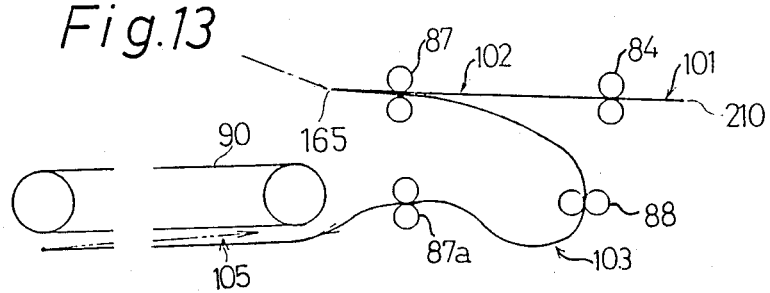

On the other hand, a double-faced sheet D is sent into the fifth passage 105 and has its one face photographed in the same manner as the single-faced sheet as seen in FIG. 13. To photograph the other face, the sheet D is then reversely transported from the fifth passage 105 into the fourth passage 104 and returned to the U-turn third passage 103 as turned upside down as indicated by phantom-line arrows in FIGS. 13 and 14. The inverted sheet D is then led into the fifth passage 105 again, positioned on the platen 2 rear face down and has its rear surface photographed.

Figure 14:
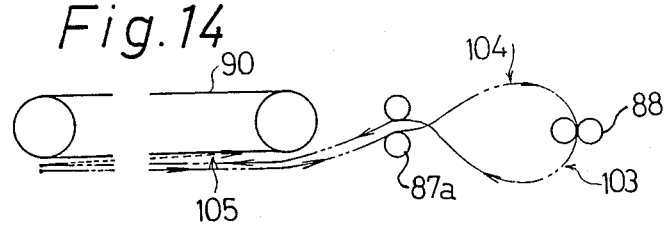
Figure 15:
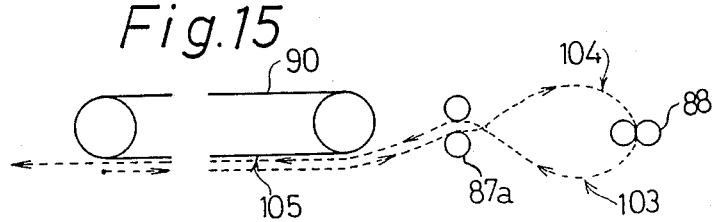

If the sheet D is then discharged as it is, the front-rear relation will be reverse to that in the case of single-face photography, so that as indicated by broken-line arrows in FIGS. 14 and 15, the sheet subjected to double-face photography is inverted again in the same manner as shown in FIG. 14 and thereafter discharged. Consequently, the sheets D thus double-face photographed are stacked up on the discharge tray 96 in the same orientation and order as initially relative to one another as in the case of the single-faced sheets D.

Figure 12:
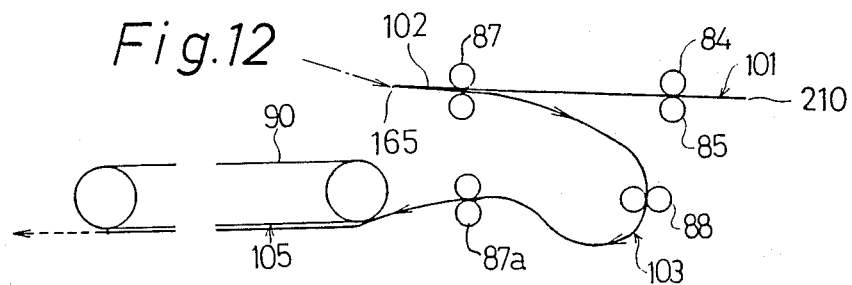
FIGS. 12 to 15 are diagrams showing various modes of travel of sheets through the path.

The arrow with a dot-and-dash line shown in FIGS. 12 and 13 and directed toward the DF opening 165 represents a sheet D as manually inserted into the opening 165 from the position on the guide table 211.

The sensors 13, 14 for detecting the signal holes 11 in the mode setting input card 12 of FIG. 10 are arranged in the switchback second passage 102 for detecting the sheet D as switchback sensors and also for use in setting various operation time points.

Figure 11:
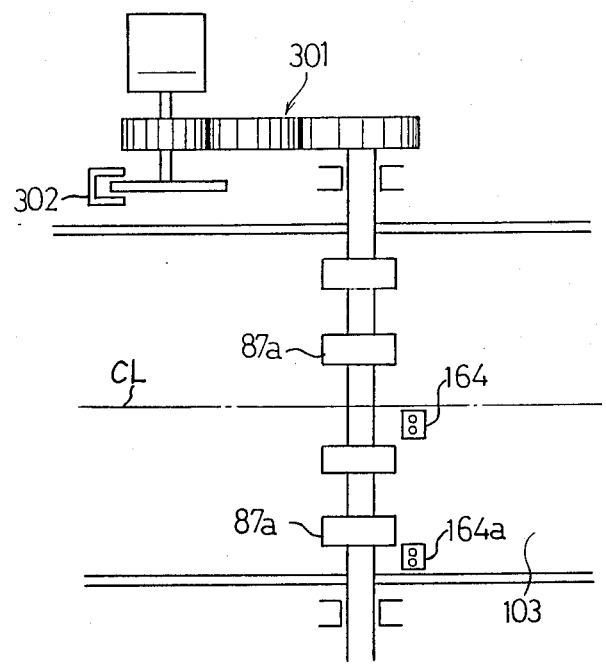
FIG. 11 is a plan view showing a size detecting assembly having inlet sensors and provided in a third transport path portion of the transport path.

As shown in FIGS. 1 and 11, inlet sensors 164, 164a are arranged in the third passage 103 immediately in front of the inlet rollers 87a. The sensor 164 is positioned close to the center line CL so as to detect every sheet D passing through the passage 103 and also set various operation time points based on the detection. The other sensor 164a is positioned at the largest distance from the center line CL to indicate that the sheet D thereby detectable has a large width and that those not detectable thereby have a small width. A drive system 301 for the pair of inlet rollers 87a has an encoder 302 for detecting pulses in proportion to the rotation of the roller pair 87a while the sensor 164 is detecting a sheet D to detect whether the length of the sheet D is large or small.

Figure 16:
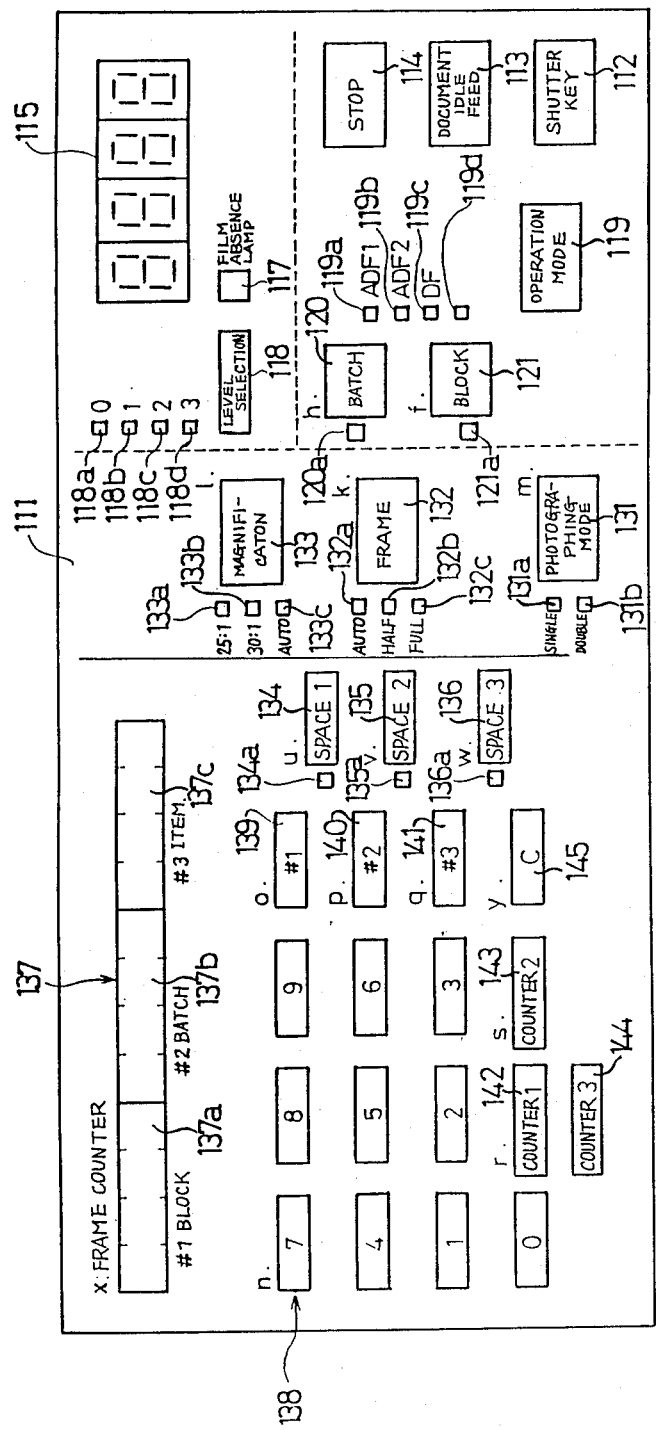
FIG. 16 is a front view showing an operation panel of the microfilming apparatus.

The main body 1 of the microfilming apparatus A has an operation panel 111 as seen in FIG. 16 for entering key inputs into the microcomputer 200 to control the operation of the document feeder B and the microfilming apparatus A.

The operation panel 111 has at its right end lower portion a shutter key 112 for starting automatic document feed and photographic operation, an idle feed key 113 for automatically feeding sheets without exposure when sheets are automatically fed one by one in response to an instruction, and a stop key 114 for temporarily interrupting the automatic document feed. A document sheet counter display 115 is provided above these keys for showing the number of microfilmed sheets, the number of sheets idly fed or values involved in subtraction.

A film absence lamp 117 is disposed immediately below the counter display 115. Arranged at the left side of the lamp are a blip mark recording level key 118 for selecting as a level one of the blip marks B1 to B3 to be recorded on the film 18 as shown in FIG. 18 for film retrieval, and level displays 118a to 118d for indicating the selected level.

As shown in FIG. 18 for example, no blip mark is recorded at level 0 (frame f1). The blip mark to be recorded at level 1 is blip mark B1 comprising a single small spot (frame f2), at level 2 blip mark B2 comprising two spots (medium and small, frame f3), and at level 3 blip mark B3 comprising three spots (large, medium and small, frame f4). The key 118 is of the rotary type, such that the level changes consecutively every time it is depressed.

Arranged on the left side of the keys 112 to 114 are an operation mode selection key 119 for selecting the operation mode of the feeder B and the apparatus A, and displays 119a to 119d for indicating the selected mode.

The operation modes selectable are mode ADF1, mode ADF2, mode DF and manual mode.

In the mode ADF1 (119a), the document sheets D on the feed tray 10 are all successively automatically fed and photographed until the tray 10 becomes empty, in response to a single photographic operation instruction. In the mode ADF2 (119b), one sheet D is fed and photographed in response to an operation instruction. In the mode DF (119c), a sheet D manually inserted into the DF opening 165 of the feeder B is transported and photographed. Further in the manual mode (119d), books or the like are photographed without using the feeder B.

Arranged at the left side of the key 119 and the displays 119a to 119d are a batch key 120 and a block key 121 for the above-mentioned batch request and block request, and displays 120a, 121a therefor. The batch key 120 is used at the level 2 for recording the medium spot of the blip mark once, or at the level 3 for recording the medium spot of the mark once. The block key 121 is used at level 3 for recording the large mark once, or when it is depressed in error at the level 2, the key 121 functions the same as the key 120.

Arranged in the center of the operation panel 111 are a photographic mode selection key 131 for selecting whether one surface or both surfaces of sheets D are to be photographed and displays 131a, 131b for showing the selected mode; a frame selection key 132 for selecting the frame size as to the half size, full size or automatic setting in conformity with the document size and displays 132a, 132b, 132c for showing the selected frame size; and a magnification selection key 133 for selecting a magnification of 1/20 or 1/30 or automatic setting as matched with the document and displays 133a, 133b, 1133c therefor. Arranged on the left side of these keys are a space 1 key 134, space 2 key 135 and space 3 key 136 for selecting the number of film frames to be transported idly, i.e., one frame, a predetermined number of frames, e.g. 100 frames, or a desired number of frames specified by number entry keys 138, and displays 134a, 135a, 136a.

Provided at the left upper portion of the operation panel 111 is a frame counter display 137 comprising a block display 137a, a batch display 137b and an item display 137c each in the form of four-digit display. Arranged under the display 137 are ten number entry keys 138, block display change key 139, batch display change key 140, item display change key 141, keys for selecting the display method of the frame counter display 137, i.e., a counter 1 key 142, counter 2 key 143 and counter 3 key 144, and a clear key 145.

According to the display method specified by the counter 1 key 142, the contents of the frame counter M1 are shown on the display 137. More specifically, +1 is shown on the item display when the shutter is actuated, +1 given on the batch display and "1" on the item display when the batch key 120 is depressed, and +1 given on the block display and "1" on each of the batch and item displays when the block key 121 is depressed.

In the display method specified by the counter 2 key 143, the contents of the frame counter M2 are shown on the display 137, more specifically, +1 on the item display when the shutter is actuated, +1 on both the batch and item displays when the batch key 120 is depressed, and +1 on both the block and item displays when the block key 121 is depressed.

With the display method selected by the counter 3 key 144, the contents of the frame counter M3 are shown on the display 137, more specifically, +1 on each of the batch and item displays for the lower eight digits to give a series of digits, the upper four digits being optionally settable.

Figure 17:
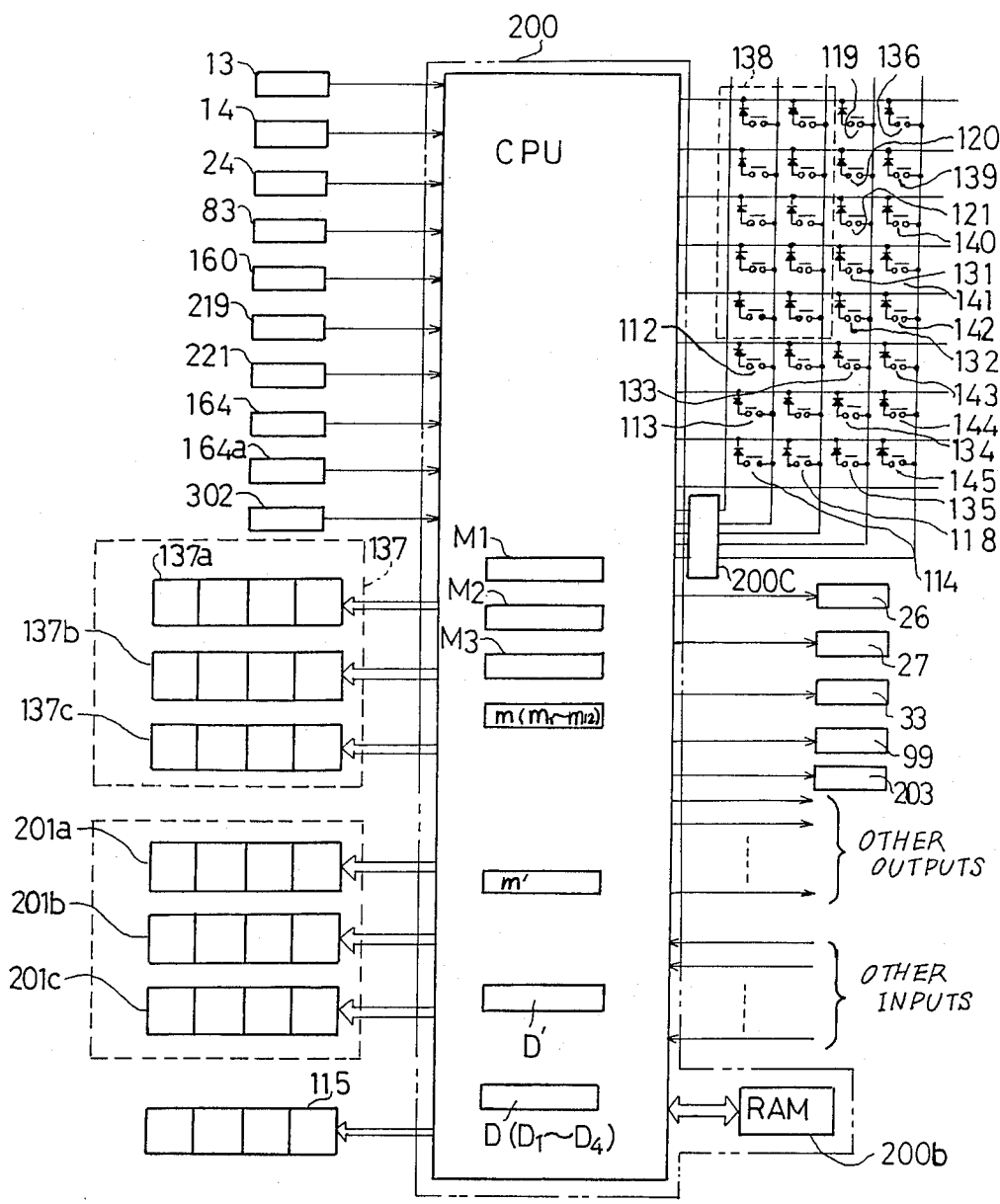
FIG. 17 is a block diagram of a control circuit.
Figure 18:
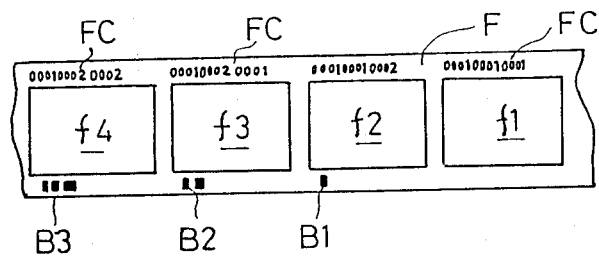
FIG. 18 is a plan view showing frame counter and blip marks recorded on a microfilm for document frames.

With reference to FIG. 17, the microcomputer 200 includes the 12-digit frame counters M1 to M3, document sheet counter D, a save memory D′ for temporarily storing the count value on the document counter D, etc. and is adapted to control the frame counters M1 to M3, document counter D, save memory D′, and further the film transport rollers 48a, 48b, shutter 168, etc. connected thereto, in response to various key inputs.

To control these components and also to control the overall operation of the microfilming apparatus A, the microcomputer 200 has a backup RAM 200b as shown in FIG. 17. The microcomputer 200 has connected to its input portion via a decoder 200c a group of switches in the form of a switch matrix and associated with the foregoing keys 112 to 114, 116, 118 to 121, 131 to 136 and 139 to 145. Also connected to the input portion of the microcomputer 200 are sensors in the apparatus A, such as the light measuring portion 24, sensors 13, 14 for detecting the holes 11 in the mode setting input card 12, top sensor 83 for sheets D on the feed tray 10, bottom switch 160 for detecting the lower-limit position of the pushing-up plate 82 of the tray 10, sensor 219 for detecting the position of the guide table 211 for the DF opening 165, sensor 221 for detecting the position of the guides 217 on the table 211, document size detecting sensors 164, 164a and rotary encoder 302.

Connected to the output portion of the microcomputer 200 are displays such as the document counter display 115, frame counter display 137, frame counter recording displays 201a to 201c and blip mark recording LED array 26 in the camera unit, focus latching solenoid 27, aperture latching solenoid 33, motors 99, 203, etc. The computer further gives outputs, for example, to the motor for driving the transport rollers of the feeder B.

The sequential operation of the present apparatus will be described below with reference to the flow charts of FIGS. 20 to 95.

Figure 20:
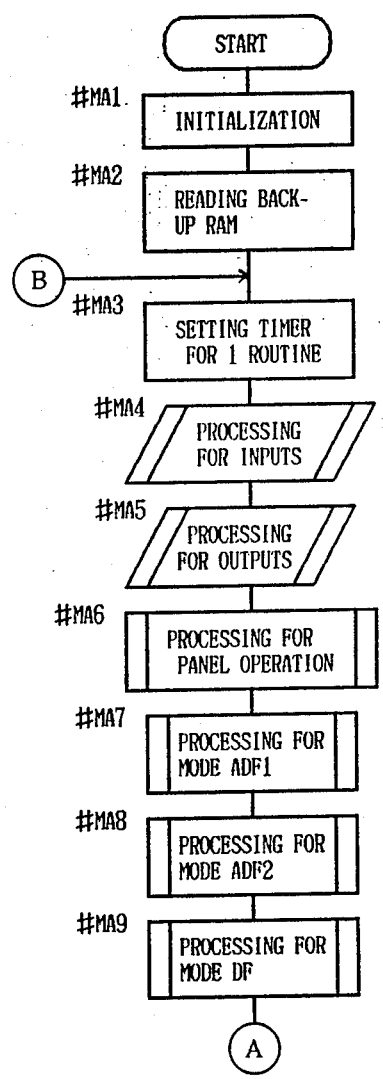
FIGS. 20 and 21 are flow charts of the main control routine to be executed by the control circuit.
Figure 21:
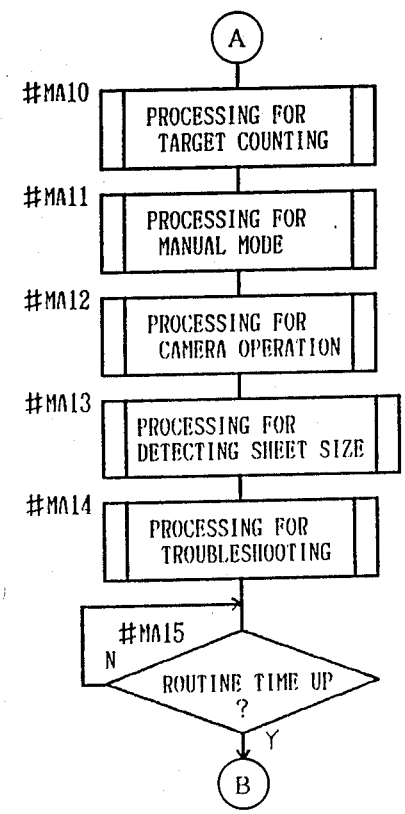
Figure 22:
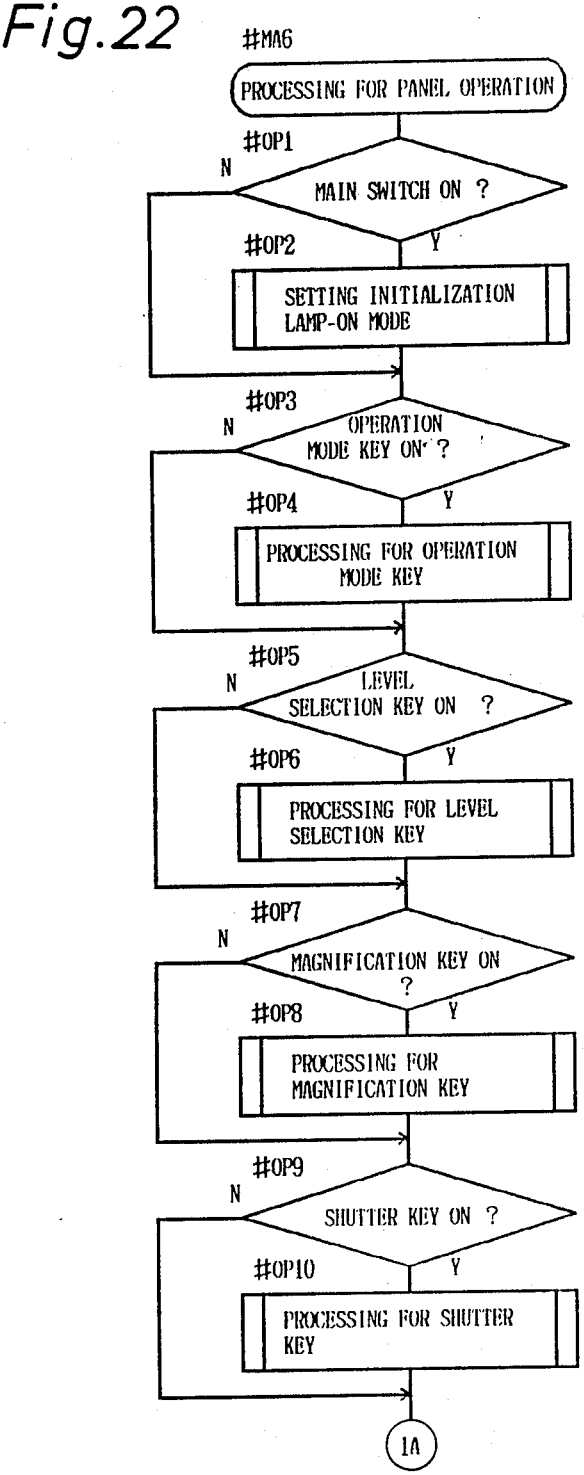
Figure 23:
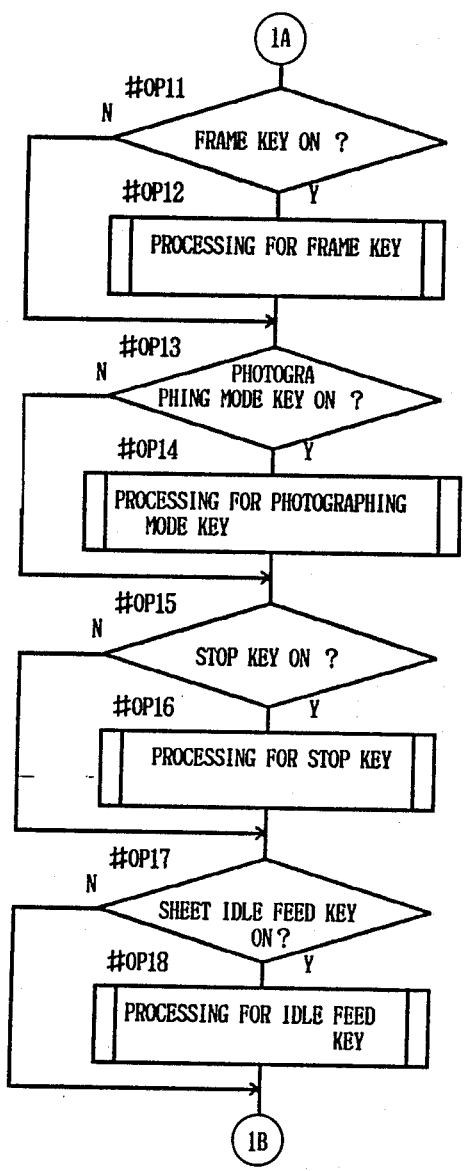
Figure 24:
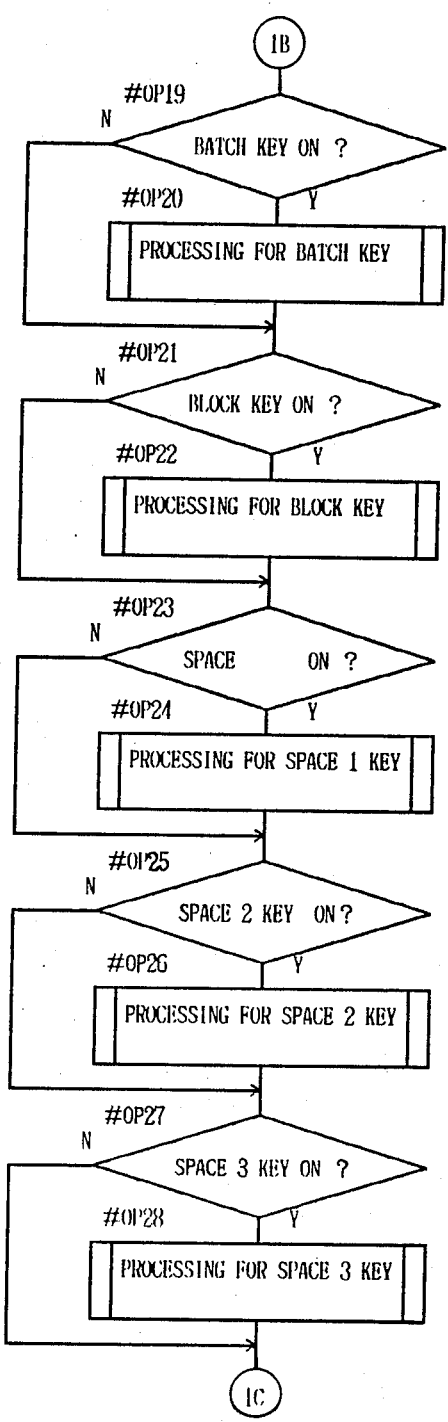
Figure 25:
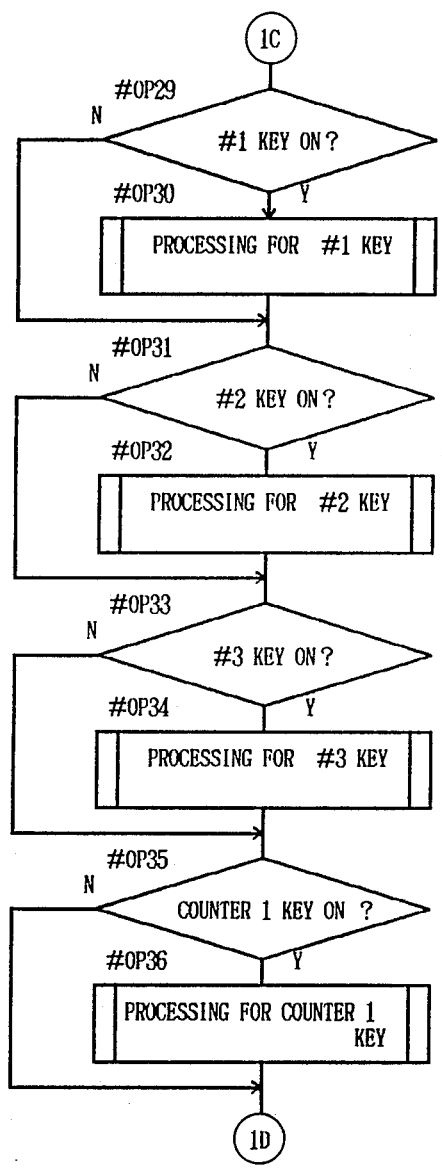
Figure 26:
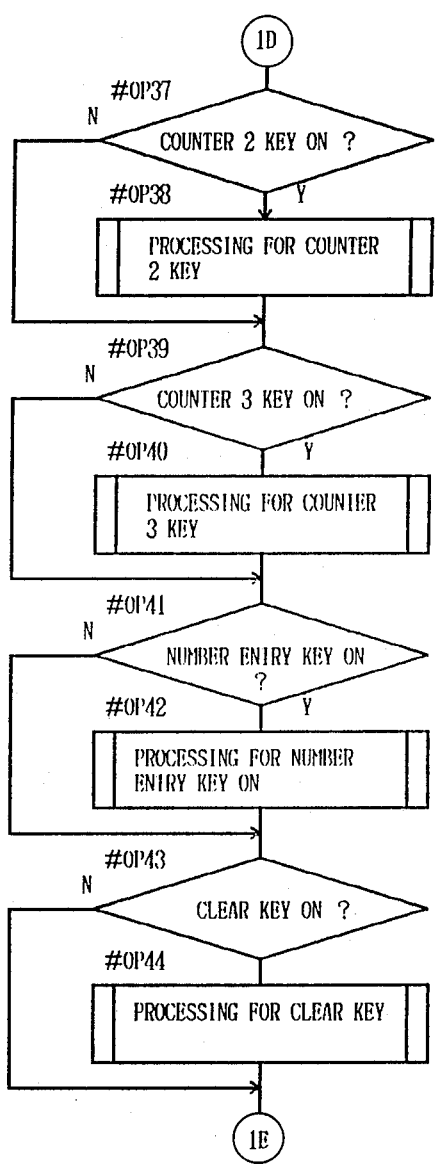

FIGS. 20 and 21 show the main flow of control processes which are practiced in sequence for operating the microfilming apparatus A and the document feeder B.

In the initialization step #MA1 in FIG. 20, various registers, timers, etc. are initialized, and flags are reset.

Subsequently, after reading of the backup RAM 200b, and an internal timer is set for a period of time required for executing one routine by the computer 200 (steps #MA2-3). Steps #MA4 to #MA13 then follow for the subroutines of input processing, output processing, processing for operation panel, processing for ADF1 mode, processing for ADF2 mode, processing for DF mode, processing for target counting, processing for manual mode, camera operation processing and size detection processing. Photographic operation is carried out in various modes in accordance with the inputs given by keys shown in FIG. 16 and with data given by the mode setting input card 12. Subsequently, jamming by sheet D, if any, is remedied (step #MA14). Thereafter, on completion of the operation of the internal timer, the sequence returns to step #MA3 (step #MA15).

The keyed-in inputs are processed by step #MA6 of FIG. 20, i.e. the subroutine of processing for panel operation, which is illustrated in FIGS. 22 to 27. The main switch and various keys on the panel 111 are checked as to whether they are on, and the inputs from the depressed switch and keys are processed variously.

More specifically, when the main switch is turned on, the panel 111, etc. are set in an initialization light-on mode (steps #OP1 and 2). The operation mode selection key 119 is then turned on, and one of the operation modes ADF1, ADF2 and DF is set (steps #OP3 and 4). Depression of the level selection key 118 is followed by processing for the key to set the level, i.e. the kind, of the blip mark to be recorded (steps #OP5 and 6). Similarly, when the magnification key 133 is depressed, processing for the key follows (steps #OP7 and 8) to set the desired magnification. When the shutter key 112 is depressed, processing for the key is executed (step #OP9 and 10). Depression of the frame key 132 is followed by the attendant processing therefor (steps #OP11 and 12) to set the frame to be photographed to the full size, half size or automatic setting. The photographic operation mode key 131 is then depressed, followed by processing therefor (steps #OP13 and 14) to set a single-face photographing or double-face photographing mode. When the stop key 114 is turned on, the attendant processing therefor is executed (steps #OP15 and 16) to discontinue the photographic operation. When the document idle feed key 113 is depressed, processing therefor is conducted (steps #OP17 and 18) to set an idle feed mode wherein sheets D are idly transported with the photographic operation suspended.

Depression of the batch key 120 or block key 121 for specifying a particular count for the frame counter is followed by processing for the corresponding key (steps OP19 and 20, or #OP21 and 22). When one of the space 1 key 134, space 2 key 135 or space 3 key 136 is depressed (step #OP23, 25 or 27), space 1 processing (step #OP24), space 2 processing (step #OP26) or space 3 processing (step #OP28) is executed in corresponding relation to the depressed key to set the a particular number of frames of film F to be idly transported.

The processes to be executed in connection with the space 1 key 134, space 2 key 135 and space 3 key 136 will be described in detail.

FIG. 28 shows the processing routine to be performed when the space 1 key 134 is depressed. Upon the depression of the space 1 key 134, a space request flag is set in step #1 to show that the film is to be idly transported without exposure, and a frame number counter indicating the number of frames to be idly transported is set to "1" in step #2. Subsequently, the data in the document counter D and on the document display 115 is stored in the save memory D', and the document counter is set to "0" in steps #3 and 4.

Consequently, the film is idly transported by one frame by the camera operation process shown in FIGS. 80 to 93.

FIG. 29 is a flow chart showing the procedure following the depression of the space 2 key 135. As in the case of the space 1 key 134, the depression of the space 2 key 135 is followed by step #11 in which a space request flag is set, and the frame number counter is set to a specified value in step #12. The specified value in this case is 100. As is the case with the key 134, the data in the document counter D and on the document counter display 115 is transferred to the save memory D', and the document counter D is set to "100.38 Consequently, the film F is idly transported by 100 frames by the camera operation process shown in FIGS. 80 to 93.

FIG. 30 shows the processing for the space 3 key 136. On depression of the space 3 key 136, step #21 first checks whether a space setting flag is set. If it is not set, steps #22 to #24 follow for setting the flag, transferring the data in the document counter D to the save memory D' and setting the frame number counter to "0". If the answer to step #21 is affirmative, the space setting flag is reset and space request flag is set in steps #25 and #26.

Thus, when the key 136 is depressed, the document counter D is set to a desired value by depressing number entry keys in the number entry key processing routine to be described later with reference to FIGS. 37 and 38. When the space 3 key 136 is depressed second time, the film is idly transported by the number of frames set by the entry keys, in the camera operation process of FIGS. 80 to 93.

The space key processing included in the panel operation processing subroutine of FIGS. 22 to 27 is followed by the process to be described below. When the block display change key 139 is on for changing the display of frame counter, the attendant frame counter 1 processing (steps #OP29 and 30) is executed. When the batch display change key 140 is on, the frame counter 2 processing concerned is executed (steps #OP31 and 32). If the item display change key 141 is on, the attendant frame counter 3 processing follows (steps #OP33 and 34).

These processes will be described below in detail. FIG. 31 shows the block change processing routine following the depression of the block display change key 139. The routine is performed only unless the feeder B and the camera 4 are in operation and the frame counter is lighted up. For this purpose, when key 139 is on, step #31 inquires whether the feeder B and the camera 4 are in operation, and step #32 inquires whether the frame counter is lighted up. When the answers to these inquires are affirmative, the sequence returns in each case. If otherwise, step #33 follows.

Figure 19A:
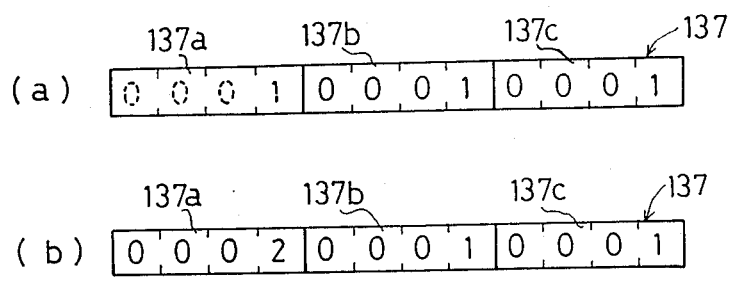
FIG. 19A is a plan view showing a change in the data shown on a display.

First, step #33 checks whether the counter is in set state, since the key 139 has the function of setting a mode for changing the value on the batch display 137a and the function of canceling the mode. When a counter setting flag (indicating that the counter is set) is not set, a flag for flickering the block display 137a is set up to flicker the indication on the block display 137a as shown in broken line in FIG. 19A (a) and thereby show the set state, while the counter setting flag is set (steps #34 and #35). With the counter setting flag thus set, a value entered by a number entry key 138 is indicated on the block display 137a as seen in FIG. 19A (b) in the number entry key processing routine to be described later with reference to FIGS. 37 and 38. Alternatively if the counter setting flag is set, the flag is reset to terminate the setting mode, and a flag is set up for lighting up the four digits on the block display 137a. Thus, the block display 137a is lighted up instead of flickering which is ceased.

When the batch change key 140 is depressed, the batch change processing routine of FIG. 32 is performed, or when the item change key 141 is depressed, the item change processing routine of FIG. 33 is performed, in the same manner as the block change display processing described above, except that the display to be flickered or lighted up is different.

After these processes for the block, batch and item display change keys 139 to 140 included in the operation panel processing routine shown in FIGS. 22 to 27, processes for the counter 1 key 142, counter 2 key 143 and counter 3 key 144 are executed (steps #OP35-40).

The display modes wherein these keys 142, 143 and 144 are used are assigned decimal 12-digit frame counters M1, M2 and M3, respectively. According to the display mode selected, the count value on the frame counter M1, M2 or M3 is stored in the memory m for the frame counter display 137, whereby the desired counter value is shown on the display 137.

More specifically, in the display mode specified by the counter 1 key 142, the count value on the frame counter M1 is stored in the memory m and shown on the frame counter display 137. In the display mode selected by the counter 2 key 143 or counter 3 key 144, the count value on the frame counter M2 or M3 is shown on the frame counter display 137 similarly.

The processing routine will be described which follows the depression of the counter 1 key 142. First, step #71 inquires whether the frame counter display 137 is lighted up. When the answer is negative, a flag is set for lighting up the frame counter for recording the counter, and the count value of the frame counter M1 is stored in the memory m, and M1 flag an frame counter light-on flag are set (steps #72 to #75). The sequence then returns. Consequently, the data of the counter M1 is given o the display 137.

When a frame counter light is found to be on in step #71, step #77 follows to check which counter is on the display 137. If the frame counter M1 is on display, the sequence proceeds to steps #78 to #81. If the frame counter M2 is on, steps #82 to #84 follow. If the frame counter M3 is on display, steps #85 to #87 follow.

In steps #75 to #81, frame counter light-on request flag and frame counter light-on flag are reset, the count value of the frame counter M1 is set to tee data in the memory m, and the M1 flag is reset. Thus, the count value of the counter M1 is already shown on the display 137. When the counter key 142 is further depressed, the frame counter M1 is set to the shown count value, and the display 137 goes off.

In steps #82 to #84, the count value of the frame counter M2 is set to the data in the memory m, and the count value on the frame counter M1 is stored in the memory m. To show the data of the frame counter M1 on the display 137, M1 flag is set to turn on the light, and M2 flag is reset.

Like steps #82 to #84, steps #85 to #87 are performed to show the data in the frame counter M1 on the display 137.

FIG. 35 shows the routine to be performed when the counter 2 key 143 is depressed, while FIG. 36 shows the routine to be performed when the counter 3 key 144 is depressed. These routines will not be described since they are similar to the one shown in FIG. 34 and are executed to show the count value of the counter M2 or M3 relating to the key 143 or 144 on the frame counter display 137.

After these processes are executed for the counter 1 key 142, counter 2 key 143 and counter 3 key 144 in the panel operation processing routine of FIGS. 22 to 27, processing for numerical entry keys 138 is executed. When one of the keys 142, 143 and 144 is depressed to change the indication on the frame counter display 137 or when the space 3 key 136 is depressed to enter the number of frames of film to be idly transported, a numerical value is entered by the following process. For this process, the memory m in the microcomputer 200 is utilized for the count values on the frame counters M1, M2 and M3. In this case, memory portions ml to m12 correspond to the first to 12th digits of the count.

The processing routine is shown in FIGS. 37 and 38. First, step #161 in FIG. 37 inquires whether the frame counter is lighted up and if there is a set state indicating flag. If the answer to the inquiry is in the negative, the sequence proceeds to step #191 in FIG. 38.

When step #161 detects that the light of the counter display 137 is on or that there is a counter setting flag, step #162 et seq. follow to detect which of the block display change key 139, batch display change key 140 and item display change key 141 is depressed. If the depressed key is key 139, steps #163 to #166 follow. In this routine, the data in each digit position is shifted to one-digit higher position in the block display 137a, e.g. from the first digit position m9 to the second digit position m10. When a clear key flag is thereafter found to be set by the depression of the clear key 145, the data in the digit positions m12 to m9 in the block display is entirely changed to 0. If the clear key 145 has not been manipulated, a number entry key 138 is depressed, and the value of the depressed key is set in the first digit position m9. The data on the block display 137a, i.e. the count value on the frame counter M1, can be set to a desired value by repeating this procedure.

If the depressed key is the batch display change key 140, steps #170 et seq. follow, in which the data on the batch display 137b, i.e. the data on the frame counter M2, is set to a desired value in the same manner as when the block display change key 139 is depressed.

Further if the depressed key is the item display change key 141, the sequence proceeds to steps #180 et seq. to set the data of the item display 137c, i.e. the data of the frame counter M3, to a desired value.

When step #161 is followed by step #191 of FIG. 38 because the counter light is not on, nor is there any counter setting flag, the step inquires if a space 3 setting flag is set owing to the depression of the space 3 key 136 for idle transport. If the answer is in the negative, step #196 follows, whereas if the flag is set, the sequence proceeds to steps #192 to #196. In this routine, the data in each digit position of the document counter D is shifted to one-digit higher position, e.g. from the first digit position D1 to the second digit position D2. When the clear key flag is thereafter found to be set by the depression of the clear key 145, the data in each digit position of the document counter display 115 is changed to 0. When the clear key 145 is not depressed, a number entry key 138 is depressed, and the value of the depressed key is set in the first digit position D1. The document counter D can be set to a desired value by repeating this procedure. The data set in each digit position of the counter display 115 is transferred to the save memory D' serving as a frame number counter, thus specifying the number of frames to be idly transported. Accordingly, the value set in the counter D is the number of frames to be idly transported during the camera operation processing. On completion of the idle transport, the data in the save memory D' is returned to the document counter D to assure trouble-free counting for the subsequent document.

After the number entry key processing included in the panel operation processing subroutine of FIGS. 22 to 27, clear key processing (steps #OP43 and 44) is executed when the clear key 145 is on, and the clear flag is set up. This is followed by document counter lighting-up processing and then by frame counter lighting-up processing (steps #OP45 and 46) for showing data on on the document counter display 115, frame counter display 137 and frame counter recording displays 201a, 201b, 201c.

The frame counter lighting-up processing routine is shown in FIGS. 39 to 41. With reference to these drawings, step #201 first checks whether a lighting request flag is set. If it is not set, step #202 follows, in which the lamp is turned off. If otherwise, the sequence proceeds to step #203, in which the value on a digit number counter a for the frame counter display 137 is successively decremented with the operation of a timer. When the digit number count a set is 1, the first routine of steps #204 to #207 is performed. When the count a is k, the kth routine of steps #210 to #213 is performed. Lastly, when the count a is 12, the 12th routine of steps #220 to #223 is performed. Every time the count number a is decremented, the sequence proceeds to the routine of higher digit position.

In the routine for each digit position, the data of the memory concerned is set, the drive circuit for the digit position is energized, the digit value in one lower digit position is set, and the drive circuit for one higher next digit position is deenergized. At the first digit position, the last 12th digit position is taken as one lower digit position, and the position next to the last digit position is the first digit position.

Consequently, the digits of the frame counter display 137 are successively lighted up from the first position each for a predetermined period of time, and every time light is turned on at a position, the light in the next digit position is turned off. Thus, all the digits are lighted up in succession, and this cycle with a short period is repeated, with the result that every digit appears uniformly lighted up continuously.

After the above lighting processing routine, the flicker processing routine of FIG. 40, steps #231 et seq. is performed. Step #23 inquires if there is a flicker request flag. When the answer is negative, step #232 follows, in which a flicker timers α and β are reset, and the sequence returns to hold each digit lighted up.

When the flicker request flag is present, step #233 checks whether the flicker fixers α, β are in operation. If they are not in operation, the ON timer α is set (step #234), followed by step #235, in which the ON timer α is checked as to whether the time set is up. If the time is up, the OFF timer β is set (step #236). The sequence then proceeds to #237, in which the OFF timer β is checked as to whether it is in operation. If it is in operation, the light turning-off processing routine of FIG. 41, steps #241 et seq. is performed. If otherwise, the sequence directly returns. Through the repetition of steps #232 to #237, the lamp is held on and off for the intervals of time set by the timers α, β, respectively, for flickering.

With reference to FIG. 41 showing a light turning-off routine, step #241 first checks which of the batch, block and item display change keys 139, 140, 141 is depressed, and the driver for the display associated with the depressed key is turned off (steps #242 to #244).

The frame counter lighting-up processing included in the panel operation processing subroutine of FIGS. 22 to 27 is followed by the actuation of the shutter. At this time, frame counter processing is executed (steps #OP47 and 48), which is illustrated in FIGS. 42 to 44. Upon receiving a shutter-on signal from the camera 4, the control system checks whether a block request, as well as a batch request, is made (steps #251 and #252). In response to the block request, the sequence proceeds to step #26 of FIG. 43, while when the batch request is made, step #291 of FIG. 44 follows. When neither of the requests is made, the sequence proceeds to step #253.

In step #253, data is transferred from the memory m for the frame counters M1, M2, M3 of the display 137 to the memory m' for the displays 201a, 201b, 201c for recording the data on the film F within the camera 4.

Next, step #254 checks which of the counters M1 to M3 shows its count value currently on the display 137. If it is M1, the value in the area m4 to m1 of the memory m corresponding to the item display is incremented by +1 as one count unit in step #255 (FIG. 19B (a)→(a')). If it is M2, the value in the memory area m4 to ml is similarly incremented by +1 in step #256 (FIG. 19B (b)→(b')). When the counter is M3, the value in the memory area m8 to ml is incremented by +1 in step #257 (FIG. 19B (c)→(c')). Thus, in the case of M3, the batch display 137b and the item display 13 have an eight-digit counter, such that when the maximum value of 9999 on the item display 137c is incremented by +1 and returned to 0, 1 is raised to the batch display 137a.

Figure 19B:
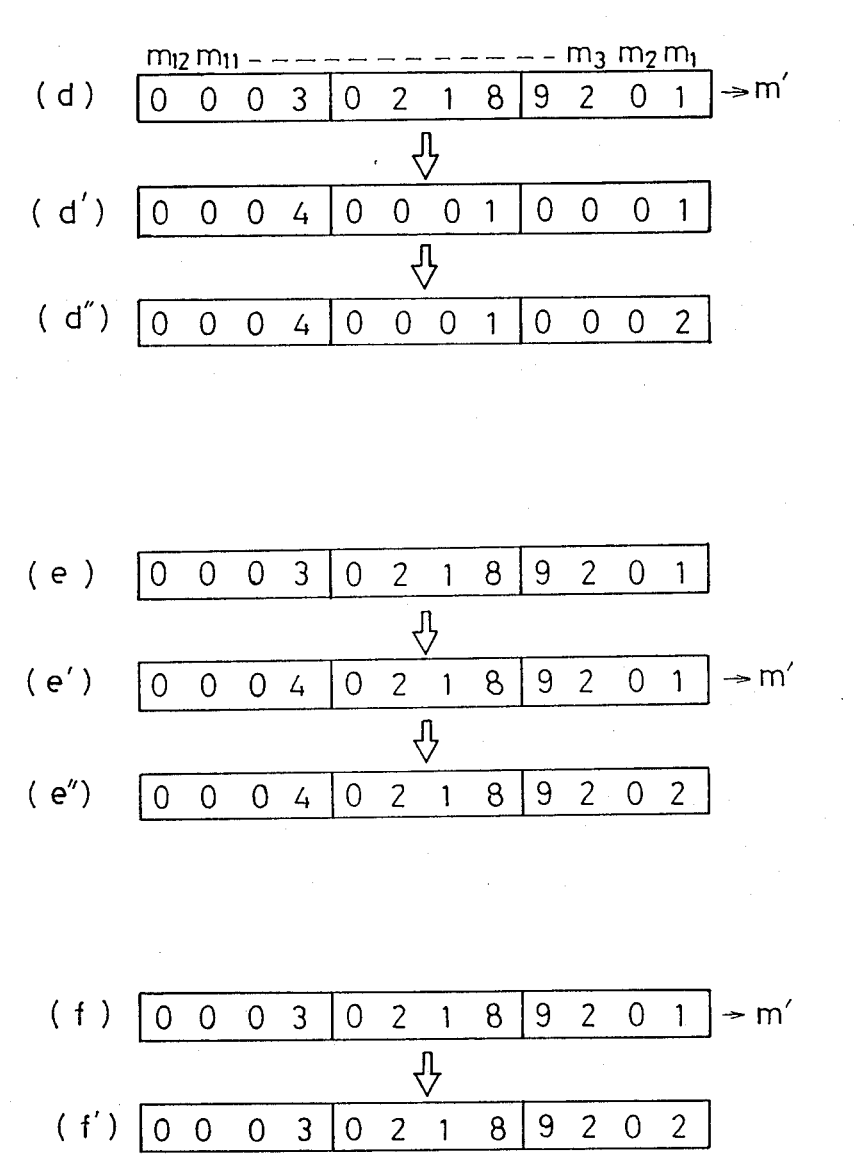

When the sequence proceeds from step #251 to step #261 of FIG. 43 upon a block request, the frame counter, M1, M2 or M3, showing the current value on the display 137, e.g. M1, is identified, the count on the highest-position block display 137a is incremented by +1, and the count on each of the lower batch display 137b and item display 137c is changed to the initial value of "1" in corresponding relation to the incremented higher count (steps #262 and #263, FIG. 19B (d)→(d')). Subsequently, the data stored in the area m12 to m1 is transferred to the memory m' for the recording displays 201a to 201c. On the other hand, the data in m4 to m1 is incremented by +1 (steps #264 and #265, FIG. 19B (d')→(d'')).

When the counter identified is M2, the value in the area m12 to m9 is incremented by +1 (FIG. 19B (e)→(e′)), the data in the memory m for the panel display is transferred to the memory m′, and the value in m4 to m1 is incremented by +1 (FIG. 19B (e′)→(e″), steps #271 to #273).

If the counter is M3, the current data in the memory m is transferred to the memory m′, and the value in m8 to m1 is then incremented by +1 (steps #281 and #282).

Further when the sequence proceeds from step #252 to step #291 of FIG. 44 upon a batch request, the frame counter, M1, M2 or M3, showing its value on the display is identified. If it is M1, the data in m4 to m1 corresponding to the item display 137c which is lower than the batch display 137b in position is changed to "1" (FIG. 19C (a)→(a′)), and the value in m8 to m5 corresponding to the batch display 137b is incremented by +1 (FIG. 19C (a′)→(a″)). The resulting data in the memory m is transferred to the memory m′ (steps #292 to #294). The data in m4 to m1 is thereafter incremented by +1 in step #295 (FIG. 19C (a″)→(a‴)).

If the counter is M2, the data in m8 to m5 is incremented by +1 (FIG. 19C (b)→(b′)) in steps #301 to #303, the current data in the memory m is transferred to the memory m′, and the data in m4 to m1 is thereafter incremented by +1 (FIG. 19C (b′)→(b″)).

Further if the counter is M3, the sequence proceeds to steps #311 and #312, in which the current data in the memory m is transferred to the memory m′, and the data in the area m8 to m1 corresponding to the batch and item displays 137b, 137c is then incremented by +1 (FIG. 19C (c)→(c′)).

With reference to the main routine of FIGS. 20 and 21 again, ADF1 mode processing (step #MA7) will be described below which follows the foregoing panel operation processing of step #MA6.

The processing routine is shown in FIGS. 45 to 58. This subroutine is performed only when ADF1 mode is selected by the mode selection key 119 (step #401). If another mode is set, the corresponding subroutine in the main routine will be executed.

Step #402 checks the apparatus for a jam or some other trouble. When there is no trouble, step #403 follows, in which the shutter key 112 is checked as to whether it is on. If it is on, step #404 inquires whether an interruption flag is set. When the answer is negative, step #405 follows, in which the document sensor 161 (FIG. 1) indicates whether the tray 10 is empty. When document sheets D are present, a flag indicating that the feeder B is in operation (ADF operating flag) is set up in step #406. The pushing-up plate 82 is then raised in step #407.

Figure 46:
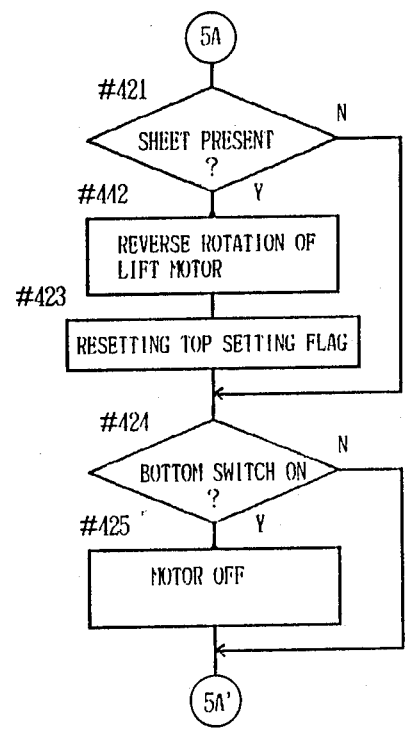
Figure 47:
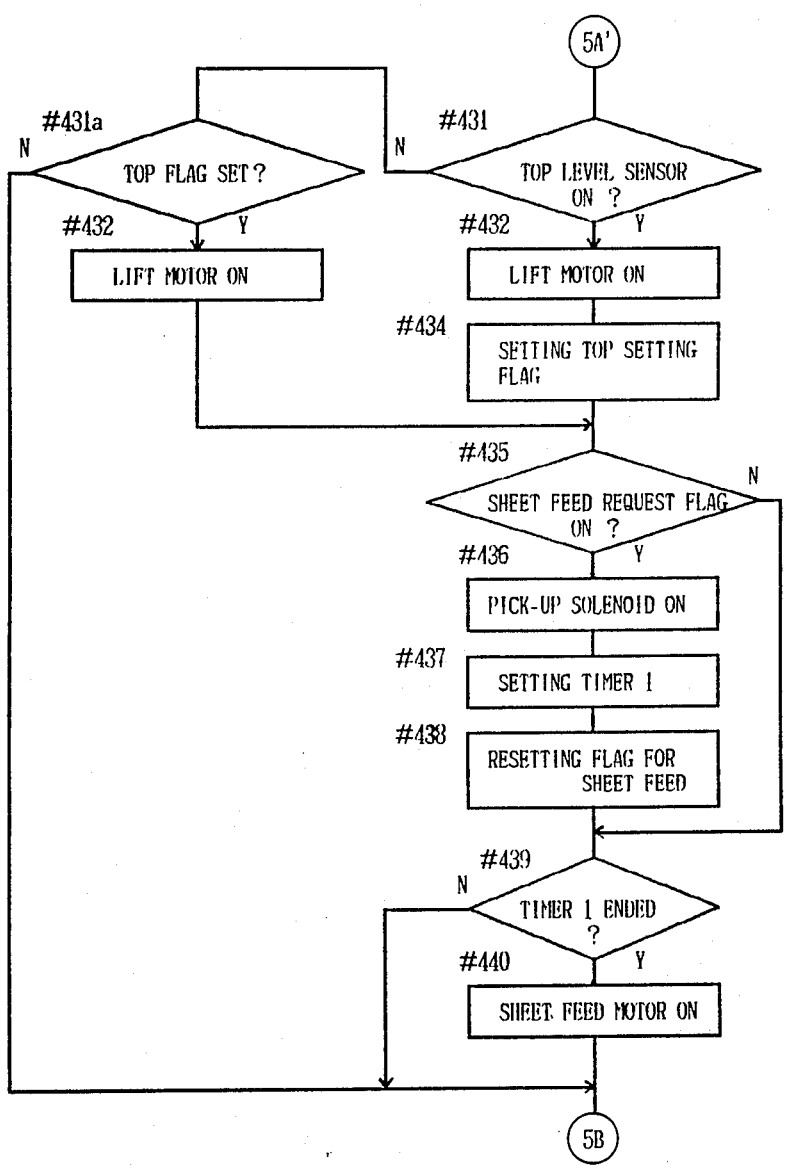

Subsequently, flags requesting document feed, switchbacking, U-turn and document transport (feed flag, switchback flag, U-turn flag, transport flag) are set in succession (steps #408 to #411), followed by step #421 of FIG. 46.

When the interruption flag for interrupting the transport by the feeder B and actuation of the camera shutter upon depression of the stop key 114 on the panel 111 is found to be set in step #404, steps #415 to #417 are performed to check whether an ADF operation request flag is set and whether the shutter is operable and reset the interrupting flag, whereupon the sequence returns. This routine is performed to start canceling an interruption.

Steps #421 to #424 are performed to lower the pushing-up plate 82 to supply document sheets when no sheet is present. In step #421, the tray 10 is checked again as to whether it is empty. If it is not empty, step #424 follows, whereas if it is empty, the motor 99 for the plate 82 is reversely rotated (step #422), followed by step #423 for resetting a top setting flag and thereafter by step #424.

Step #424 checks the bottom switch 160 as to whether it is on. If it is off, the sequence proceeds to step #431 of FIG. 47 to further lower the plate 82 continuously. If the switch is on, the motor 99 is deenergized to hold the plate 82 in its lowered position. Step #431 thereafter follows.

Step #431 checks whether the top level sensor 83 is on. If it is on, the motor 99 is turned off to stop rise of the plate 82, and the top setting flag is set (steps #432 and #434). If it is not on, the top setting flag is checked as to whether it is set (step #431a). Only when it is set, the motor 99 is turned on to raise the plate 82 (step #433).

Figure 48:
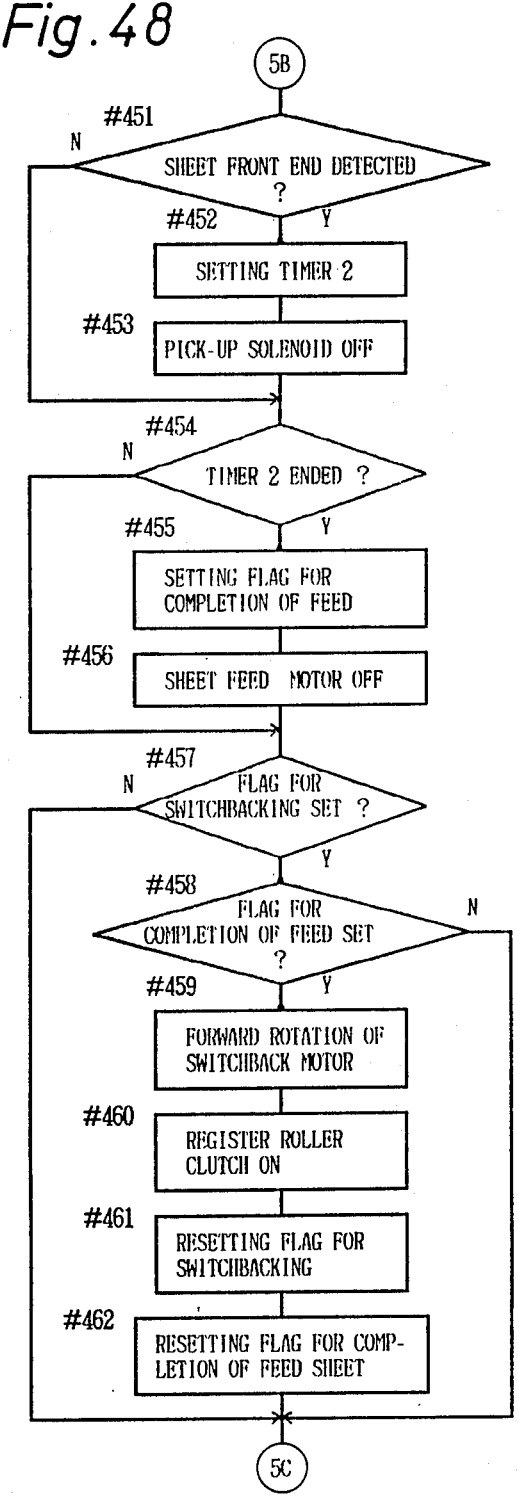

While the paper feed routine of steps #435 et seq. is thereafter started, this routine is not performed unless the top setting flag is set in step #431a, but step #451 et seq. follow as shown in FIG. 48. To cause the feed roller 81 to fall onto the stack of sheets D on the pushing-up plate 82, the time required for the roller 81 to be so positioned is set on a timer 1 so that the roller 81 will not be driven before the time set on the timer 1 is up when starting to feed the sheet (steps #435 to #440). This eliminates the skew of the sheet which is likely to occur when the roller 81 falls onto the stack D for feeding while in rotation. Step #435 checks whether the feed flag is set. When it is not set, step #439 directly follows. If otherwise, the feed roller 81 is moved down (step #436), the timer 1 is set to a period of time taken for the completion of the operation of pick-up solenoid (step #437), and the feed flag is reset((step #438). The sequence then proceeds to step #439.

This step checks whether the time set on the timer 1 is up. When the time is up, the feed roller 81 is driven. If otherwise, step #451 of FIG. 48 follows.

In steps #451 to #456, the feed roller 81 is raised upon a separation sensor 163 (FIG. 1) detecting the front end of the sheet D, and the feed roller 81 is stopped through a register timer 2. Step #451 inquires whether the separation sensor 163 detects the front end of the sheet D. If the inquiry is answered in the negative, the sequence proceeds to step #454. If otherwise, the timer 2 is set to position the sheet properly on the register rollers 86 (step #452), the feed roller 81 is raised (step #453), and step #454 thereafter checks whether the operation of the timer 2 is completed. If the timer is still in operation, the sequence proceeds to step #457. If otherwise, a feed completion flag is set (step 455), and the feed roller 81 is stopped (step #456).

At this time, the front end of the sheet D has been brought into pressing contact with the nip of the pair of register rollers 86 as properly positioned relative thereto free of any skew. In this state, the sequence proceeds to step #457 et. seq. for a switchbacking processing routine. Step #457 checks whether the switchbacking request flag (switchback flag) is set. If it is not set, the sequence directly proceeds to step #471 in FIG. 49. With the switchback flag in set position and further with the feed completion flag in set position (step #458), the pair of switchback rollers 87 is driven forward, and the clutch for the register rollers 86 is engaged to send the sheet D from the first passage 101 into the second passage 102. At this time, the sheet D travels onto the guide table 211 through the DF opening 165 at the left end of the second passage 102. The switchback flag and the feed completion flag are reset (steps #459 to #462), whereupon the sequence proceeds to step #471.

When the feed completion flag is not found set in step #458, step #471 directly follows.

In steps #471 to #477, the rear end of the sheet D is detected by the separation sensor 163, whereupon the leading end portion of the next sheet D is sent out, provided that the sheet is present and that no interruption flag is set by the stop key 114.

Step #271 checks whether the rear end of the first sheet D is detected by the separation sensor 163. If it is detected, step #472 recognizes that the tray 10 is not empty, and step #473 detects no interruption flag in set state. The feed flag is then set, and a timer 3 is set to a time interval required for the rear end of the preceding sheet D to pass between the pair of register rollers 86 (steps #474 and #475), followed by step #476. With the first sheet D thus passing through the first passage 101, the next sheet D is allowed to advance.

If step #471 fails to detect the rear end of the sheet D, the sequence directly proceeds to step #475. If step #472 finds the tray 10 empty and when step #473 detects the interruption flag in set state, step #475 follows.

Step #476 inquires whether the operation of the timer 3 is completed which assures complete passage of the sheet rear end through the register roller pair. When the timer is still in operation, the sequence proceeds directly to step #481 in FIG. 50. If otherwise, the clutch for the register rollers 86 is disengaged in step #477, which is followed by step #481.

In steps #481 to #486, the switchbacking operation is completed on condition that the sheet rear end is detected by the switchback sensors 13, 14. Step #481 checks whether the rear end is detected by the sensors 13, 14. If it is detected, the switchback rollers 87 are stopped. A switchback sensor flag is set, and a timer 4 is set to a time interval required for the rollers 87 to come to a complete halt, with the inertia of the switchback motor considered, so as to assure the proper reciprocating travel (steps #482 to #484). Step #485 then follows.

This step checks whether the operation of the timer 4 is completed. If it is completed, a switchback completion flag is set (step #486), followed by steps #487 et seq. for a U-turn processing routine. If otherwise, this routine directly follows.

Step #487 checks whether the U-turn flag is set up.

Figure 51:
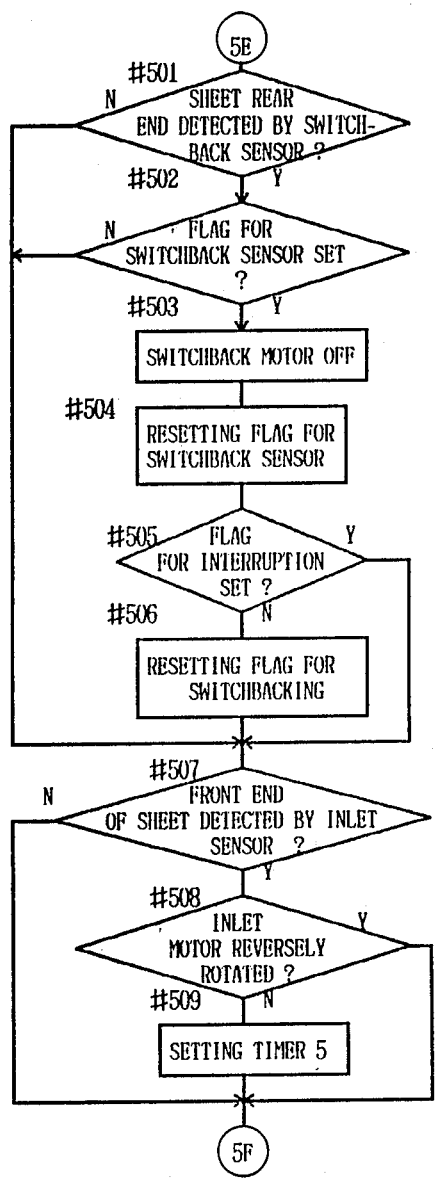
Figure 52:
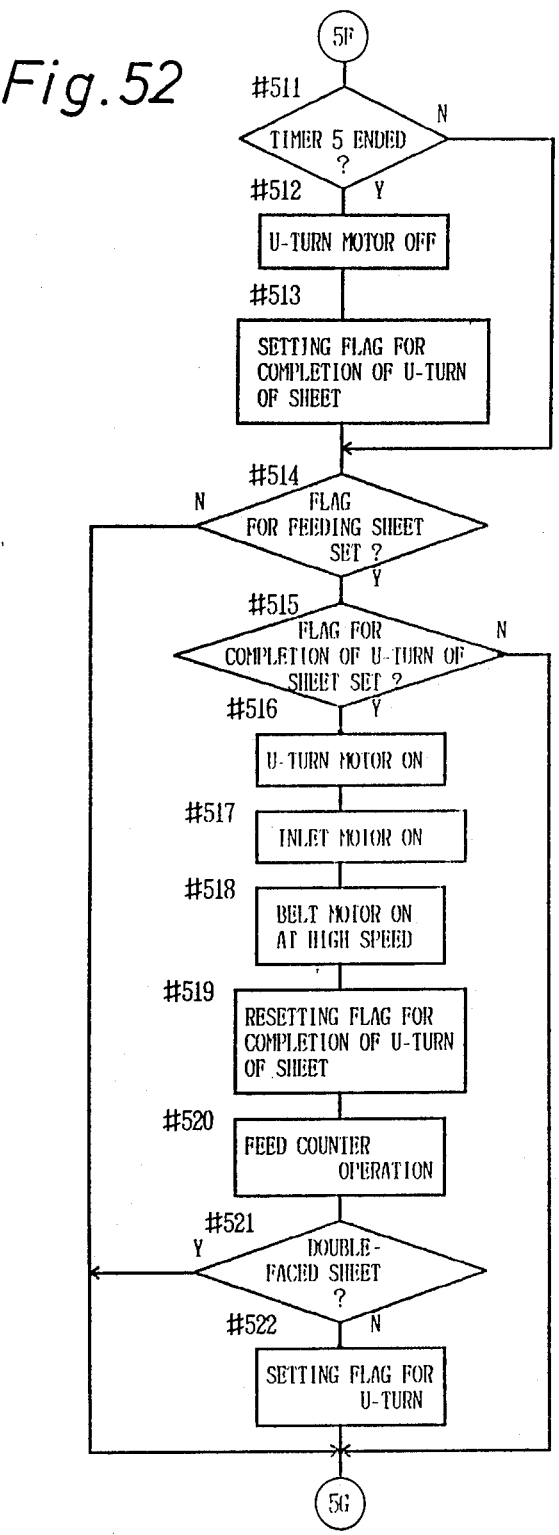

If the flag is not set, the sequence proceeds directly to step #501 in FIG. 51. If it is set, step #488 follows which recognizes that the switchback completion flag is set, whereupon the switchback rollers 87 are reversely rotated, the U-turn rollers 88 are driven, and the switchback completion flag and U-turn flag are reset (steps #489 to #492). The sequence then proceeds to step #501. Consequently, the sheet D reversely advances from the second passage 102 into the third passage 103 by being guided by the guide member 91 of Mylar and is turned around along the third passage 103 while being forwarded also by the U-turn roller pair 88.

If step #488 fails to detect the switchback completion flag in set state, the sequence directly proceeds to step #501.

This step inquires whether the sheet rear end is detected by the switchback sensors 13, 14 twice. When the inquiry is answered in the negative, the sheet D is still held between the switchback rollers 87. The sequence then proceeds directly to step #507. If otherwise, this indicates that the sheet D has moved past the rollers 87. Step #502 detects the switchback sensor flag in set state (first detection of the rear end or second detection of the same), whereupon the switchback roller pair 87 is stopped, and the switchback sensor flag is reset (steps #503 and #504). Step #505 then recognizes that no interruption flag is set, whereupon the switchback flag is set for the second sheet D (step #506). If the interruption flag is found to be in set state, the sequence proceeds directly to step #507.

This step checks whether the front end of the sheet D is detected by the inlet sensor 164. If it is not detected, the sequence proceeds directly to step #511 in FIG. 52. If it is detected, step #508 checks whether the inlet roller pair 87a is in reverse rotation to thereby detect whether the sheet is forwarded to have its first face (front surface) photographed or is a double-faced original and is forwarded so as to be turned upside down after the first face has been photographed. When the first face has already been photographed, step #511 directly follows. If the sheet is forwarded for photographing the first face, a timer 5 is set in step #509 before step #511.

For the sheet D forwarded to be photographed on the first face, the timer 5 is adapted to sufficiently delay the forward rotation of the inlet rollers 87a so that the leading end of the sheet D will be properly positioned at the nip of the rollers 87a, with its skew remedied.

Step #511 checks whether the operation of the timer 5 is completed. When it is still in operation, the sequence directly proceeds to step #514. If otherwise, the U-turn rollers 88 are stopped, a U-turn completion flag is set (steps #512 and #513), and steps #514 et seq. thereafter follow for a document stop-transport processing routine.

Step #514 inquires whether a flag is set for feeding (transporting) the sheet. If the answer is negative, the sequence proceeds directly to step #531 in FIG. 53. If otherwise, step #515 recognizes a U-turn completion flag as set up, whereupon the U-turn rollers 88 and the inlet rollers 87a are driven, the conveyor belt 90 is driven at a high speed, and the U-turned sheet is thereby fed onto the glass platen 2 along the fifth passage 105 (steps #516 to #519). Further the U-turn completion flag is reset, and a feed counter is advanced (steps #519 and #520). Step #521 checks whether the sheet is a double-faced original. If it is so, the second sheet is prohibited from advancing into the U-turn passage, and to photograph the second (rear) face of the double-faced sheet D and also to discharge the sheet as inverted after the second exposure, the inverting fourth passage 104 and the U-turn third passage 103 are made usable for the inversion of the sheet D. If the sheet is single-faced, the U-turn flag is set in step #522 to permit U-turn transport of the second sheet. The sequence then proceeds to step #531.

Step #515, when failing to detect the U-turn completion flag in set state, is also directly followed by step #531.

Step #531 checks whether the sheet rear end is detected by the inlet sensor 164. If it is not detected, the sequence directly proceeds to step #541 of FIG. 54. In the case where the inlet rollers 87a are in reverse rotation with the sheet rear end detected, this indicates that the double-faced sheet is being inverted, so that the inlet rollers 87a are stopped, while the conveyor belt 90 is brought out of reverse rotation. When the rollers 87a are not in reverse rotation, a timer 6 is set. The rear end of the double-faced sheet as turned upside down is detected by the inlet sensor 164 second time, and whether the inlet rollers 87a are in forward or reverse rotation serves to distinguish between the insersion of the double-face sheet and stopping of the sheet. Accordingly, if the rollers are not in reverse rotation, the timer 6 is set for slowing down the conveyor belt 90, and if otherwise, the rollers 87a and the belt 90 are stopped.

Subsequently, the sequence proceeds to step #541, which checks whether the operation of the timer 6 is completed. When it is still in operation, step #551 of FIG. 55 directly follows. If otherwise, the U-turn rollers 88 and the inlet rollers 87a are brought to a halt. After step #544 recognizes that the double-face counter value is not 2, i.e., that the double-face sheet is not to be discharged, the belt is slowed down, a timer 7 is set to a period of time required for transporting the sheet D to the specified position on the glass platen 2 (steps #542 to #546), whereupon the sequence proceeds to step #551. When the double-face counter value is found to be 2 in step #544, the counter is reset, and the interruption flag is checked as to whether it is set. When it is set, step #551 follows directly. If otherwise, the U-turn flag and the transport flag are set (steps #549 and #549a) before step #551.

Step #551 interrogates whether the timer 7 is still in operation. If it is so, the sequence proceeds directly to step #555. When the operation of the timer 7 is completed, the brake for the conveyor belt 90 is actuated to stop the sheet D in position on the glass platen 2, a timer 8 is set for starting an exposure, and the motor for the belt 90 is thereafter deenergized (steps #552 to #554). Step #555 then follows.

This step checks whether the operation of the timer 8 is completed. If it is still in operation, the sequence proceeds directly to step #560. If otherwise, step #556 checks whether the stop key 114 is depressed, i.e., whether the interruption flag is set. When the flag is not set, a shutter actuating signal is set, the brake is released, a transport completion flag is set (steps #557 to #559), and the sequence thereafter proceeds to step #560. When the interruption flag is found to be set in step #556, the sequence directly proceeds to steps #560 et seq. without setting the camera shutter actuating signal.

Step #560 interrogates whether the camera 4 has delivered a document change signal on completion of shutter operation. If the answer is in the negative, step #574 of FIG. 56 directly follows, whereas if it is in the affirmative, the document change signal is reset. After step #562 recognizes that the sheet is not a double-faced original, the conveyor belt 562 is driven at a high speed, the transport (feed) completion flag is reset, the discharge rollers 95 are driven, a timer 9 is set to specify when to transport the next sheet (steps #563 and #571 to #573), and the sheet D is delivered from the position on the platen 2 onto the discharge tray 96. The sequence then proceeds to step #574 (for discharge operation).

Figure 58:
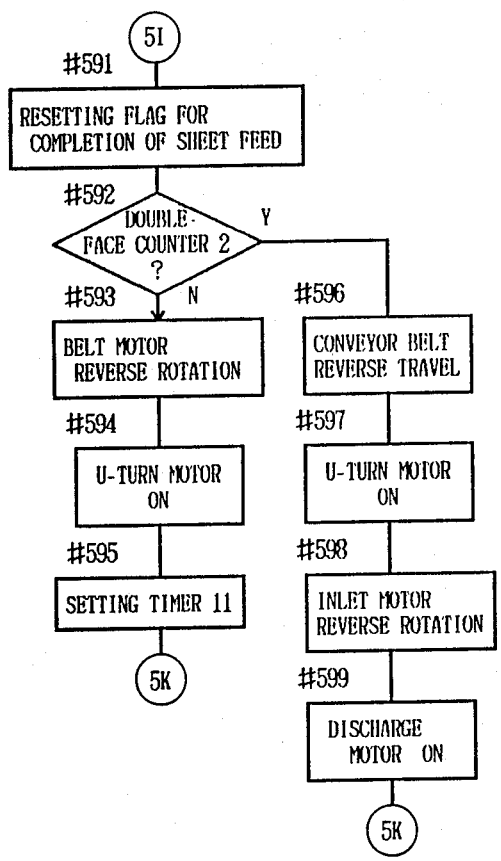

When step #562 detects that the sheet is double-faced, the double-face counter is advanced by +1 in step #564, followed by step #591 in FIG. 58.

In this step, the transport completion flag is reset. When the next step #592 finds that the value of the double-face counter is not 2, steps #593 to #595 are performed, in which to photograph the other surface of the sheet D as fed onto the paten 2 again in an inverted state, the conveyor belt 90 is reversely driven, the U-turn rollers 88 are driven to reversely transport the sheet D from the position on the platen 2, and a register timer 11 is set. Step #574 then follows. If the value of the double-face counter is found to be 2 in step #592, the double-faced sheet D having its rear surface photographed is discharged upon inversion by steps #596 to #598, wherein the conveyor belt 90 is reversely driven with the U-turn rollers 88 also driven, starting to reversely sending out the sheet D off the platen 2, the inlet rollers 87a are reversely driven, and the discharge rollers 95 are also driven. After the discharge, the sequence proceeds to step #574.

To assure complete discharge, the timer 9 for delaying the start of transport of the next sheet D is checked in step #574 as to whether the operation thereof is completed. If it is still in operation, the sequence proceeds to step #576. If otherwise, step #575 is performed before this step to set the transport flag for the next sheet D. In step #576, the discharge sensor 166 (FIG. 1) is checked as to whether the sheet rear end is thereby detected. If the rear end has not been detected, step #581 of FIG. 57 follows. Otherwise, a timer 10 is set for setting a period of time required for the completion of discharge of the sheet, before step #581.

Step #581 checks whether the operation of the timer 10 is completed. When it is still in operation, the sequence proceeds directly to step #587. If otherwise, the value of the sheet feed counter is decremented, and the discharge rollers 95 are stopped. When step #584 founds that the value of the feed counter is 0, this indicates that the final sheet is to be discharged, so that the conveyor belt 90 is stopped, the flag indicating that the feeder B is in operation is reset (steps #582 to #586), and the sequence then proceeds to step #587. Unless the feed counter value is found to be 0 in step #584, step #587 directly follows.

Step #587 checks whether the timer 11 for properly positioning the sheet for inversion has completed its operation. If it is still in operation, sequence returns. If otherwise, the inlet rollers 87a are reversely driven before the return.

In this way, the rear end of the sheet is detected in the passages of the document transport path C by the respective sensors, permitting the next sheet leading end to be projected from the tray in preparation for transport. This assures efficient transport of sheets without time losses. Furthermore, the position where the next sheet is thus slightly sent out for transport can be altered according to the sheet size and also depending on whether the sheet is double-faced or single-faced. Sheets can therefore be transported with a greatly improved efficiency. Moreover, as indicated in dot-and-dash line in FIGS. 12 and 13 the sheet D can be transported similarly also when manually inserted into the DF opening 165.

Next, ADF2 mode will be described which is specified by the mode selection key 119. In this mode, every time the shutter key 112 is depressed, one sheet D is automatically sent out from the position on the pushing-up plate 82, then subjected to single-face or double-face photography and thereafter discharged. The apparatus is subsequently allowed to wait until the key 112 is depressed again. Accordingly, the document sheet transport processing is substantially the same as the processing in ADF1 mode already described with reference to FIGS. 45 to 58 except that sheets are successively or consecutively fed.

Figure 59:
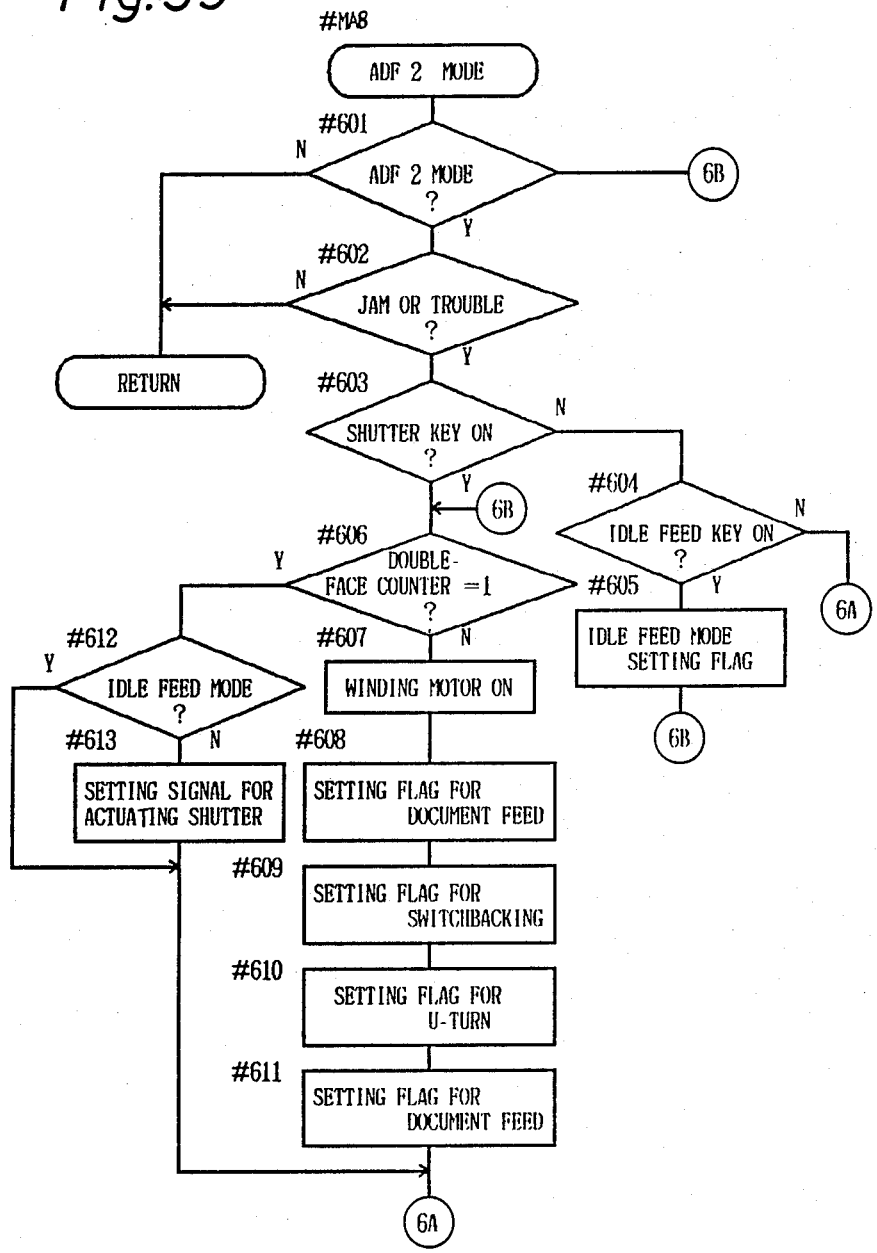
Figure 60:
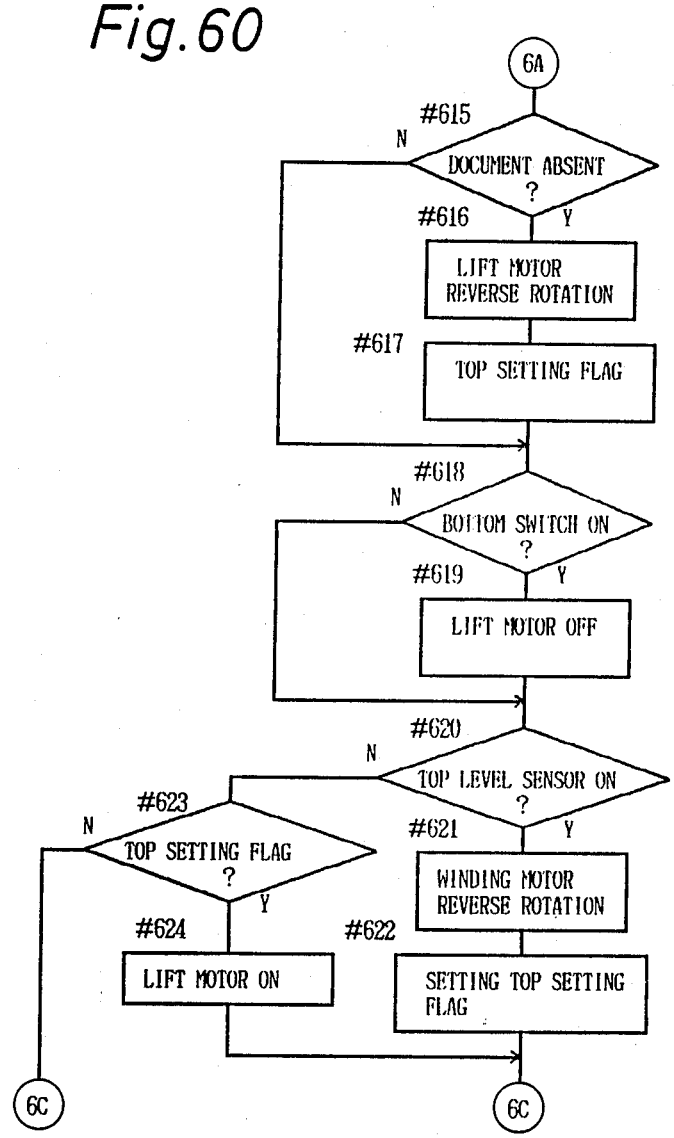
Figure 61:
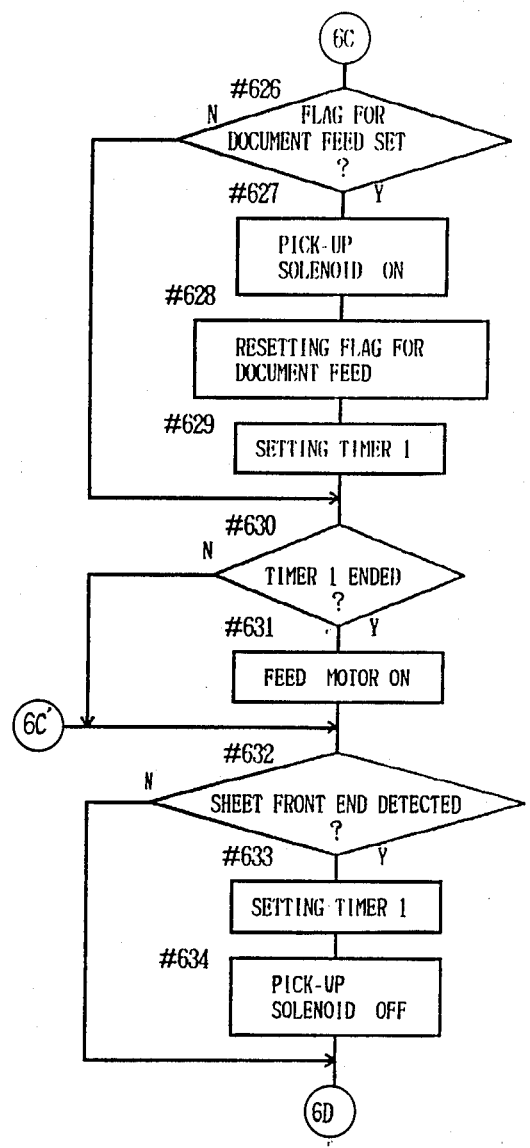
Figure 62:
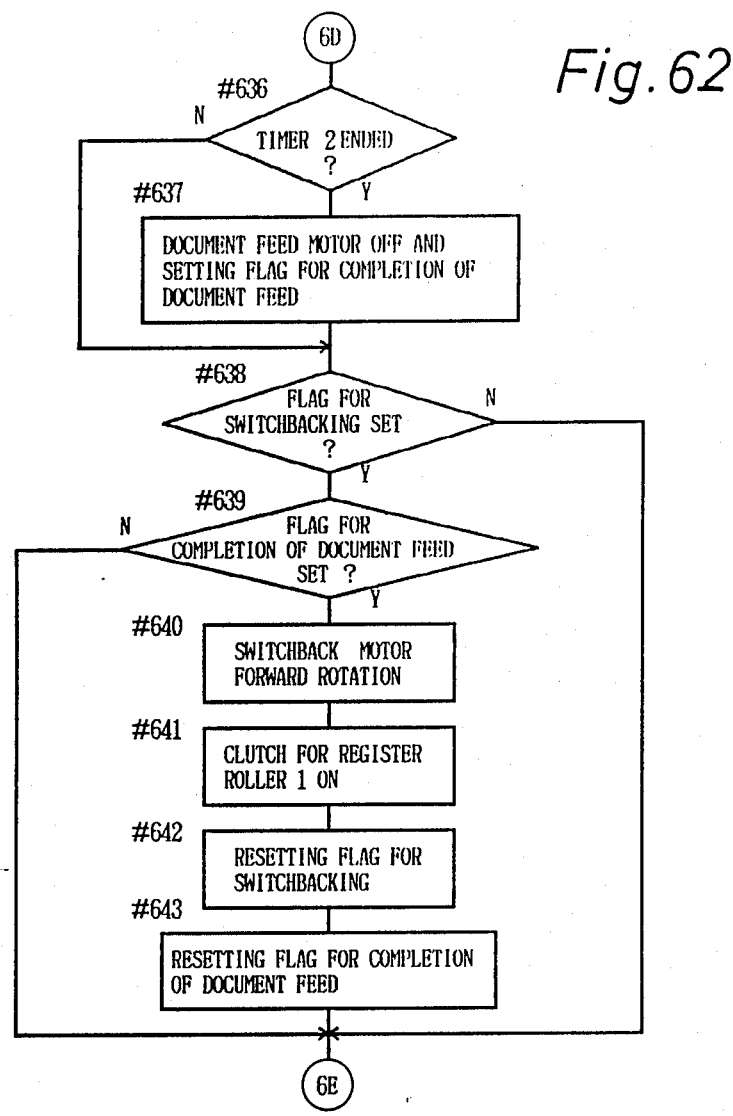

While the overall flow chart of ADF2 mode is shown in FIGS. 59 to 70, the differences only will be described. With reference first to FIG. 59, the sequence progresses from steps #601 through #603 in the same manner as in ADF1 mode. Step #603 checks whether the shutter key 112 is on. If it is off, step #604 follows to check whether the idle feed key 113 is on. In the case of ADF2 mode, keys are manipulated for every document sheet, so that the sheet which need not be photographed is idly transported without exposure. When the idle feed key 113 is on, an idle feed mode flag is set in step #605.

When the shutter key 112 is on in step #603, or via step #605, the sequence proceeds to step #606, in which the value of the double-face counter is checked as to whether it is 1. If it is not 1, steps #607 to #611 are performed for initial setting in the same manner as steps #407 to #411 in ADF1 mode, followed by step #615 et seq. which are the same as step #431 et seq. in ADF1 mode. When the key 113 is not on in step #604, the same steps similarly follow.

When the value of the double-face counter is 1 in step #606, the sequence proceeds to step #612 to check whether the current mode is the idle feed mode. If it is not the ideal feed mode, the shutter actuating signal is set, and the same routine as when step #611 is completed is performed to photograph the sheet D when it automatically fed, whereas if the current mode if idle feed mode, the shutter actuating signal setting step is dispensed with. Although the sheet D is thereafter automatically transported, no exposure is made therefore.

Figure 49:
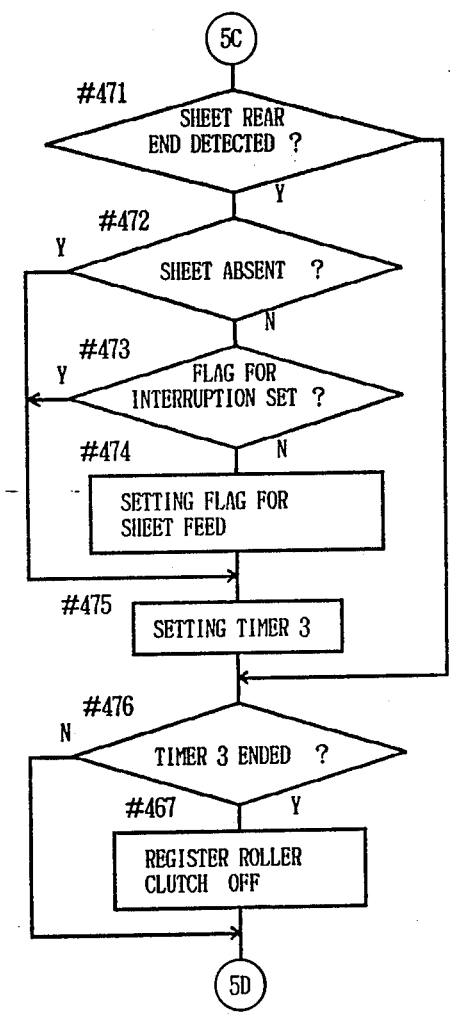
Figure 50:
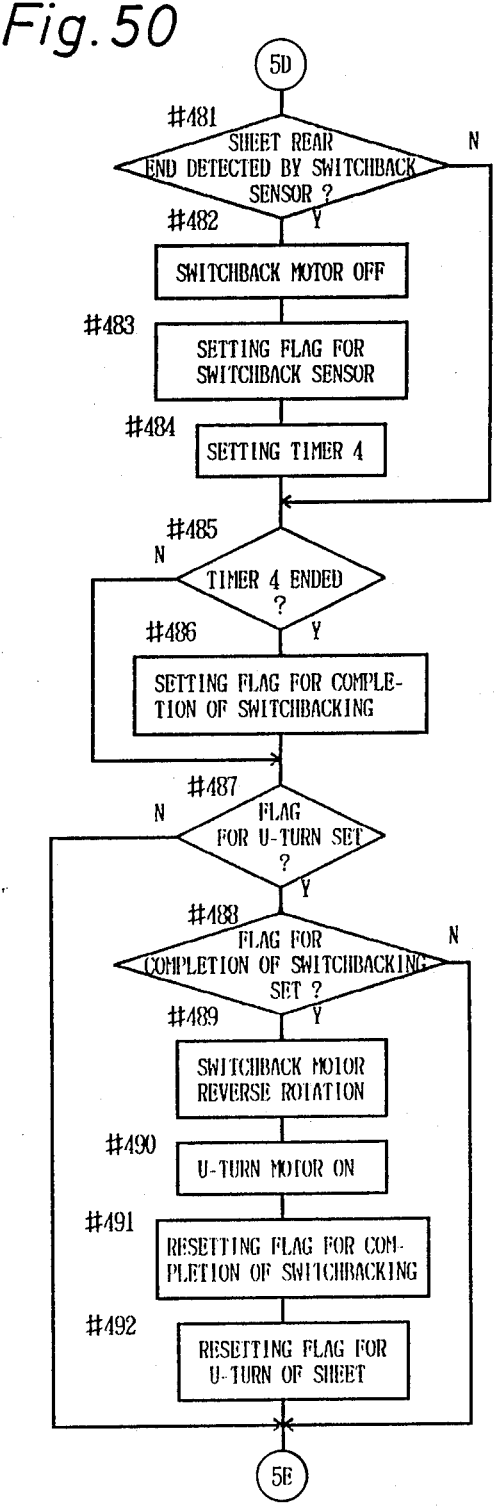
Figure 63:
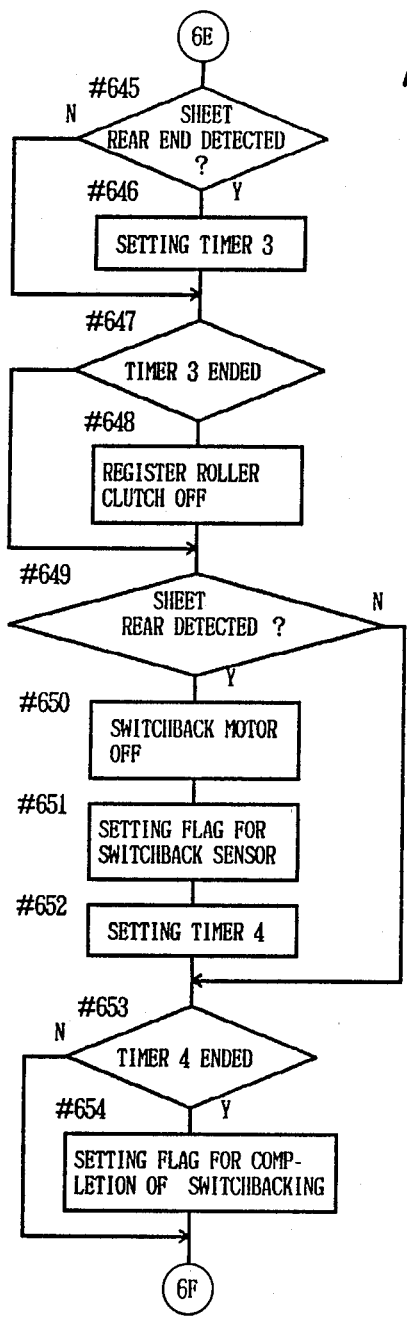
Figure 64:
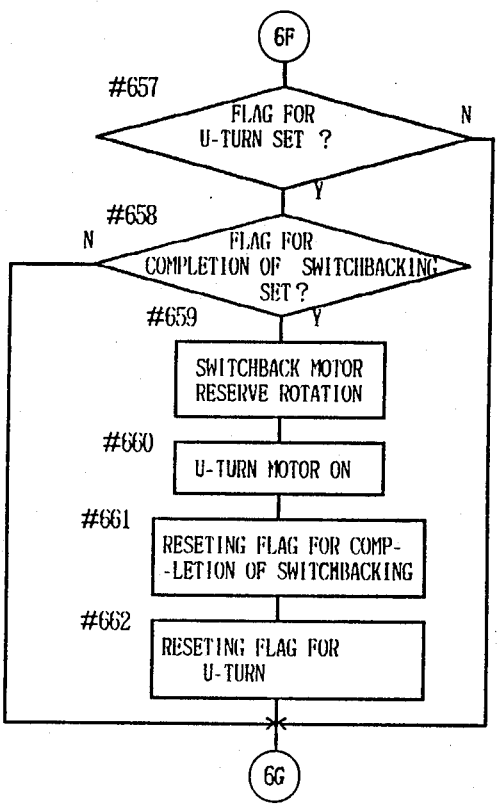
Figure 65:
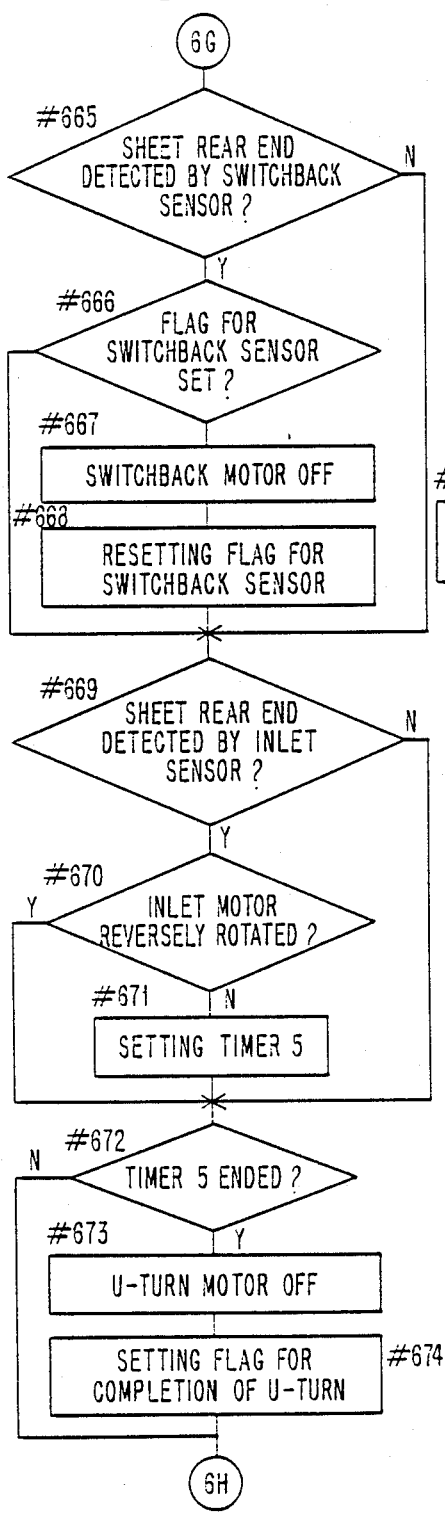
Figure 66:
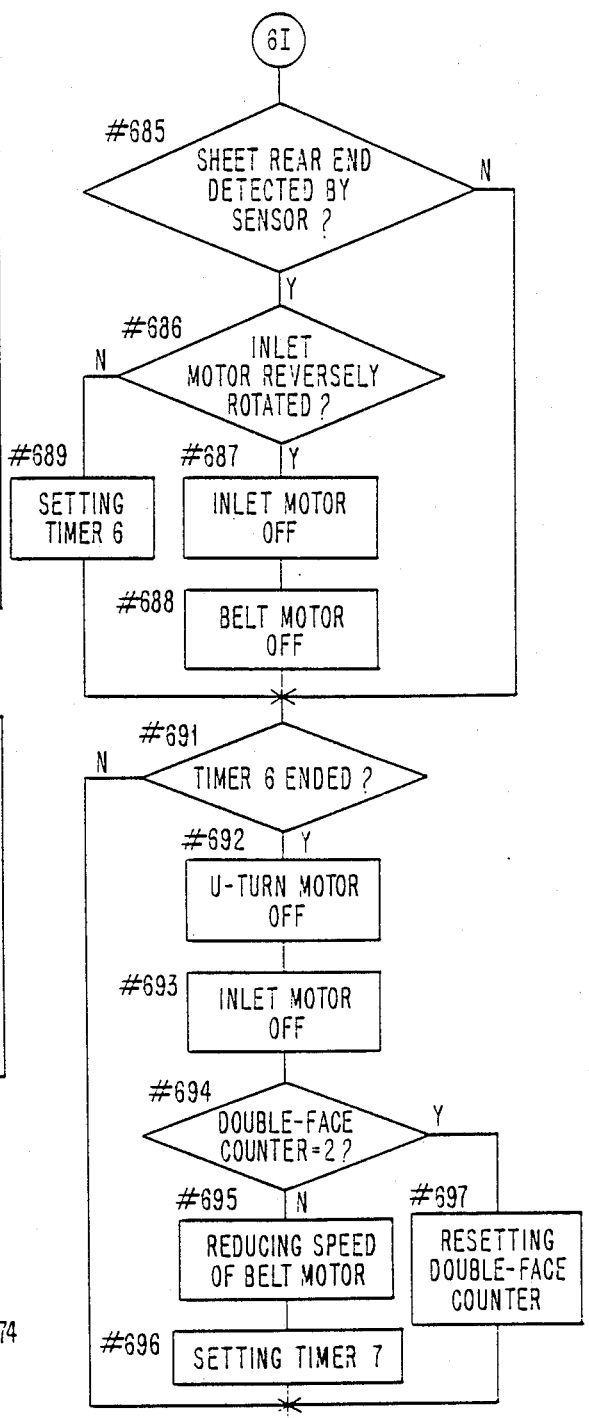

The following steps up to step #645 in FIG. 63 are the same as those up to step #471 in FIG. 49 in ADF1 mode. Even when the sheet rear end is detected by the separation sensor 163 in step #645, there is no need for a flag requesting feed of the next sheet, so that steps #472 to #474 of FIG. 49 in ADF1 mode are omitted. Steps #646 to #682 (FIGS. 63 to 66) are generally the same as step #475 to step #520 of FIG. 52.

ADF2 mode slightly differs from the foregoing mode. Since a single sheet is handled in the present mode, there is no need for switchback request for preprojected sheet D, and steps #505 and #506 in ADF1 mode are omitted. Instead of advancing the feed counter in step #520 in ADF1 mode, the transport flag is reset in step #682. Whereas control for U-turn transport is needed depending on whether the sheet is double-faced in steps #521 and #522 in ADF1 mode, such control is unnecessary and eliminated in the present mode.

Figure 53:
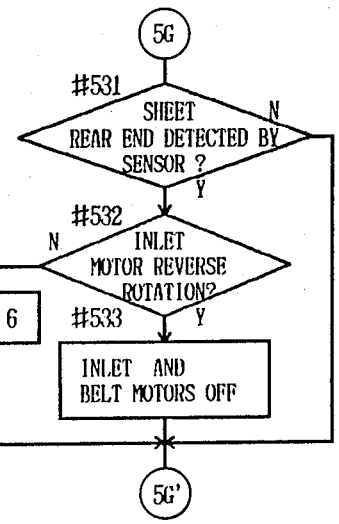
Figure 54:
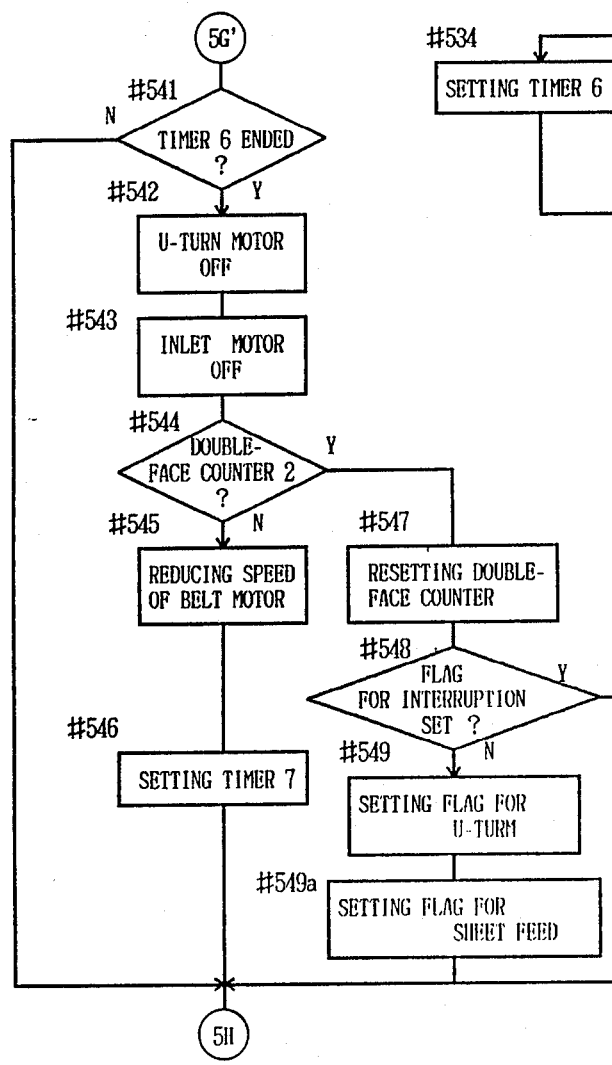
Figure 55:
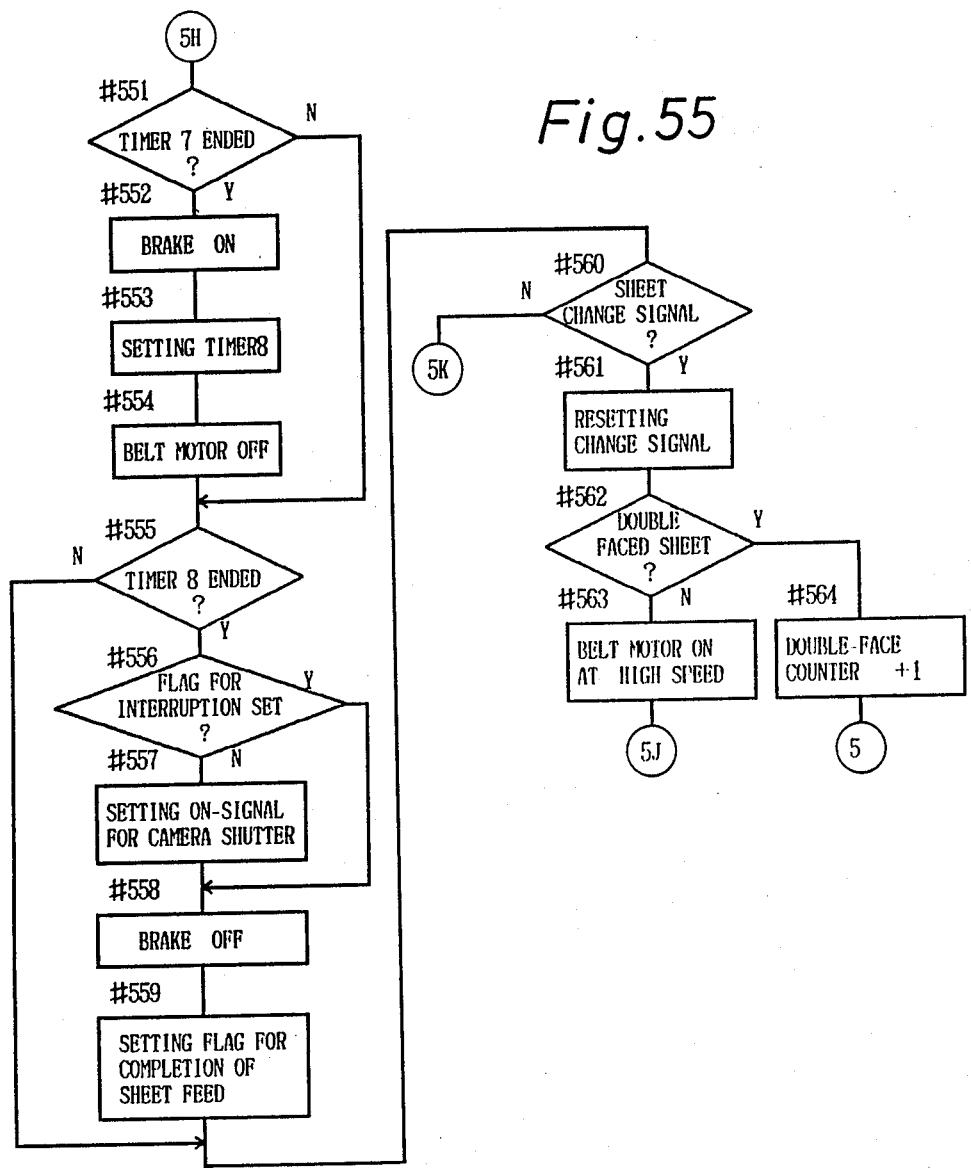
Figure 56:
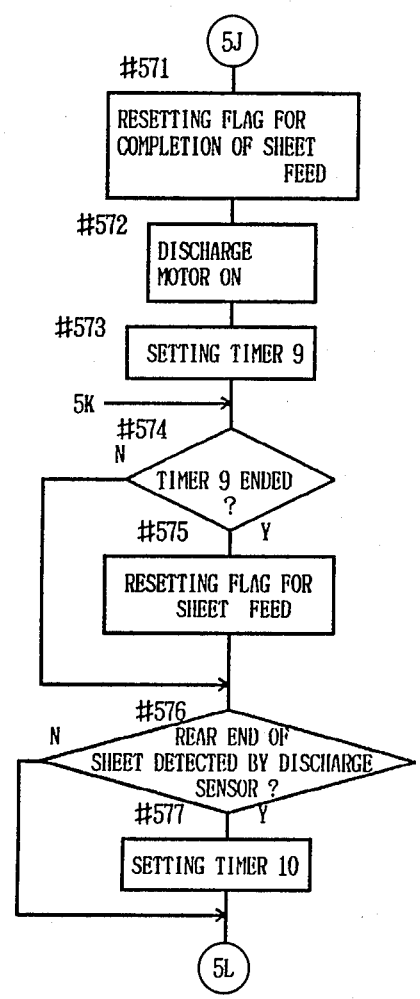
Figure 57:
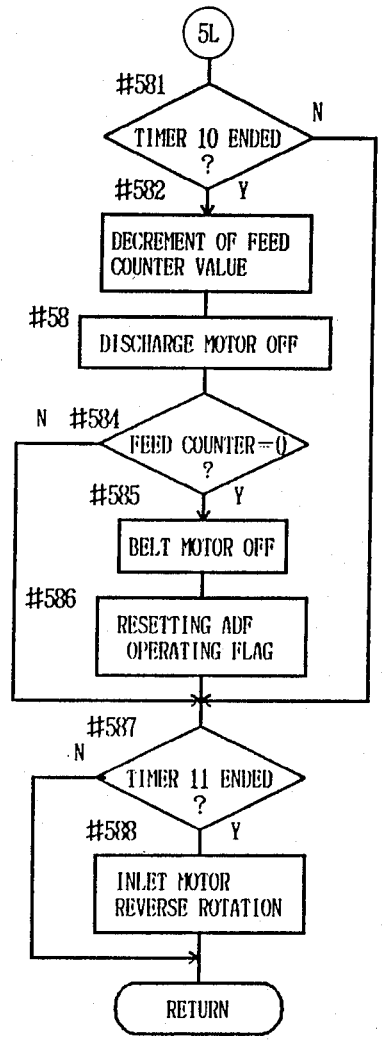
Figure 67:
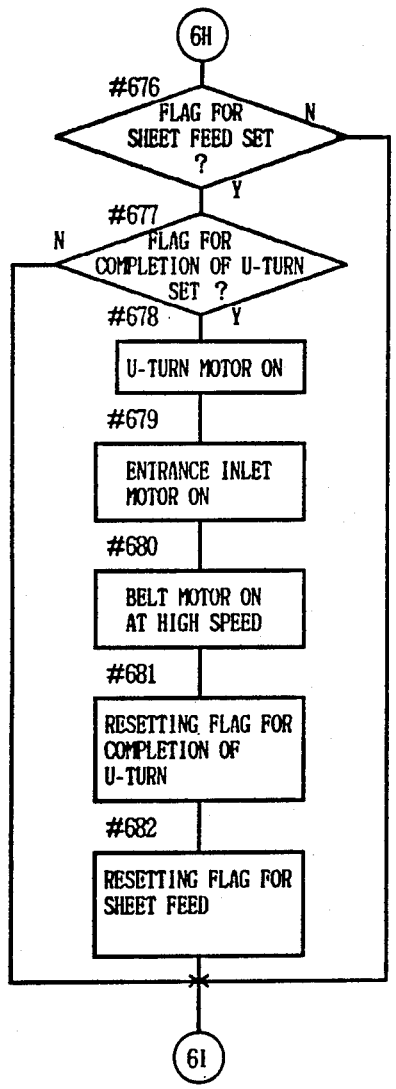
Figure 68:
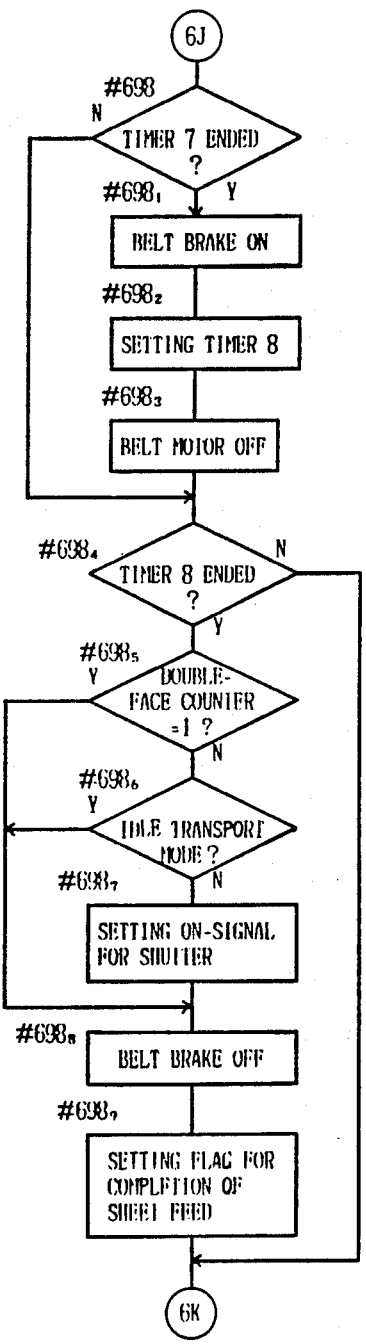
Figure 69:
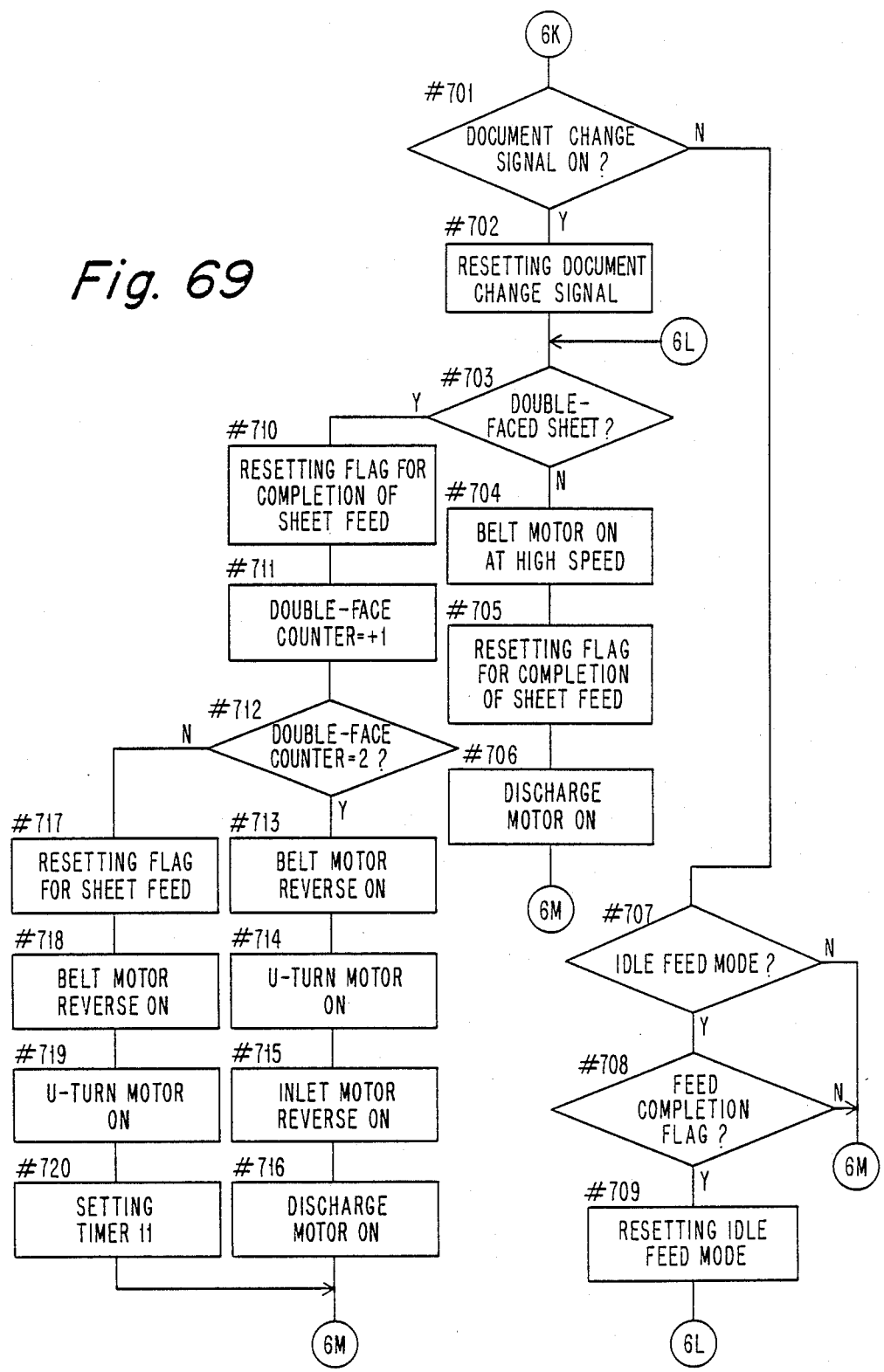
Figure 70:
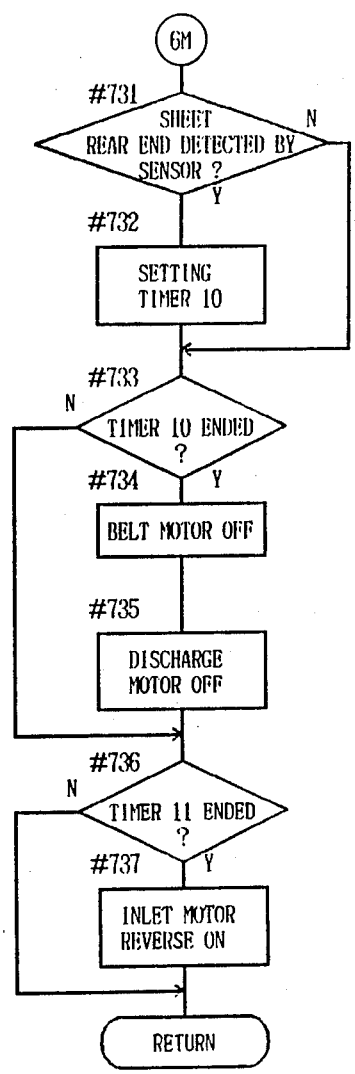

Accordingly, step #682 is followed by step #685 of FIG. 67 to step #698$_4$ of FIG. 68, which are generally the same as step #531 of FIG. 53 to step #555 of FIG. 55 in ADF1 mode.

ADF1 mode includes step #548 to #549a wherein the U-turn or transport flag is set or not set depending on the presence of the interruption flag, but these steps are omitted in the present mode, hence difference.

With reference to FIG. 68, step #698$_4$, the timer 8 is operated for stopping the sheet D in the specified exposure position on the glass platen 2. In ADF1 mode, the shutter actuating signal is set when there is no interruption flag after the completion of the timer 8 With the present mode, however, the shutter actuating signal is not set if the double-face counter is 1 and if the current mode is idle feed mode (steps #698$_5$ and #698$_6$) when the operation of the timer 8 is completed, so that every sheet is idly transported in the idle mode and also in the case of the rear surface if the sheet is double-faced. Otherwise, the shutter actuating signal is set to avoid idle feed (step #698$_7$).

If step #698$_5$ is omitted from the flow, double-faced sheets will be subjected to non-successive photographic processing in ADF2 mode for both surfaces thereof, i.e., for each page.

As in mode ADF1, step #698$_7$ is followed by the release of the brake and setting of the transport completion flag. The sequence then proceeds to step #701 et seq. of FIG. 69. Like step #560 of FIG. 55 in ADF1 mode, step #701 checks whether there is a sheet change signal. If the signal is present, the signal is reset in step #702, and the sheet is checked as to whether it is double-faced. When it is not so, steps #704 to #706 and steps #731 to #738 are performed which are similar to steps #563 and steps #571 to #577 of FIGS. 55 and 56, and steps #581 to #588 in FIG. 59 in ADF1 mode, whereby one sheet is automatically fed in idle mode or for exposure. The apparatus then remains in stand-by state until the shutter key 112 is depressed again.

In ADF1 mode, the feed flag for the next sheet is automatically set in steps #573 to #575, and the feed counter value is decremented and checked in steps #582 and #584, whereas these steps are unnecessary for ADF2 mode. This is another difference.

If no sheet change signal is found in step #701 and further when the idle feed mode and transport completion flag are recognized in steps #707 and #708, idle feed mode is reset in step #709, whereupon step #703 follows. If the idle feed mode or the feed completion flag is not recognized, the sequence proceeds to step #731 et seq.

When the sheet is found to be double-faced in step #703, step #710 follows, in which the feed completion flag is reset. In the next step #711, the double-face counter is advanced by +1, whereupon step #712 checks whether the double-face counter is 2.

This step is the same as step #592 of FIG. 58 in ADF1 mode. When the double-face counter is 2, steps #713 to #716 are performed exactly in the same manner as steps #593 to #599 in FIG. 58. If otherwise, steps #717 to #720 are performed in the same manner as steps #593 to #595 of FIG. 58 except that the feed flag is set in step #717.

Thus, one sheet D can be automatically fed every time the shutter key 112 is depressed in ADF2 mode. While directing attention to individual document sheets and entering retrieval data into a personal computer, a multiplicity of document sheets can be automatically fed and photographed with a minimum required time interval.

Moreover, some sheets can be idly transported without exposure, hence convenient. When the idly transported sheets are delivered to the guide table 211 shown in FIGS. 1 to 9 through the DF opening 165, these sheets can be conveniently distinguished from the photographed sheets delivered onto the discharge tray 96.

The DF mode processing will be described which is included in the main routine of FIGS. 20 and 21 and which is a subroutine for automatically feeding the sheet D manually inserted into the DF opening 165. First, step #801 in FIG. 71 checks whether DF mode is set. If the set mode is not DF mode, step #802 checks whether the sensor 219 is actuated by the guide table 211 in its higher position. When it is on, the warning subroutine of step #805 follows to give an alarm, whereupon the sequence returns.

The alarm is given for the following reason. As already described with reference to ADF1 mode, the sheet is sent into the second passage 102 from the first passage 101 for switchbacking and projected from the DF opening 165 onto the guide table 211. If the guide table 211 is in its raised position indicated in phantom line in FIG. 1 at this time, the sheet is likely to jam the opening portion or become damaged upon striking on the table end. Except in DF mode, therefore, an alarm is given in the warning routine if the guide table 211 is in the raised position to urge the operator to lower the table 211.

Although the warning routine is not shown in detail, a lamp on the operation panel 111 or buzzer is turned on, with prohibition of photographic operation.

When the sensor 219 is off with the table 211 in its lower position in step #802, step #803 inquires whether the sensor 221 is detecting the positioning guides 217 in the outermost position. When the inquiry is answered in the affirmative, the sequence returns, permitting the control system to execute processes in modes other than DF mode, whereas if otherwise, the warning subroutine of step #804 follows, whereupon the sequence returns.

This is due to the following reason. Unless the positioning guides 217 are in the outermost position, the sheet D projecting outward from the DF opening 165 for switchbacking is likely to strike on the guide 217 depending on the width of the sheet and to jam the opening portion or become damaged as in the case of the guide table 211. Thus, the positioning guides 217 should be in the outermost position except in DF mode. In DF mode, however, there is no need to give such consideration since the sheet D is manually inserted from above the guide table 211.

With reference to FIGS. 1 and 9, the front end of the positioning guide 217 is slanted as at 217a, so that should the guides 217 be set with a spacing smaller than the width of the sheet D to be projected for switchbacking in ADF1 or ADF2 mode, the sheet D will be slidingly move along the slating ends 217a onto the guides 217 and therefore will not cause a jam or become damaged. Accordingly, the warning routine can be omitted.

On the other hand, when DF mode is recognized in step #801, the sequence proceeds to steps #806 et seq. for DF processing routine. First, step #806 checks whether the sensor 219 is actuated by the guide table 211 in its upper position. If it is off, the sequence proceeds to the warning subroutine of step #807. If it is on, steps #812 et seq. follow for DF mode processing routine.

This is due to the following reason which is different from the reason already given above. Unless the guide table 211 is in its raised position, the sheet D, when to be manually inserted into the DF opening 165 from above the guide table 211, fails to smoothly enter the opening and is likely to become damaged by engagement with the opening lower edge portion. To avoid such trouble, the guide table 211 is raised before executing the actual DF mode process. The table 211 should therefore be in the raised position in the DF mode.

With the guide table 211 in its raised position, the sequence proceeds to step #812, which checks whether the DF opening sensor 230 is on. If it is on, a timer 27 is set to a period of time required for the sheet D to be properly brought into nipping engagement with the switchback rollers 87 after the sensor 230 is actuated (step #813). If the sensor is not on, step #814 directly follows, in which the timer 27 is checked for the completion of its operation. When the timer 27 is out of operation, the inlet sensor 230 is checked again as to whether it is on to thereby detect whether the sheet D is withdrawn after insertion (step #815). If it is withdrawn, the sequence returns. If otherwise, the sequence proceeds to step #821 of FIG. 72. When a feed flag is set for automatically transporting the manually inserted sheet D, the switchback rollers 87 are driven in step #823. The flag, when not set, is set up in step #822 before step #823. The U-turn rollers 88 are then driven in step #824.

Consequently, the manually inserted sheet D is sent from the second passage 102 into the third passage 103, and step #825 then follows.

Figure 71:
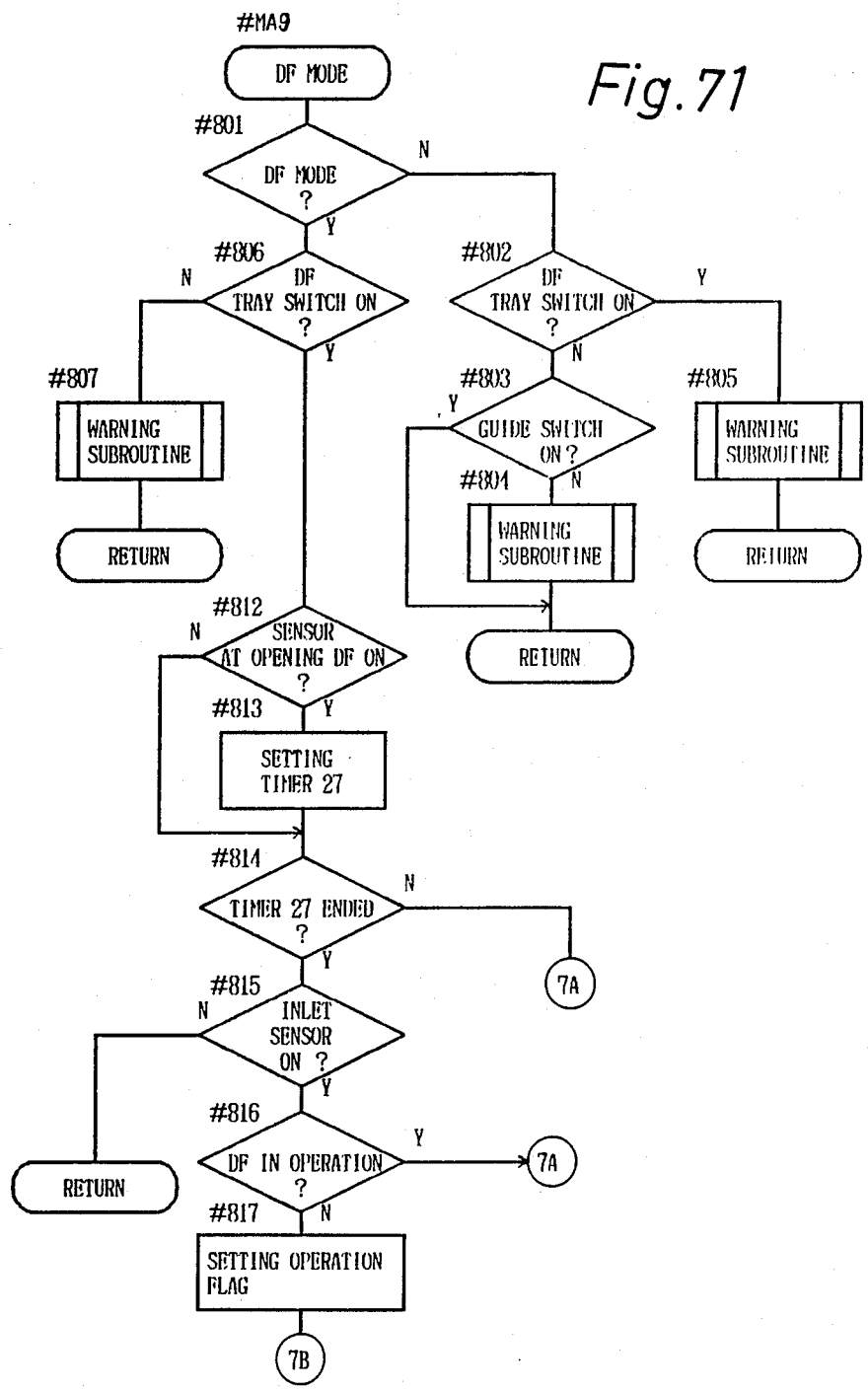
Figure 72:
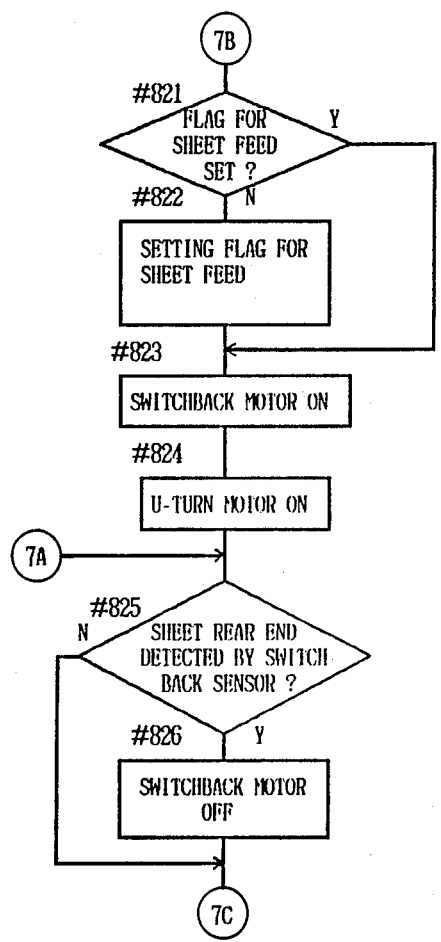
Figure 73:
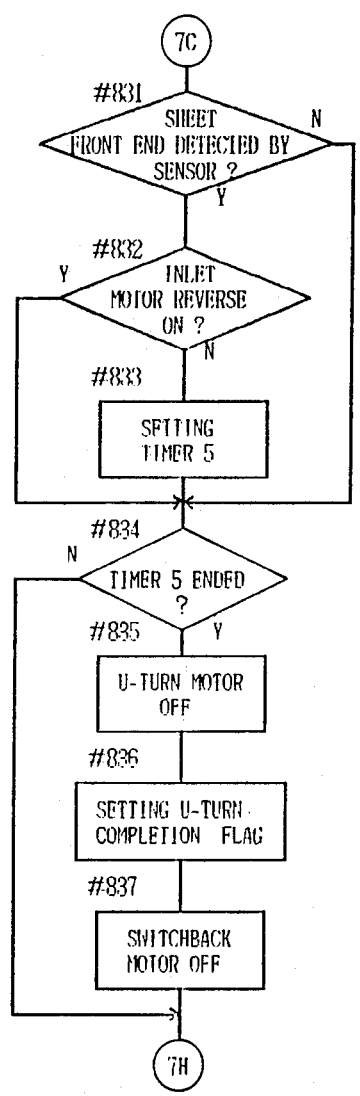
Figure 74:
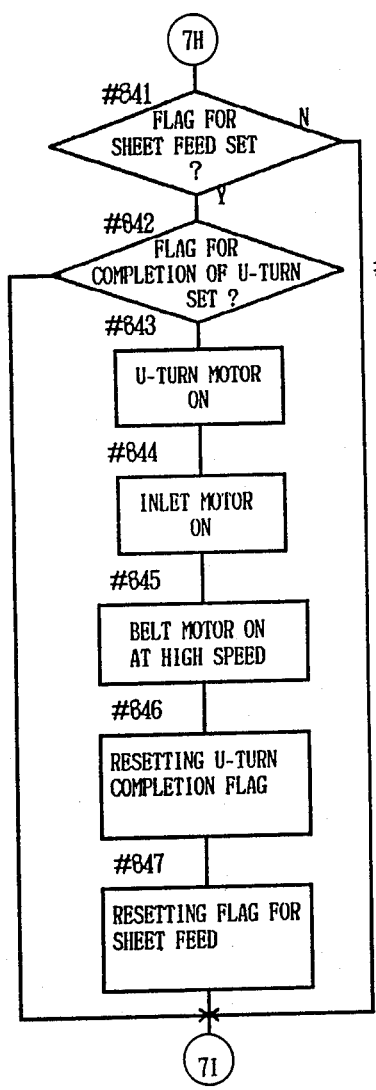
Figure 75:
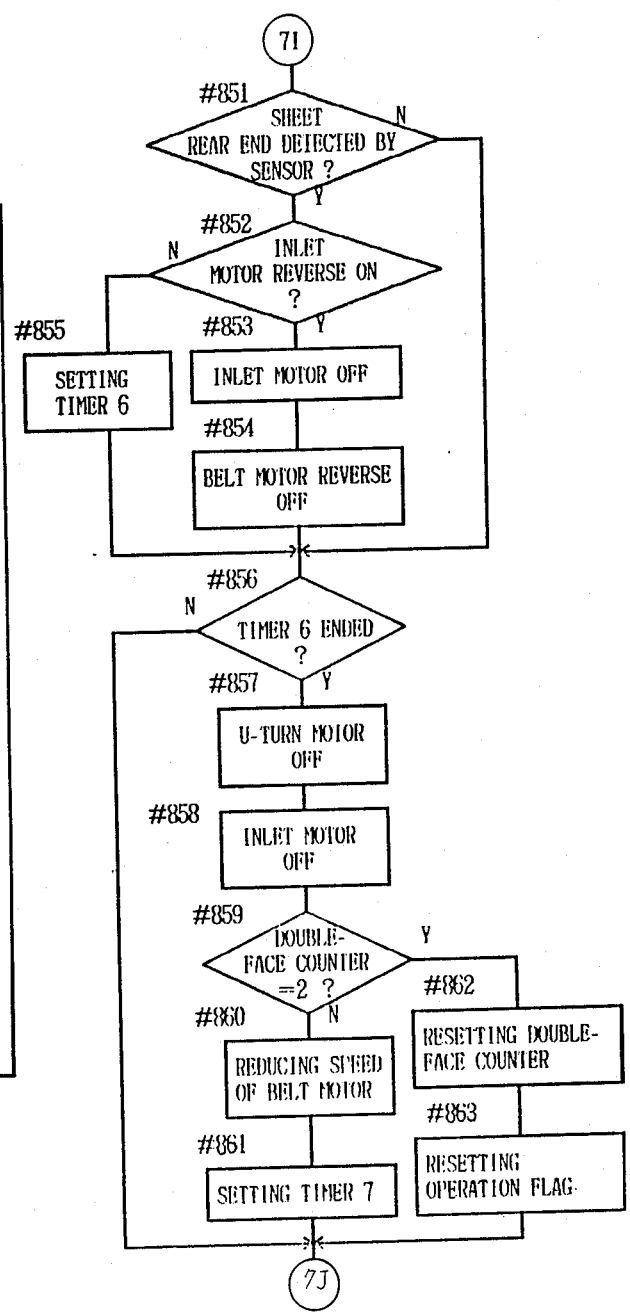
Figure 76:
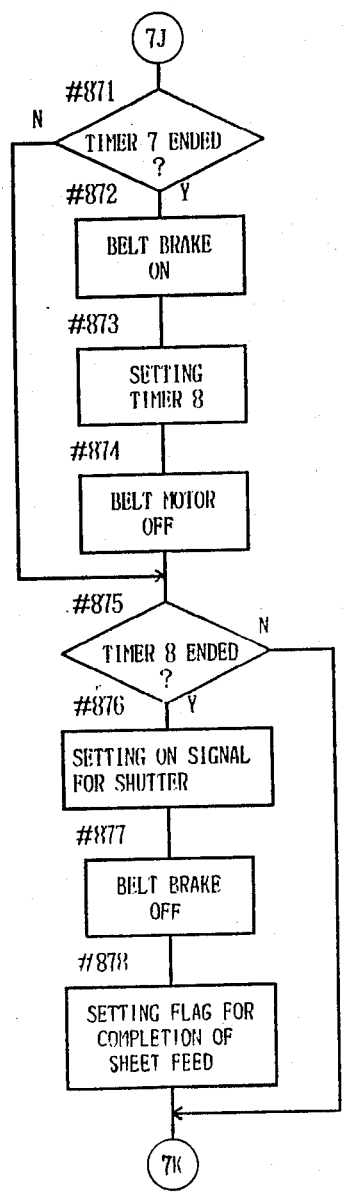
Figure 77:
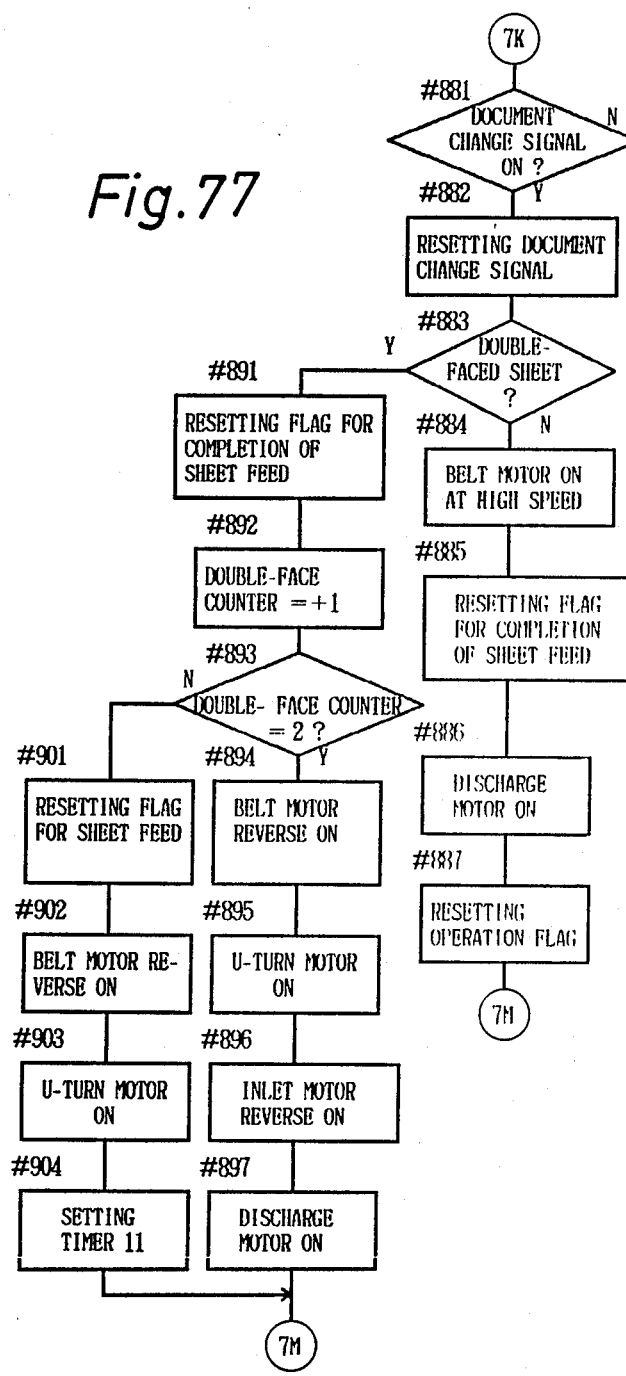
Figure 78:
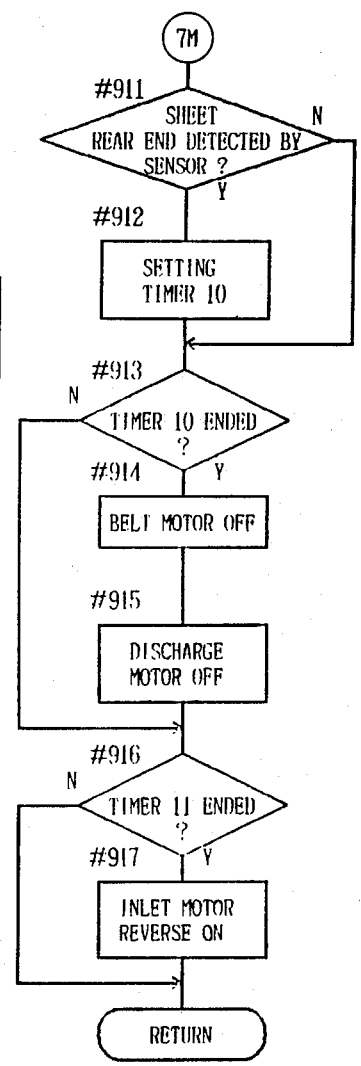

On the other hand, when the timer 27 is still in operation in step #814 of FIG. 71, it is likely that the sheet D is not in nipping engagement with the switchback rollers 87. The sequence then directly proceeds to step #825 without effecting the above feed operation.

When the sheet rear end is detected by the switchback sensor 164 in step #825, this indicates that the sheet has been forwarded by the switchback rollers 87, which are therefore stopped. If otherwise, the sequence proceeds to FIG. 23, step #831.

This step checks whether the sheet D is detected by the inlet sensors 13, 14. When it is not detected, step #834 directly follows. If otherwise, step #832 checks whether the inlet rollers 87a are in reverse rotation, i.e., whether the sheet has reached the rollers through U-turn travel or is double-faced and has reached the rollers through inversion travel. If the sheet has been inverted, the sequence proceeds to step #834. When the sheet has been passed through the U-turn passage, the register timer 5 is set in step #833 before step #834.

Step #834 inquires whether the timer 5 has completed its operation. If it is still in operation, the sequence proceeds to step #841 in FIG. 74. If otherwise, the U-turn rollers 88 are stopped, the U-turn completion flag is set and the switchback rollers 8 are halted (steps #835 to #837). The sequence then proceeds to steps #841 et seq. for a document stop-transport processing routine.

Step #841 checks whether the feed flag is set for the sheet D. When it is not set, the sequence directly proceeds to step #851 in FIG. 75. If the flag is set, the U-turn completion flag as set up is detected in step #842, whereupon the U-turn rollers 88 and the inlet rollers 87a are driven, and the conveyor belt 90 is driven at a high speed to feed the sheet D from the U-turn passage onto the platen 2 along the fifth passage 105 (steps #843 to #845). Further the U-turn completion flag and feed counter advance flag are reset (steps #846 and #847), whereupon the sequence proceeds to step #851.

When the U-turn completion flag is not set up in step #842, the sequence also proceeds directly to step #851.

Step #851 checks whether the sheet rear end is detected by the inlet sensor 164. If it is not detected, step #856 directly follows. When it is detected, the inlet rollers 87a and the conveyor belt 90 are stopped before step #856 if these rollers 87a and belt are in reverse rotation. When the inlet rollers 87a are not in reverse rotation, the timer 6 is set before the step #856 (steps #853 to #855).

Step #856 checks whether the timer 6 has completed its operation. If it is still in operation, the sequence proceeds directly to step #871 in FIG. 76. If otherwise, the U-turn rollers 88 and the inlet rollers 87a are stopped. After step #859 recognizes that the double-face counter value is not 2, i.e., that the double-face sheet is not to be discharged, the belt 90 is slowed down, the timer 7 is set to a period of time required for transporting the sheet D to the specified position on the glass platen 2 (steps #857 to #861), whereupon the sequence proceeds to step #871. When the double-face counter value is 2 in step #859, the counter is reset, and the operation flag is reset (steps #862 and #863). Step #871 then follows.

Step #871 inquires whether the timer 7 is still in operation. If it is so, the sequence proceeds directly to step #875. When the operation of the timer 7 is completed, the brake for the conveyor belt 90 is actuated to stop the sheet D in position on the glass platen 2, the timer 8 is set for starting an exposure, and the motor for the conveyor belt 90 is thereafter deenergized (steps #872 to #874). Step #875 then follows.

Step #875 checks whether the operation of the timer 8 is completed. If it is still in operation, the sequence proceeds directly to step #881 of FIG. 77. If otherwise, a camera shutter actuating signal is set, the brake is released and the feed completion flag is set (steps #876 to #878). Step #881 then follows.

Step #881 inquires whether the microfilming camera 4 has delivered a document change signal on completion of shutter operation. If the answer is in the negative, step #911 of FIG. 78 directly follows, whereas if it is in the affirmative, the document change signal is reset (step #882). After step #883 detects that the sheet is not double-faced, the conveyor belt 562 is driven at a high speed, the feed completion flag is reset, the discharge rollers 95 are driven, and the operation flag is reset (steps #884 to #887), whereby the sheet D is delivered from the position on the platen 2 onto the discharge tray 96. The sequence then proceeds to step #911.

When step #883 detects that the sheet is double-faced, the feed completion flag is reset, and the double-face counter is advanced by +1 (steps #891 and #892). Step #893 then follows.

When step #893 finds that the double-face counter value is not 2, steps #901 to #904 are performed, in which to photograph the other surface of the sheet D as fed onto the platen 2 again in an inverted state, the feed flag is set, the conveyor belt 90 is reversely driven, the U-turn rollers 88 are driven to start reversely transporting the sheet D from the position on the platen 2, and the register timer 11 is set. Step #911 then follows.

In step #911, the discharge sensor 166 is checked as to whether the sheet rear end is thereby detected. If the rear end has not been detected, step #913 follows Otherwise, the timer 10 is set for setting a period of time required for the completion of discharge of the sheet, before step #913

Step #913 checks whether the operation of the timer 10 is completed. When it is still in operation, the sequence proceeds directly to step #916. If otherwise, the conveyor belt 90 and the discharge rollers 95 are stopped, followed by step #916. This step checks whether the timer 11 for properly positioning the sheet for inversion has completed its operation. If it is still in operation, sequence returns If otherwise, the inlet rollers 87a are reversely driven before the return.

The guide table included in the foregoing embodiment is manually movable upward or downward, whereas the table can be made automatically movable upward or downward as by a motor or solenoid, with the selection of DF mode on the operation panel or with the change of mode to a mode other than DF mode With reference to the flow chart of FIG. 79, target processing included in the main routine will be described below. First, step #1001 checks whether a flag is set which indicates that a sheet D is moving past the location of switchback sensors 13, 14 (i.e. traveling sheet flag). If the flag is set, the sequence proceeds directly to step #1005. If otherwise, a card 12 moving past the location of sensors 13, 14 is detected by the switchback sensor 13 detecting the leading end of the sheet D and by the switchback sensor 14 detecting the leading end of the sheet D, whereupon the traveling sheet flag is set (steps #1002 to #1004). The sequence proceeds to the routine of step #1005 for detecting data from the signal holes 11.

When the switchback sensor 13 fails to detect the sheet end, step #1011 follows. If the switchback sensor 14 also fails to detect the sheet in this step, this indicates that no card 12 is traveling, so that the sequence returns. However, when the sheet is detected by the switchback sensor 14, this can be interpreted as indicating that the card 12 is skew since both the sensors 13 and 14 do not detect the card 12 at the same time. The sequence proceeds to step #1012 for a skew remedy routine. Further when the switchback sensor 14 fails to detect in step #1003, the skew remedy routine of step #1012 also follows since both the sensors 13, 14 do not detect the card 12 at the same time.

The switchback rollers 87 are stopped in step #1012, the timer α is set in step #1013, and the traveling sheet flag is set in step #1014, whereupon the sequence returns. The switchback rollers 87 are held at least for a predetermined period of time set on the timer α (steps #1005 and #1006). In the meantime, the leading end of the card 12 is properly positioned at the nip of the rollers 87 to remedy the skew. This skew remedy procedure is effected also during the automatic feed of the sheet D in the same manner as in the target processing routine.

Step #1005 checks whether the operation of the timer α is completed. If the timer is still in operation, the sequence proceeds to the signal hole detecting routine of steps #1007 et seq. If otherwise, the switchback rollers 87 are driven to resume the transport of the card 12 in step #1006 before step #1007. In step #1007, rise of the output of the sensor 13, if any, is detected, whereupon step #1008 follows. If the switchback sensor 14 is off, the traveling sheet flag is reset in step #1017. The sequence then returns. When the sensor 14 is on, a target counter for mode setting input is advanced by +1 in step #1009, whereupon the sequence returns. When there is no rise of output of the sensor 13 in step #1007, the sequence proceeds to step #1015 to check the switchback sensor for a rise in its output. The sequence returns after advancing the target counter by +1 when the rise is detected. When no rise is detected, the sequence returns directly.

With reference to FIG. 79, the line (1) represents the routine to be performed when the rear end of the document sheet moves past the location of switchback sensors 13, 14. The line (2) represents the routine to be performed when the signal holes 11 in the card 12 are opposed to the switchback sensor 13, which in turn counts the number of holes 11 while the switchback sensor 14 is detecting the passage of the card 12. The line (3) represents the routine to be performed when the signal holes 11 in the card 12 are opposed to the sensor 14, which in turn counts the number of holes 11 while the sensor 13 is detecting the passage of the card 12. The line (4) represents the routine to be performed while the card 12 is moving past the sensors 13, 14.

Consequently, even if the card 12 is transported with top up or down randomly, the signal holes 11 can be counted up. Based on the resulting count signal, the surface to be photographed of single-faced or double-faced document sheets can be specified, or a batch request or block request can be realized to execute suitable processing.

Next, the operation of the microfilming camera will be described with reference to the flow charts of FIGS. 80 to 93.

These flow charts show the operation of the microfilming camera conducted in response to a shutter-on signal given by the shutter key 112 during the operation of the feeder B (FIG. 55, step #557) or in the manual mode wherein the feeder is not used. First, step #1201 in FIG. 80 checks whether a shutter-on signal (shutter actuating signal) is given. If there is no signal, the sequence proceeds directly to step #1207. When neither a film winding flag (indicating that the film is being wound) nor a set mode flag (which is set when the magnification or aperture size is being altered) is set (steps #1202 and #1203), the shutter solenoid 167 is energized to open the shutter 168, and the shutter-on signal is reset. The automatic exposure (AE) circuit is energized, and a timer 20 is set which determines the operating period of the AE circuit (steps #1204 to #1206), whereupon the sequence proceeds to step #1207. If the film winding flag or the set mode flag is found to be set in step #1202 or #1203, step #1207 directly follows without actuating the shutter.

Step #1207 checks the timer 20 as to whether its operation is completed. When it is still in operation, the sequence proceeds directly to step #1219 of FIG. 81. If otherwise and further when a shutter-off signal is given by the AE circuit (step #1211), the shutter solenoid 167 is deenergized, the AE circuit is deenergized, a film winding flag (in this case, film winding request flag) and a document sheet change signal are set, and a fullsize request is made (steps #1212 to #1218). When the desired frame size is full size, the frame number counter is advanced by +2 in step #1218, while if it is half size, the counter is advanced by +1 in step #1217. The sequence proceeds to steps #1219 et seq. for film winding. In the above process, the shutter-off signal is checked on completion of the timer (20) operation without utilizing the data available from the CdS sensor of the light measuring portion 24 because the sensor data involves variations and is inaccurate.

Step #1219 checkes whether the film winding request flag is set subsequent to the shutter operation. If it is not set, step #1232 of FIG. 82 follows. If otherwise, step #1220 inquires whether the blip mark light is on. When the mark is alight, the film is not wound up until the light goes off, and the sequence proceeds directly to step #1232. When the mark is not on, the frame counter is checked as to whether it is alight in step #1221. If it is alight, the film is not wound up until the light goes off, but step #1232 follows. If it is not alight, the film winding motor is energized. When an instruction is given to record the frame counter, a flag is set requesting frame counter recording, and the blip mark level is checked. In the absence of the instruction, the level checking step directly follows. When the blip mark is to be recorded, i.e., when the level is 1 to 3, a blip mark request flag is set (steps #1222 to #1226. The sequence then proceeds to step #1231 of FIG. 82 to set the film winding flag, followed by step #1232.

Thus, when the blip mark or frame counter is alight for data recording, the film winding routine is not performed but delayed. This obviates the possible failure in recording the data. Generally, the time when the shutter closes (completion of operation of the timer 20) is dependent on the brightness of the sheet D and is determined by automatic exposure means, whereas the exposure time for recording the blip mark or frame counter is constant (timer 26, 25). Should the microfilming exposure time be shorter than the recording exposure rime, it is likely that the film will be wound up before the blip mark or the counter is recorded completely to result in a failure.

Step #1232 checks whether the film winding flag is set. If it is not set, the sequence proceeds to step #1251 of FIG. 83. When it is set, a one-frame switch is checked in step #1251 as to whether it is on. If the switch is on, the film winding motor is deenergized, and the frame number counter value is decremented. If the resulting countervalue is not 0, the winding motor is energized again to wind up the film F by two frames for full-size microfilming of a large-size document sheet. If the counter value is 0, an inertia absorbing timer 21 is set. Step #1239 then follows. When the timer 21 is still in operation, the sequence proceeds to step #251. When the timer operation is completed, the film winding flag is reset before this step (steps #1234 to #1240).

Figure 84:
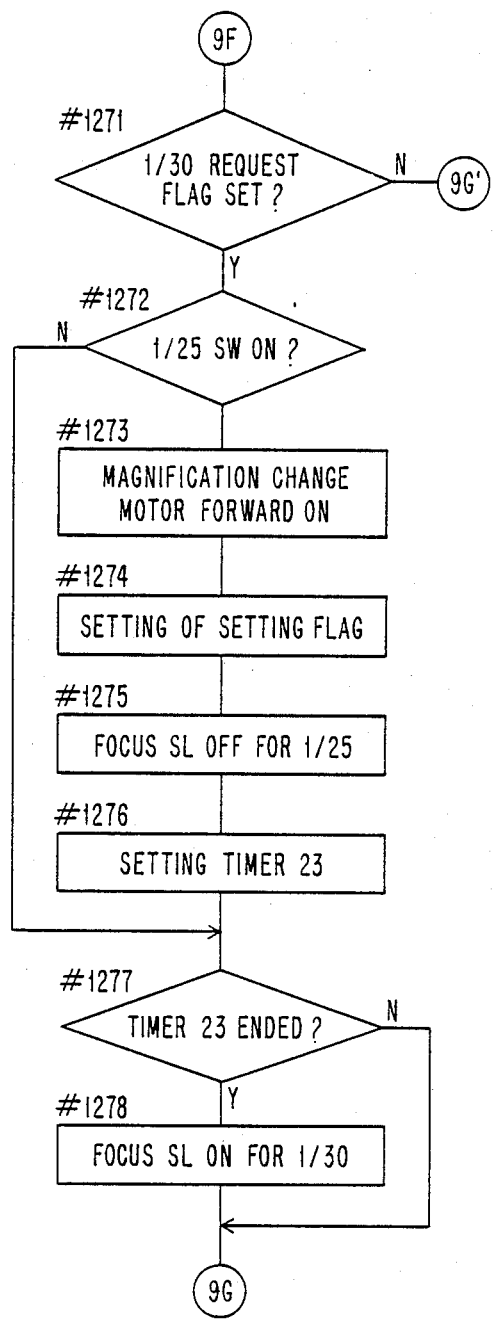
Figure 85:
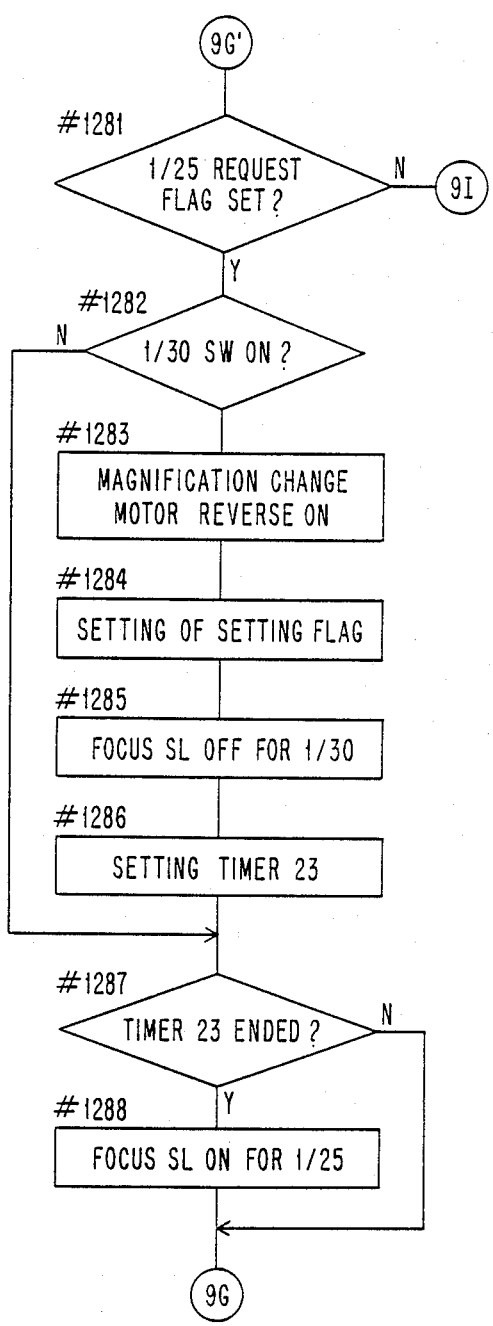
Figure 86:
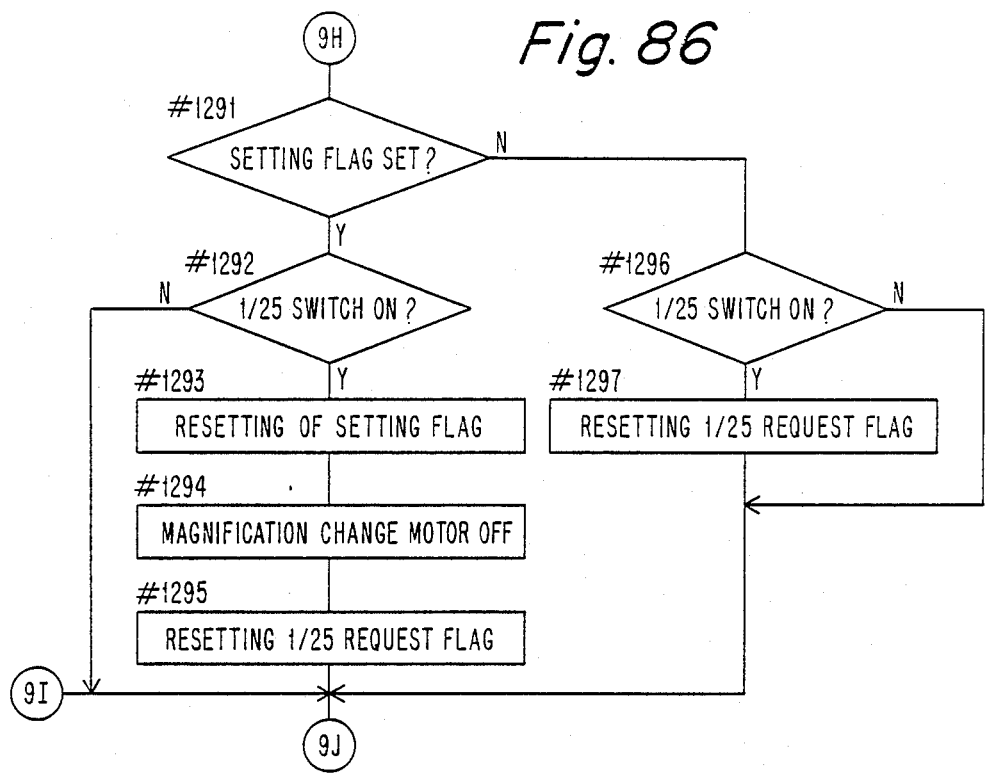

In steps #1251 to #1268, the aperture size is changed according to whether the desired frame size is full size or half size. First, step #1251 checks whether a full-size (largessize) request flag is set by automatic or manual setting specified by the frame selection key 132. If the flag is not set, steps #1252 to #1259 follow, whereas if it is set, steps #1261 to #1268 are performed. The fullsize request flag is set by the size detecting subroutine to be described in detail later (FIG. 84). The flag is set when the document sheet is longer than a predetermined length with respect to the direction of transport of the sheet.

When the full-size request flag is not set, this indicates that the current size is half size. The current size is identified as half size in step #1252. The shutter is then operable, so that a setting flag is reset in step #1259, which is immediately followed by step #1271. When step #1253 detects that the setting flag is not set, the setting flag is set, full-size aperture signal is turned off, and a timer 22 for setting aperture change timing is set (steps #1254 to #1256), whereupon step #1257 follows. If the setting flag is found to be set in step #1253, this step is directly followed by step #1257.

When the timer 22 is still in operation in step #1257, the sequence proceeds to steps #1271 et seq. for a magnification change routine. When the timer (22) operation is over, a half-size aperture signal is emitted, causing the solenoid 33 to reduce the size of the aperture 28 to half size before the sequence proceeds to step #1271 in FIG. 84.

When the full-size request flag is set, a procedure similar to the above is executed. First in step #1261, the current size is checked as to whether it is full size. If it is full size, the setting flag is reset in step #1268, whereupon step #1271 follows. If otherwise and further if the setting flag is not set in step #1262, the setting flag is set, the half-size aperture signal is turned off, and the timer 22 is set (steps #1263 to #1265), whereupon the sequence proceeds to step #1266. When the setting flag is found to be set in step #1262, step #1266 immediately follows.

When the timer 22 is still in operation in step #1266, the sequence proceeds directly to step #1271. If otherwise, a full-size aperture signal is emitted, causing the solenoid 33 to change the size of the aperture 28 to full size (step #1267). The sequence then proceeds to step #1271.

Figure 87:
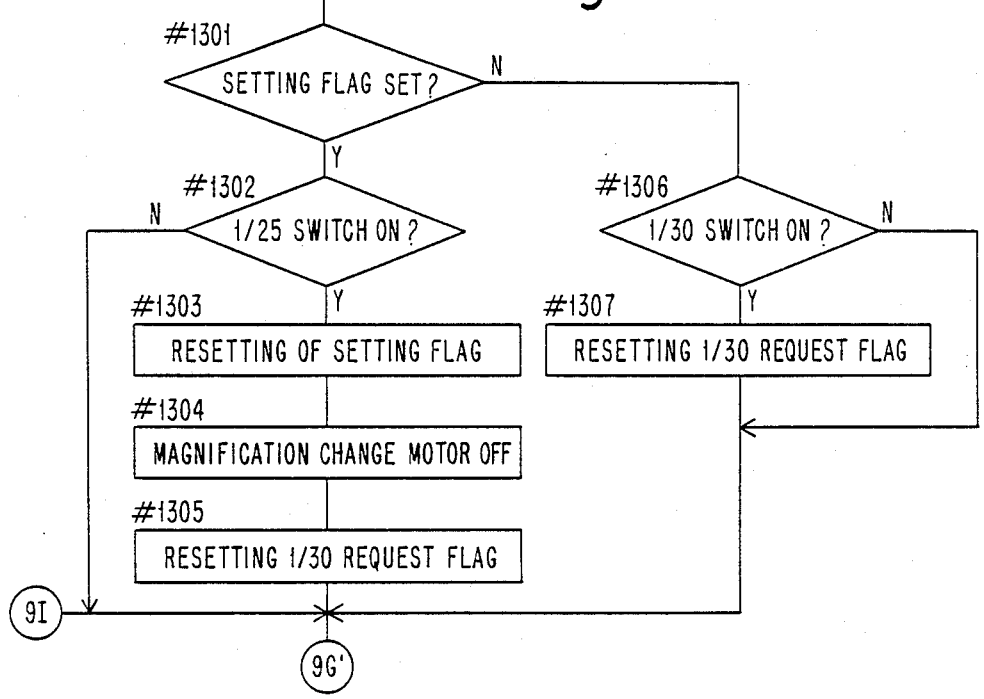
Figure 88:
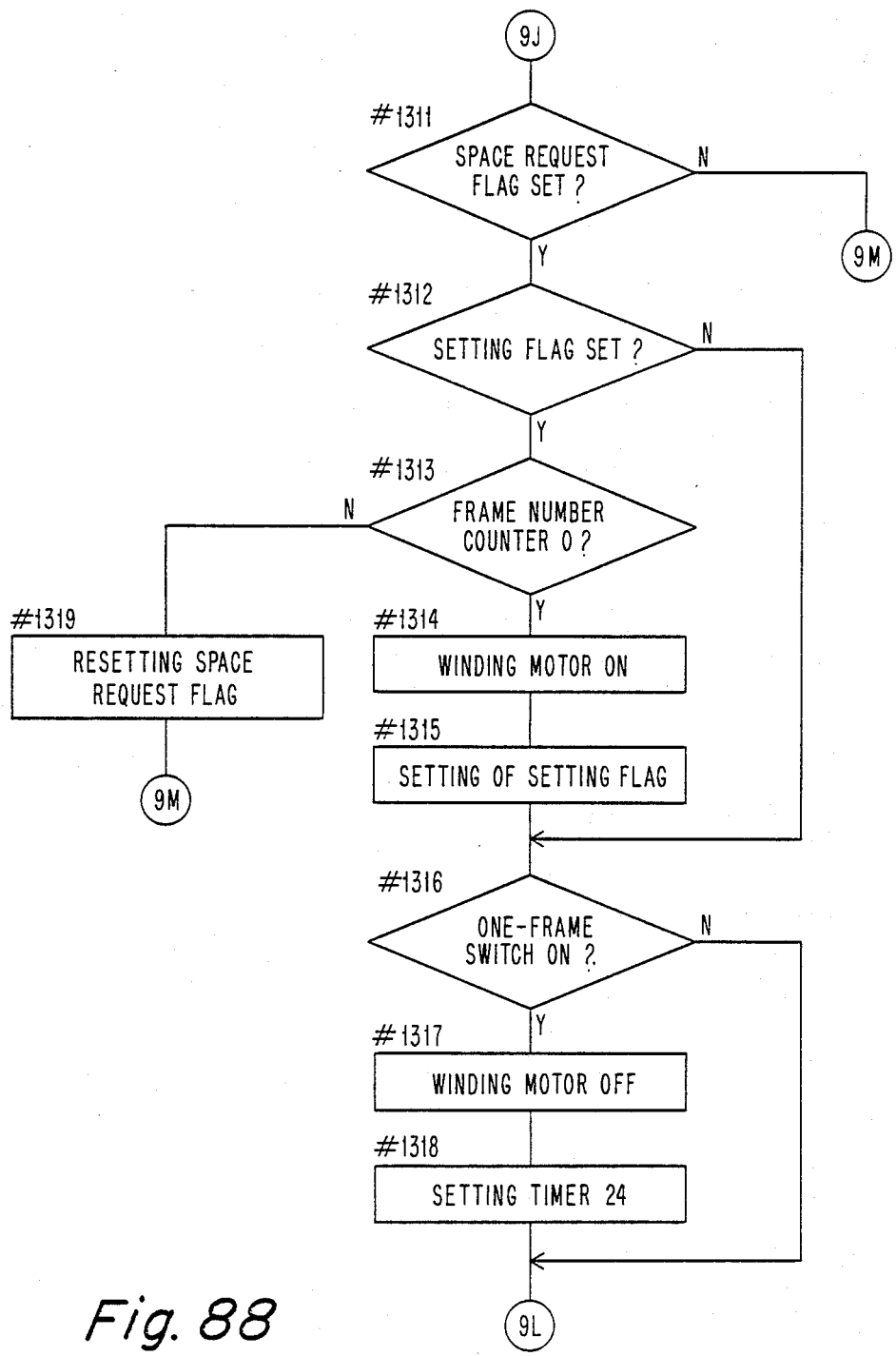

The magnification change processing routine is illustrated in FIG. 84, step #1271 to FIG. 87, step #1305. This routine first checkes whether the magnification automatically or manually set by the selection key 133 is 1/30 or 1/25 and then executes magnification change processing in accordance with the check result. Step #1271 checks whether 1/30 request flag is set. This flag is set by the magnification key 133 based on the result of size detection obtained by the sensors 164, 164a in the size detection subroutine (FIG. 94) to be described below in detail. If the flag is not set, the sequence proceeds directly to step #1281 in FIG. 85. If it is set, steps #1272 to #1278 are performed. Subsequently, the sequence proceeds to FIG. 87, steps #1301 to #1307 for confirming and processing the change to 1/30.

When the current magnification is found to be 1/30 in step #1271, step #1272 checks whether a switch for detecting the magnification of 1/25 is on. If it is off, there is no need to change the magnification, so that the sequence proceeds to step #1277. When the switch is on, however, the magnification must be changed. A magnification change motor (for moving the mirror 5 to alter the optical path length and vary the magnification) is forwardly driven to shift the mirror 5 toward the 1/30 side, a setting flag (indicating that the magnification is being set) is set, the 1/25 side of the focus latching solenoid 27 is deenergized to release the lens 23 from 1/25 focus lock, and a timer 23 for determining the subsequent focus locking timing is set. Step #1277 then follows.

Step #1277 checks whether the operation of the timer 23 is completed. When the operation is over, the solenoid 27 is energized at the 1/30 side to lock the focus of lens at 1/30. Step #1301 then follows. If the timer 23 is found to be still in operation, step #1277 is directly followed by step #1301.

Step #1281 checks whether 1/25 request flag is set. If the flag is not set, there is no need to change the magnification, so that the sequence proceeds to step #1311 of FIG. 88. If it is set, a switch for detecting the magnification of 1/30 is checked in step #1282 as to whether it is on. If it is off, there is no need to change the magnification, so that the sequence proceeds to step #1287. When the switch is on, however, the magnification must be changed. The magnification change motor is reversely driven to shift the mirror 5 toward the 1/25 side, the setting flag is set, the 1/30 side of the focus latching solenoid 27 is deenergized to release the lens from the 1/30 focus lock, and the timer 23 is set (steps #1283 to #1286). Step #1287 then follows. Step #1287 checks whether the operation of the timer 23 is completed. When the operation is over, the solenoid 27 is energized at the 1/25 side to lock the focus of lens at 1/25. The sequence then proceeds to Steps #1291 to #1297 shown in FIG. 86 for confirming and processing for the completion of the magnification change to 1/25. If the timer operation is not completed, these steps directly follow.

Step #1291 checks whether the setting flag is set. If it is set, step #1292 detects that the 1/25 detection switch is on, whereupon the setting flag is reset, the magnification change motor is turned off, and and the 1/25 request flag is reset (steps #1293 to #1295). Step #1311 is thereafter performed. If the 1/25 detection switch is found to be off in step #1292, the sequence proceeds to steps #1311, FIG. 88, for a space processing routine for idle film transport. Further when the setting flag is not found to be set in step #1291, step #1296 checks whether the 1/25 detection switch is on. When it is off, the sequence proceeds to step#1311 directly. If otherwise, the 1/25 request flag is reset before step #1311.

On the other hand, in the routine of steps #1301 to #1307 for confirming the magnification change to 1/30, the setting flag is checked as to whether it is set. When it is set, step #1302 detects that the 1/30 detection switch is on, whereupon the setting flag is reset, the magnification change motor is turned off, the 1/30 request flag is reset, and the sequence proceeds to step #1281, FIG. 41. If the 1/30 detection switch is not found to be set in step #1302, step #1281 directly follows. Alteratively if the setting flag is not found to be set in step #1301, step #1306 inquires whether the 1/30 detection switch is on. If it is off, step #1281 is performed, or if it is on, the 1/30 request flag is reset, followed by step #1281.

Figure 89:
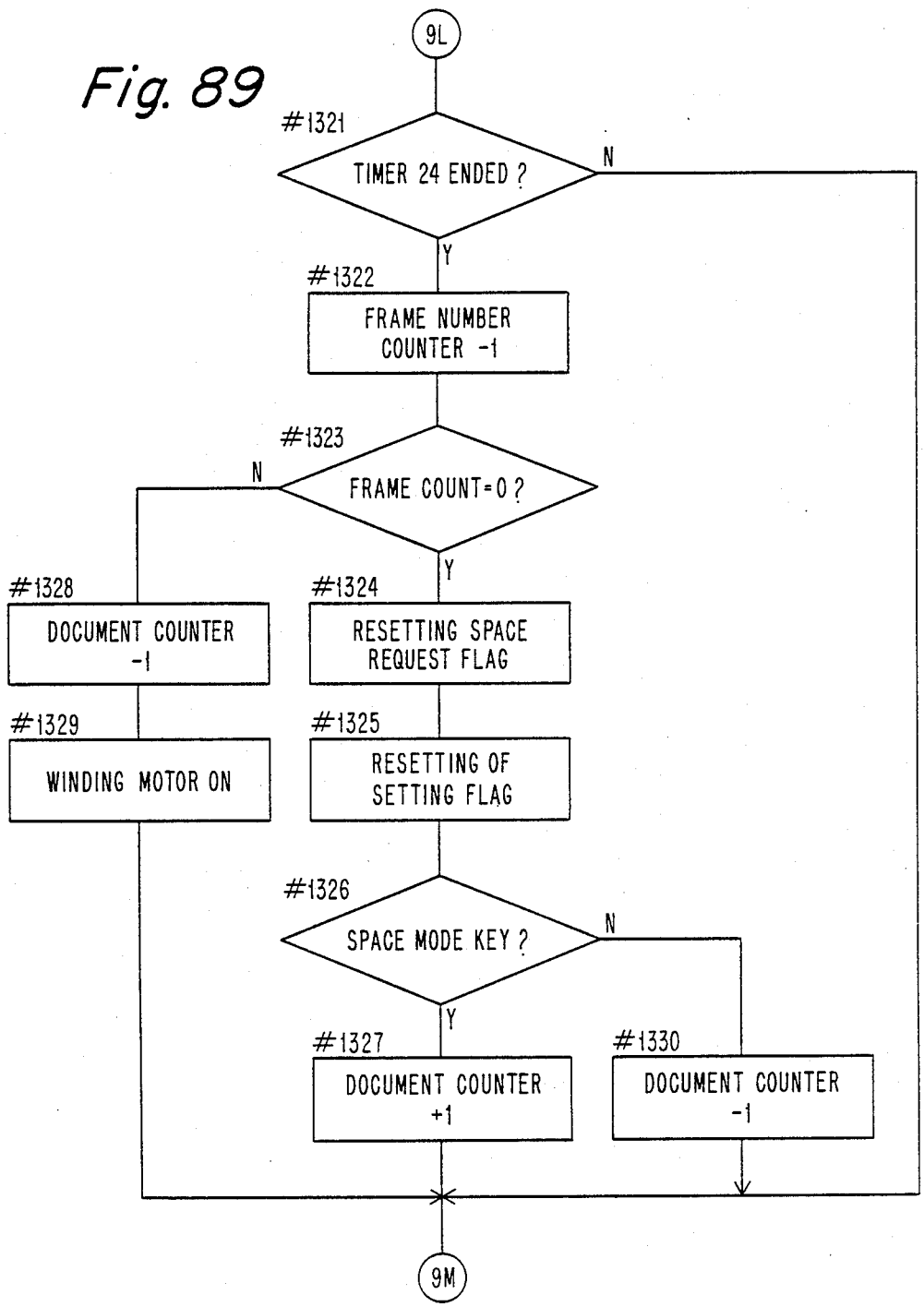

The space processing routine starting from step #1311 ends with step #1330 of FIG. 89 and is performed in accordance with an input by the space 1 key 134, space 2 key 135 or space 3 key 136. One-frame idle transport results from the input by the key 134, and 100-frame idle transport from the input by the key 135. When the space 3 input is given by the key 136, the film is idly transported by a number of frames which is set by number entry key or keys 138. The routine may be so adapted that if the clear key 145 is depressed or the space key 134, 135 or 136 starting the idle transport is depressed again during idle transport, the idle transport is suspended or the camera is restored to the usual state on suspension, even when the specified number of frames have not been idly transported.

For idle transport, therefore, the space 1-3 key processing (FIGS. 28 to 30) included in the panel operation processing routine is executed. When the space 1 key 134 is depressed, the frame number counter is set to "1" and the space request flag is set. When the space 2 key 135 is depressed, the frame number counter is set to "100" and the space request flag is set. When the space 3 key 136 is depressed, the frame number counter is set by the number entry routine, and when a number other than 0 is set by this routine, the space request flag is set.

Step #1311 checks whether the space request flag is set. If it is not set, the sequence proceeds to step #1341 et seq., FIG. 90, for a frame counter recording processing routine. When it is set, step #1312 recognizes that the setting flag is not set, step #1313 then recognizes that the frame number counter value is not 0. Subsequently, the film winding motor is energized to wind up the film, and the setting flag is set (steps #1314 and #1315). Step #1316 then follows.

When the setting flag is found to be set in step #1312, the sequence proceeds directly to step #1316 to further execute the current procedure.

Step #1316 checks whether a one-frame transport detection switch is on. If it is on, indicating that the film has been transported by one frame, the film winding motor is deenergized, the inertia absorbing timer 24 is set, and the sequence proceeds to step #1321 of FIG. 89. If the one-frame switch is found to be off in step

1316, step #1321 directly follows, with the film winding operation continued.

Figure 90:
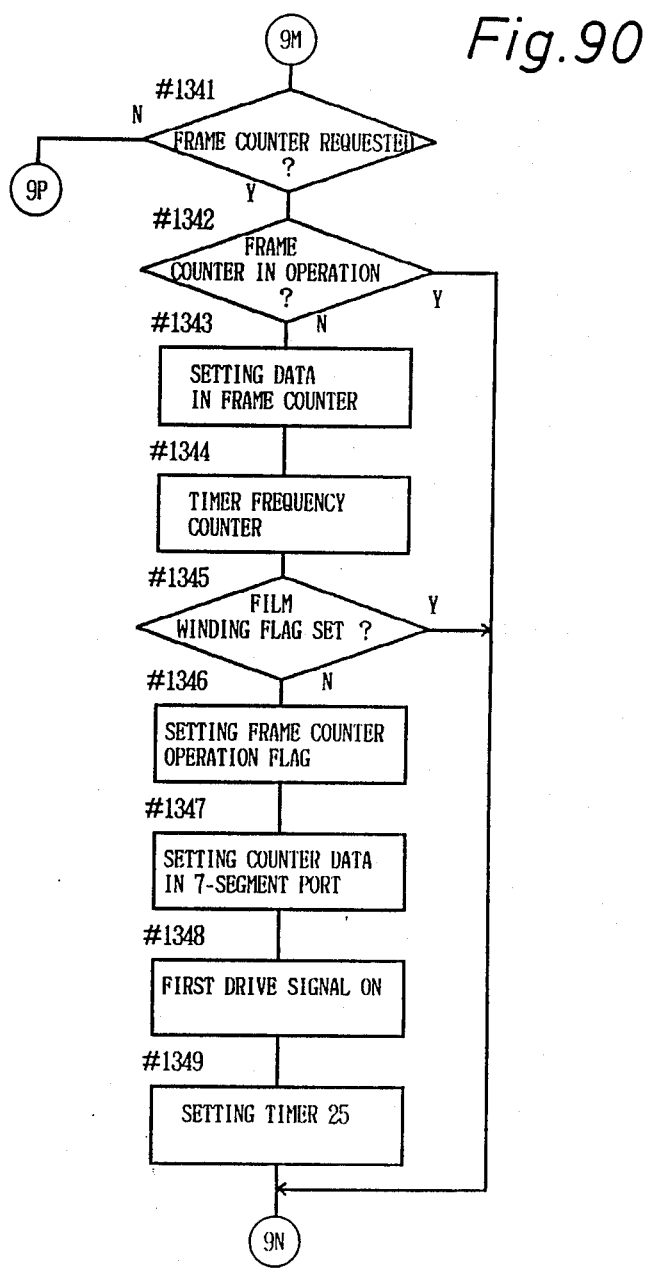

If the frame number counter value is found to be 0 in step #1313, indicating that the film F need not be wound up, the sequence proceeds directly to FIG. 90, step #1341.

Step #1321 checks whether the operation of the timer 24 is completed. If it is still in operation, step #1341 directly follows. When the operation is over, the frame number counter value is decremented by −1. When step #1323 confirms that the counter value is 0, film winding completion processing commences to reset the space request flag and the setting flag. In the case where the space 1 key 134 is on, the document counter is advanced by +1, but in the space modes other than mode 1, the document counter value is decremented by −1, followed by step #1341. Thus with the space 1 key 134, the value on the four-digit seven-segment display is incremented, while in the case of space 2, 3 keys 135, 136, the display value is decremented. On the other hand, when the frame number counter value is found to be other than 0 in step #1323, the document counter value is decremented by −1, and the film winding motor is energized again. After these steps (#1324 to #1330), FIG. 90, step #1341 follows.

Figure 91:
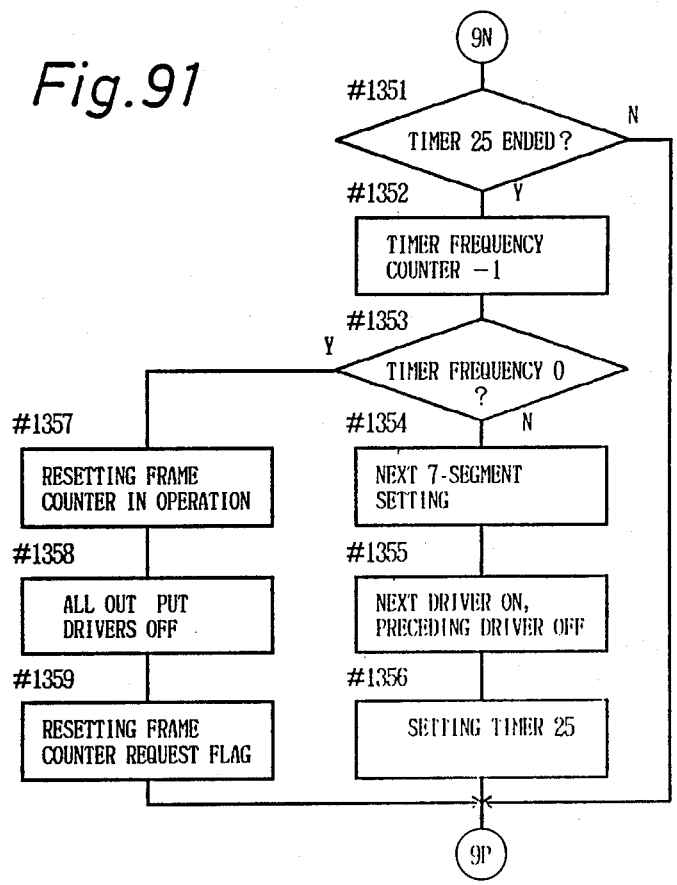

The frame counter recording processing routine of steps #1341 et seq. ends with FIG. 91, step #1359. When the film F is wound up, a request flag therefor is set, and the routine is performed according to the flag. First, step #1341 checks whether the frame counter request flag is set. If it is not set, this indicates that the frame counter need not be recorded, so that the sequence proceeds directly to steps #1361 et seq. of FIG. 92 for a blip mark recording processing routine. When the flag is set, step #1342 inquires whether frame counter operation is being conducted. If the answer is affirmative, the sequence proceeds to FIG. 91, step #1351. If otherwise, the data is set in the memory area m1 already described with reference to FIGS. 42 to 44 and is shown on the displays 201a, 201b, 201c, and a timer operation frequency counter is set (steps #1343 and #1344). Step #1345 thereafter checks whether the film winding flag is set. Through the foregoing procedure, a value "1" smaller than on the frame counter display 137 is given on the displays 201a, 201b, 201c and recorded on the film.

Figure 92:
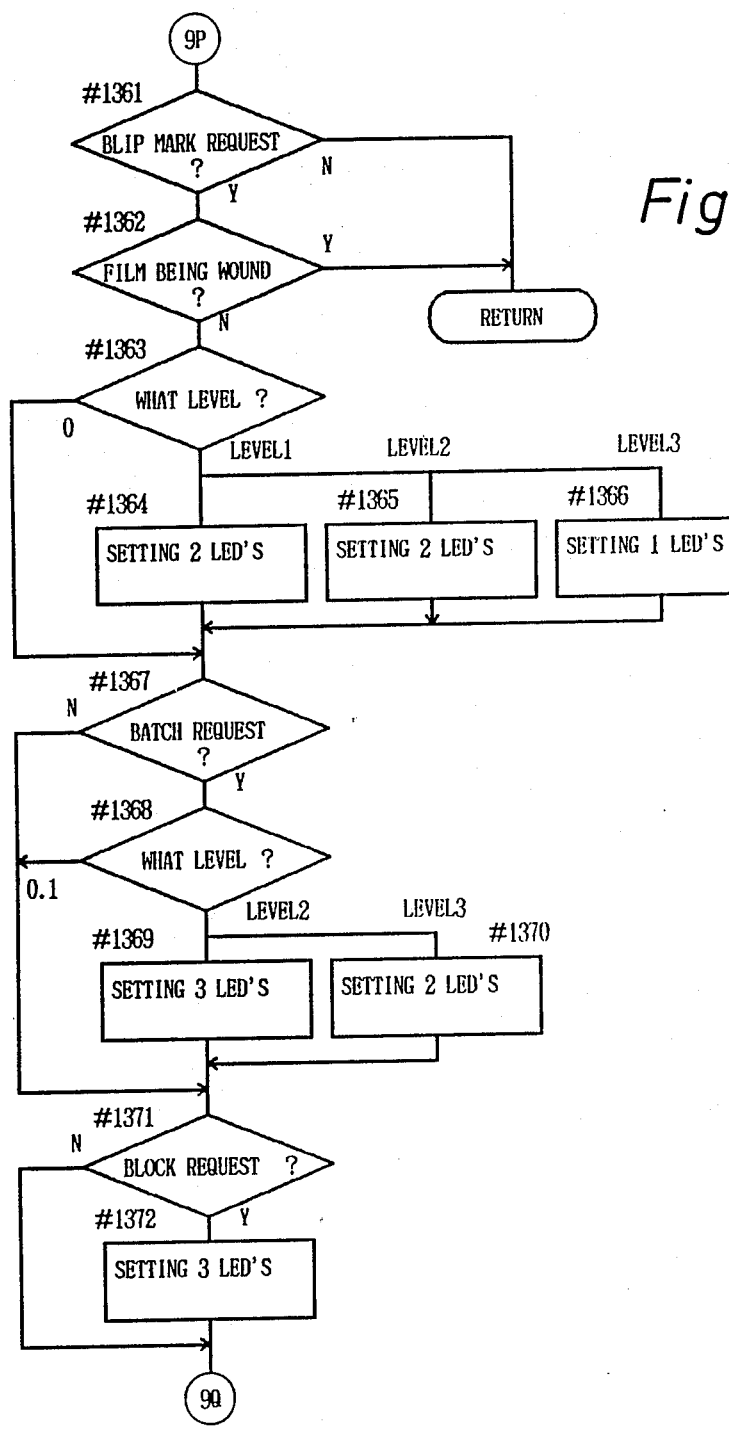

When the film winding request flag is set, indicating that the film is being wound up, the sequence proceeds to step #1361 of FIG. 92 via step #1351 of FIG. 91 without recording operation, but if the flag is not set, a frame counter operation flag is first set to start a recording operation. Data is transferred from the counter to a 7-segment port for the first digit, the driver for the first digit is turned on, and the timer 25 is set for determining duration of lighting (steps #1346 to #1349). The sequence then proceeds to step #1351.

Stop #1351 checks whether the operation of the timer 25 is completed. If the timer is still in operation, the digit remains alight, followed by FIG. 92, step #1361. If otherwise, the timer frequency counter value is decremented by 1 (step #1322), followed by step #1353, in which the counter value is checked as to whether it is 0. Unless it is 0, data is transferred from the frame counter to the 7-segment port next to the currently selected one, whereupon the first driver is turned off, the next driver is turned on and the timer 25 is set (steps #1354 to #1356). The sequence then proceeds to step #1361. When recording for a number of digits set on the timer frequency counter is completed and the counter is 0, the frame counter operation flag is reset, all the output drivers are deenergized, and the frame counter request flag is reset (step #1359), whereupon step #1361 follows.

Figure 93:
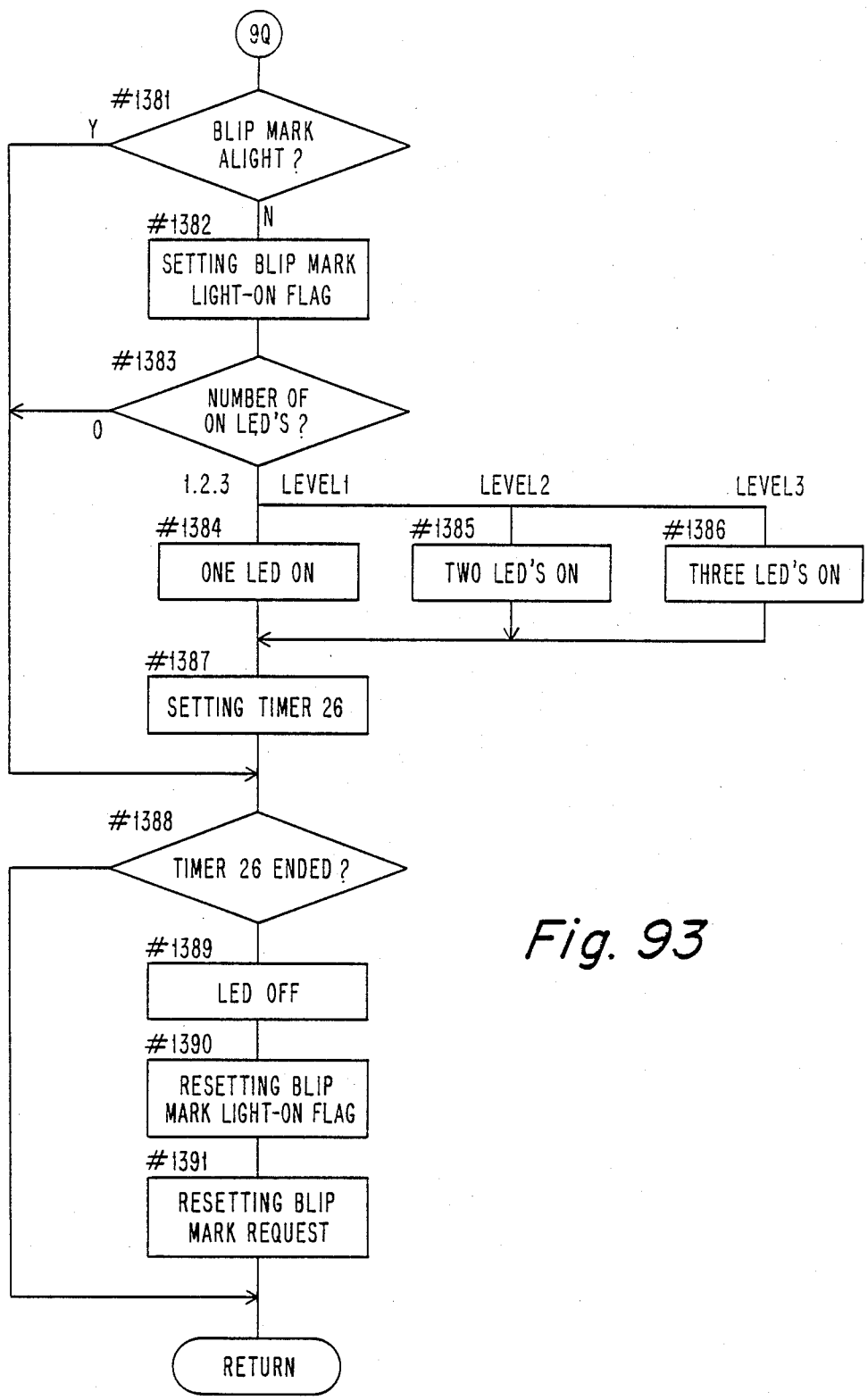

The blip mark recording routine comprises steps #1361 to #1391, FIG. 93. This routine is performed in response to a blip mark request flag set upon the closing of the shutter, according to the level set by the level key 118.

First, step #1361 checks whether the blip mark request flag is set. When it is not set, the sequence returns. When it is set, steps #1362 et seq. follow.

Step #1362 checks whether the film is being wound. If it is so, the sequence returns without following the recording procedure, whereas if otherwise, step #1363 is performed for the recording operation. Step #1363 checks the level setting. When the set level is 0, the sequence proceeds to step #1367. When the setting is 1 or 2, two LED's are set for lighting. If it is 3, one LED is set (steps #1364 to #1366) before the sequence proceeds to step #1367.

Step #1367 inquires whether a batch request is made. If the answer is negative, step #1371 directly follows. When it is affirmative, the sequence proceeds to step #1368, in which the level setting is checked. When the set level is 0, step #1371 follows, while if it is 2, three, LED's are set for lighting. When it is 3, two LED's are set. (steps #1369 and #1370). The sequence then proceeds to step #1371.

Step #1371 checks whether a block request flag is set. If it is not set, FIG. 93, step #1381 follows. When it is set, three LED's are set in step 1372. The sequence then proceeds to FIG. 93, step #1381.

Step #1381 checks whether the specified blip mark is slight. When it is on, step #1388 follows. If otherwise, a blip mark light-on flag is set, and the number of LED's to be on is checked. When it is 0, the sequence proceeds to step #1388. One, two or three LED's are turned on as specified (steps #1384 to #1386). Subsequently, the timer 26 is set to the period of time for the LED to be alight. Step #1388 then follows.

Step #1388 inquires whether the operation of the timer 26 is completed. If the answer is negative, the sequence returns with the LED's on. When it is affirmative, the LED's are turned off, the blip mark on flag is reset, and the blip mark request flag is also reset, whereupon the sequence returns.

Next, the document size detection processing routine included in the main routine will be described in detail. This routine is illustrated in FIG. 94. Step #2001 checks whether the leading end of the sheet D is detected by the inlet sensor 164. On detection, the encoder 302 starts counting up pulses (step #2002). Subsequently, step #2003 checks whether the rear end of the sheet D is detected by the inlet sensor 164.

While the rear end is not detected, the sheet is moving past the sensor, so that the sequence returns without following the size detection procedure until the rear end is detected.

When the rear end is detected the pulse counting operation is discontinued in step #2004. Depending on whether the sheet D is detected by the sensor 164a, step #2005 detects whether the sheet is of large size in a direction perpendicular to the direction of transport of the sheet.

If the sheet has a large size, a flag is set requesting the magnification of 1/30, while a flag for 1/25 is reset to photograph the sheet on a more reduced scale (steps #2006 and #2007). If the sheet is not found to be large in step #2005, the flag requesting the magnification of 1/25 is set, with the other flag reset, to photograph the sheet on a less reduced scale (steps #2008 and #2009).

Step #2010 then follows which checks whether the pulse count P obtained previously is greater than a predetermined pulse count $\beta$. If $\beta > P$, this is interpreted in step #2011 as indicating that the sheet D has a small length in the transport direction. A flag is therefore set for a half-size frame for microfilming. When $\beta \leq P$, this indicates that the sheet has a large length. A flag for a full-size frame is accordingly set in step #2012 for microfilming. The sequence then returns to photograph the sheet under the selected conditions.

When the sheet is not sent out properly or a jam or like trouble occurred, the process shown in FIG. 95 is executed. While sheets are being fed one after another, it is likely that a sheet will not reach a predetermined position in due time or will remain at a particular position for more than a specified period of time. This is detected as a failure in sending out the sheet or a jam or like trouble is troubleshooting. More specifically, step #2021 checks if a trouble signal has been produced. In the absence of any trouble signal, the sequence returns directly, whereas if the signal is detected, the troubleshooting routine of steps #2022 et seq. is performed. First, step #2022 checks whether the bottom switch 160 is on. If it is found to be off, the motor 99 is reversely driven to lower the pushing-up plate 82, and a top setting flag is set. The motor 99 is deenergized when the downward movement of the plate 82 turns on the bottom switch 160 (steps #2023 to #2025).

Consequently, the stack of sheets D on the pushing-up plate 82 is brought to a position a large distance away from the feed roller 81 to form an opening therebetween, permitting the operator to remedy the trouble by removing the sheet improperly sent out or jamming the transport path or placing the sheet correctly. After the remedy, the feeder can be made ready for feeding merely by raising the plate 82.

Moreover, the trouble can be remedied easily because the frame 101a on the upper size of the first passage 101 of the feeder B is openable accurately along rails on the passage upper side.

After the opening for remedying the trouble has been automatically formed by steps #2022 to #2025, the next step #2026 checks whether the first passage 101 is thus open. The opening, when confirmed, is interpreted as indicating a remedy. The returned sheet number is then displayed. The motor 99 is checked whether it is forwardly driven for raising the pushing-up plate 92 to thereby check whether the trouble has been obviated. After the motor has been so driven, the trouble indicating flag is reset (steps #2027 to #2029).

If the first passage 101 is found to be held closed in step #2026, the trouble has not been remedied, so that the sequence returns directly.

What is claimed is:

1. A microfilming apparatus comprising:
   film transport means for transporting a film by a predetermined amount on completion of every exposure,
   photographic operation means for photographing a document sheet on the film transported to a specified position,
   automatic exposure means for automatically setting a period of exposure time for photographing the sheet by the operation means,
   data recording means provided separately from the operation means for recording data as to the photographed image on the film transported to the specified position adjacent to the image area, the recording means being adapted to record the data for a given period of time simultaneously with the photographing of the sheet, and
   control means for prohibiting the operation of the film transport means until the operation of both the operation means and the recording means is completed.

2. An apparatus as defined in claim 1 wherein the data recording means is frame counter recording means adapted to record a frame number assigned to each document sheet image.

3. An apparatus as defined in claim 2 wherein the frame counter recording means comprises:
   a plurality of counters operable at different time points as associated with photographing operations,
   means for selecting one of the counters for recording the data.

4. An apparatus as defined in claim 3 wherein the frame counter recording means further comprises:
   a display for recording the data on the film, and
   an external display on the operation panel of the apparatus.

5. An apparatus as defined in claim 4 wherein each display has a series of counter display sections.

6. An apparatus as defined in claim 5 wherein the frame counter has a counting function at each of the display sections as a unit and a counting function at the unit of at least two of the counter display sections.

7. A microfilming apparatus of the automatic document feed type comprising:
   a platen for supporting a document sheet thereon,
   document supply means for holding a multiplicity of document sheets therein in the form of a stack,
   feed means for transporting the sheets one by one from the supply means onto the platen,
   discharge means for discharging the sheet from the position on the platen,
   photographic means for projecting an image of the sheet on the platen onto a film on a reduced scale to photograph the image on the film,
   film transport means of transporting a film by a predetermined amount on completion of every exposure,
   data recording means provided separately from operation means for recording data as to the photographed image on the film transported to the specified position adjacent to the image area, the recording means being adapted to record the data for a given period of time simultaneously with the photographing of the sheet, and
   control means for prohibiting the operation of the film transport means until the operation of both the operation means and the recording means is completed.

8. An apparatus as defined in claim 7 wherein the data recording means is frame counter recording means adapted to record a frame number assigned to each document sheet image.

9. An apparatus as defined in claim 8 wherein the frame counter recording means comprises:

a plurality of counters operable at different time points as associated with photographing operations, means for selecting one of the counters for recording the data.

10. An apparatus as defined in claim 9 wherein the frame counter recording means further comprises:

a display for recording the data on the film, and an external display on the operation panel of the apparatus.

11. An apparatus as defined in claim 10 wherein each display has a series of counter display sections.

12. An apparatus as defined in claim 1 wherein the frame counter has a counting function at each of the display sections as a unit and a counting function at the unit of at least two of the counter display sections.

* * * * *